US011896055B2

(12) United States Patent
Fraser et al.

(10) Patent No.: US 11,896,055 B2
(45) Date of Patent: *Feb. 13, 2024

(54) ELECTRONIC AEROSOL PROVISION SYSTEMS

(71) Applicant: Nicoventures Trading Limited, London (GB)

(72) Inventors: Rory Fraser, London (GB); Colin Dickens, London (GB); Siddhartha Jain, London (GB)

(73) Assignee: NICOVENTURES TRADING LIMITED, London (GB)

( * ) Notice: Subject to any disclaimer, the term of this patent is extended or adjusted under 35 U.S.C. 154(b) by 223 days.

This patent is subject to a terminal disclaimer.

(21) Appl. No.: 17/247,894

(22) Filed: Dec. 29, 2020

(65) Prior Publication Data

US 2021/0244101 A1 Aug. 12, 2021

Related U.S. Application Data

(63) Continuation of application No. 15/739,029, filed as application No. PCT/GB2016/051730 on Jun. 10, 2016, now Pat. No. 10,881,141.

(30) Foreign Application Priority Data

Jun. 29, 2015 (GB) ..................................... 1511349

(51) Int. Cl.
*A24F 13/00* (2006.01)
*A24F 40/465* (2020.01)
(Continued)

(52) U.S. Cl.
CPC .......... *A24F 40/465* (2020.01); *A24B 15/167* (2016.11); *A24F 40/44* (2020.01);
(Continued)

(58) Field of Classification Search
CPC ...................................................... A24F 47/00
(Continued)

(56) References Cited

U.S. PATENT DOCUMENTS 844,272 A 2/1907 Fate
912,986 A 2/1909 Aschenbrenner
(Continued)

FOREIGN PATENT DOCUMENTS

AT 507187 B1 3/2010
AT 508244 A4 12/2010
(Continued)

OTHER PUBLICATIONS

Office Action dated Jan. 22, 2019 for Japanese Application No. 2017-568122, 5 pages.
(Continued)

*Primary Examiner* — Phuong K Dinh
(74) *Attorney, Agent, or Firm* — Patterson, Thuente P.A.

(57) ABSTRACT

An aerosol provision system for generating an aerosol from a source liquid, the aerosol provision system including: a reservoir of source liquid; a planar vaporizer comprising a planar heating element, wherein the vaporizer is configured to draw source liquid from the reservoir to the vicinity of a vaporizing surface of the vaporizer through capillary action; and an induction heater coil operable to induce current flow in the heating element to inductively heat the heating element and so vaporize a portion of the source liquid in the vicinity of the vaporizing surface of the vaporizer. In some example the vaporizer further comprises a porous wadding/wicking material, e.g. an electrically non-conducting fibrous material at least partially surrounding the planar heating element (susceptor) and in contact with source liquid from the reservoir to provide, or at least contribute to, the function of drawing source liquid from the reservoir to the vicinity of
(Continued)

the vaporizing surface of the vaporizer. In some examples the planar heating element (susceptor) may itself include a porous material so as to provide, or at least contribute to, the function of drawing source liquid from the reservoir to the vicinity of the vaporizing surface of the vaporizer.

19 Claims, 10 Drawing Sheets

(51) Int. Cl.
*A24F 40/46* (2020.01)
*A24F 40/44* (2020.01)
*A24B 15/167* (2020.01)
*H05B 3/46* (2006.01)
*A24F 40/10* (2020.01)

(52) U.S. Cl.
CPC ............... *A24F 40/46* (2020.01); *H05B 3/46* (2013.01); *A24F 40/10* (2020.01); *H05B 2203/021* (2013.01)

(58) Field of Classification Search
USPC .................................................. 131/328–329
See application file for complete search history.

(56) References Cited

U.S. PATENT DOCUMENTS 1,071,817 A 9/1913 Stanley
1,771,366 A 7/1930 Wyss et al.
1,886,391 A 11/1932 Henri et al.
2,057,353 A 10/1936 Whittemore
2,104,266 A 1/1938 Mccormick
2,473,325 A 6/1949 Aufiero
2,809,634 A 10/1957 Hirotada et al.
2,860,638 A 11/1958 Frank et al.
3,111,396 A 11/1963 Ball
3,144,174 A 8/1964 Henry et al.
3,225,954 A 12/1965 Herrick et al.
3,265,236 A 8/1966 Norman et al.
3,402,724 A 9/1968 Blount et al.
3,431,393 A 3/1969 Katsuda et al.
3,433,632 A 3/1969 Elbert et al.
3,521,643 A 7/1970 Toth et al.
3,604,428 A 9/1971 Moukaddem
3,804,100 A 4/1974 Fariello
3,805,806 A 4/1974 Grihalva
3,889,690 A 6/1975 Guarnieri
3,964,902 A 6/1976 Fletcher
4,009,713 A 3/1977 Simmons et al.
4,031,906 A 6/1977 Knapp
4,094,119 A 6/1978 Sullivan
4,145,001 A 3/1979 Weyenberg et al.
4,161,283 A 7/1979 Hyman
4,171,000 A 10/1979 Uhle
4,193,513 A 3/1980 Bull, Jr.
4,303,083 A 12/1981 Burruss, Jr.
4,412,930 A 11/1983 Koike et al.
4,427,123 A 1/1984 Komeda et al.
4,474,191 A 10/1984 Steiner
4,503,851 A 3/1985 Braunroth
4,588,976 A 5/1986 Jaselli
4,628,187 A 12/1986 Sekiguchi et al.
4,638,820 A 1/1987 Roberts et al.
4,675,508 A 6/1987 Miyaji et al.
4,676,237 A 6/1987 Wood et al.
4,677,992 A 7/1987 Bliznak
4,694,841 A 9/1987 Esparza
4,734,097 A 3/1988 Tanabe et al.
4,735,217 A 4/1988 Gerth et al.
4,756,318 A 7/1988 Clearman et al.
4,765,347 A 8/1988 Sensabaugh, Jr. et al.
4,830,028 A 5/1989 Lawson et al.
4,848,374 A 7/1989 Chard et al.
4,885,129 A 12/1989 Leonard et al.
4,892,109 A 1/1990 Strubel
4,907,606 A 3/1990 Lilja et al.
4,917,301 A 4/1990 Munteanu
4,922,901 A 5/1990 Brooks et al.
4,944,317 A 7/1990 Thal
4,945,929 A 8/1990 Egilmex
4,945,931 A 8/1990 Gori
4,947,874 A 8/1990 Brooks et al.
4,947,875 A 8/1990 Brooks et al.
4,978,814 A 12/1990 Honour
5,027,837 A 7/1991 Clearman et al.
5,040,551 A 8/1991 Schlatter et al.
5,046,514 A 9/1991 Bolt
5,060,671 A 10/1991 Counts et al.
5,093,894 A 3/1992 Deevi et al.
5,095,647 A 3/1992 Zobele et al.
5,095,921 A 3/1992 Losee et al.
5,096,921 A 3/1992 Bollinger et al.
5,099,861 A 3/1992 Clearman et al.
5,121,881 A 6/1992 Lembeck
5,143,048 A 9/1992 Cheney, III
5,144,962 A 9/1992 Counts et al.
5,167,242 A 12/1992 Turner et al.
5,179,966 A 1/1993 Losee et al.
5,190,060 A 3/1993 Gerding et al.
5,203,355 A 4/1993 Clearman et al.
5,224,498 A 7/1993 Deevi et al.
5,247,947 A 9/1993 Clearman et al.
5,249,586 A 10/1993 Morgan et al.
5,251,688 A 10/1993 Schatz
5,261,424 A 11/1993 Sprinkel, Jr.
5,269,327 A 12/1993 Counts et al.
5,271,980 A 12/1993 Bell
5,285,798 A 2/1994 Banerjee et al.
5,303,720 A 4/1994 Banerjee et al.
5,305,733 A 4/1994 Walters
5,322,075 A 6/1994 Deevi et al.
5,327,915 A 7/1994 Porenski et al.
5,331,979 A 7/1994 Henley
5,345,951 A 9/1994 Serrano et al.
5,353,813 A 10/1994 Deevi et al.
5,369,249 A 11/1994 Kwon
5,369,723 A 11/1994 Counts et al.
5,372,148 A 12/1994 McCafferty et al.
5,388,574 A 2/1995 Ingebrethsen
5,388,594 A 2/1995 Counts et al.
5,390,864 A 2/1995 Alexander
5,402,803 A 4/1995 Takagi
5,408,574 A 4/1995 Deevi et al.
5,468,936 A 11/1995 Deevi et al.
5,479,948 A 1/1996 Counts et al.
5,497,792 A 3/1996 Prasad et al.
5,501,236 A 3/1996 Hill et al.
5,505,214 A 4/1996 Collins et al.
5,534,020 A 7/1996 Cheney, III et al.
5,540,241 A 7/1996 Kim
5,553,791 A 9/1996 Alexander
5,573,140 A 11/1996 Satomi et al.
5,613,504 A 3/1997 Collins et al.
5,613,505 A 3/1997 Campbell et al.
5,636,787 A 6/1997 Gowhari
5,649,554 A 7/1997 Sprinkel et al.
5,665,262 A 9/1997 Hajaligol et al.
5,666,977 A 9/1997 Higgins et al.
5,692,291 A 12/1997 Deevi et al.
5,726,421 A 3/1998 Fleischhauer et al.
5,742,251 A 4/1998 Gerber
5,743,251 A 4/1998 Howell et al.
5,771,845 A 6/1998 Pistien et al.
5,798,154 A 8/1998 Bryan
5,865,185 A 2/1999 Collins et al.
5,865,186 A 2/1999 Volsey, II
5,984,953 A 11/1999 Sabin et al.
6,026,820 A 2/2000 Baggett, Jr. et al.
6,037,568 A 3/2000 Hatanaka et al.
6,040,560 A 3/2000 Fleischhauer et al.
6,053,176 A 4/2000 Adams et al.
6,058,711 A 5/2000 Maciaszek et al.

(56) References Cited

U.S. PATENT DOCUMENTS 6,089,857 A 7/2000 Matsuura et al.
6,095,505 A 8/2000 Miller
6,116,231 A 9/2000 Sabin et al.
6,125,853 A 10/2000 Susa et al.
6,155,268 A 12/2000 Takeuchi
6,224,179 B1 5/2001 Wenning et al.
6,275,650 B1 8/2001 Lambert
6,289,889 B1 9/2001 Bell et al.
6,315,366 B1 11/2001 Post et al.
6,376,816 B2 4/2002 Cooper et al.
6,644,383 B2 11/2003 Joseph et al.
6,652,804 B1 11/2003 Neumann et al.
6,681,998 B2 1/2004 Sharpe et al.
6,701,921 B2 3/2004 Sprinkel, Jr. et al.
6,723,115 B1 4/2004 Daly
6,790,496 B1 9/2004 Levander et al.
6,803,550 B2 10/2004 Sharpe et al.
6,827,080 B2 12/2004 Fish et al.
6,868,230 B2 3/2005 Gerhardinger
6,953,474 B2 10/2005 Lu
6,994,096 B2 2/2006 Rostami et al.
7,100,618 B2 9/2006 Dominguez
7,112,712 B1 9/2006 Ancell
7,185,659 B2 3/2007 Sharpe
7,263,282 B2 8/2007 Meyer
7,374,063 B2 5/2008 Reid
7,400,940 B2 7/2008 McRae et al.
7,540,286 B2 6/2009 Cross et al.
7,624,739 B2 12/2009 Snaidr et al.
7,726,320 B2 6/2010 Robinson et al.
7,767,698 B2 8/2010 Warchol et al.
7,832,410 B2 11/2010 Hon
7,913,688 B2 3/2011 Cross et al.
7,992,554 B2 8/2011 Radomski et al.
8,061,361 B2 11/2011 Maeder et al.
8,079,371 B2 12/2011 Robinson et al.
8,081,474 B1 12/2011 Zohni et al.
8,118,021 B2 2/2012 Cho et al.
8,375,957 B2 2/2013 Hon
8,393,331 B2 3/2013 Hon
8,430,106 B2 4/2013 Potter et al.
8,459,271 B2 6/2013 Inagaki
8,490,628 B2 7/2013 Hon
8,511,318 B2 8/2013 Hon
8,678,013 B2 3/2014 Crooks et al.
8,689,805 B2 4/2014 Hon
8,752,545 B2 6/2014 Buchberger
8,757,404 B1 6/2014 Fleckenstein
8,807,140 B1 8/2014 Scatterday
8,833,364 B2 9/2014 Buchberger
8,897,628 B2 11/2014 Conley et al.
8,899,238 B2 12/2014 Robinson et al.
8,910,641 B2 12/2014 Hon
8,948,578 B2 2/2015 Buchberger
9,357,803 B2 6/2016 Egoyants et al.
9,414,619 B2 8/2016 Sizer et al.
9,414,629 B2 8/2016 Egoyants et al.
9,554,598 B2 1/2017 Egoyants et al.
9,609,894 B2 4/2017 Abramov et al.
9,623,205 B2 4/2017 Buchberger
9,693,587 B2 7/2017 Plojoux et al.
9,820,512 B2 11/2017 Mironov et al.
9,980,523 B2 5/2018 Abramov et al.
9,999,256 B2 6/2018 Abramov et al.
10,010,695 B2 7/2018 Buchberger
10,015,986 B2 7/2018 Cadieux et al.
10,045,562 B2 8/2018 Buchberger
10,219,543 B2 3/2019 Gill et al.
10,327,473 B2 6/2019 Mironov
2001/0042546 A1 11/2001 Umeda et al.
2002/0005207 A1 1/2002 Wrenn et al.
2002/0016370 A1 2/2002 Shytle et al.
2002/0078951 A1 6/2002 Nichols et al.
2002/0078956 A1 6/2002 Sharpe et al.
2002/0079309 A1 6/2002 Cox et al.
2002/0079377 A1 6/2002 Nichols
2003/0005620 A1 1/2003 Ananth et al.
2003/0007887 A1 1/2003 Roumpos et al.
2003/0033055 A1 2/2003 McRae et al.
2003/0049025 A1 3/2003 Neumann et al.
2003/0079309 A1 5/2003 Vandenbelt et al.
2003/0102304 A1 6/2003 Boyers
2003/0106552 A1 6/2003 Sprinkel, Jr. et al.
2003/0108342 A1 6/2003 Sherwood et al.
2003/0136404 A1 7/2003 Hindle et al.
2003/0146224 A1 8/2003 Fujii et al.
2003/0200964 A1 10/2003 Blakley et al.
2003/0202169 A1 10/2003 Liu
2003/0230567 A1 12/2003 Centanni et al.
2004/0003820 A1 1/2004 Iannuzzi
2004/0031485 A1 2/2004 Rustad et al.
2004/0079368 A1 4/2004 Gupta et al.
2004/0096204 A1 5/2004 Gerhardinger
2004/0129793 A1 7/2004 Nguyen et al.
2004/0149296 A1 8/2004 Rostami et al.
2004/0149297 A1 8/2004 Sharpe
2004/0149737 A1 8/2004 Sharpe et al.
2004/0210151 A1 10/2004 Tsukashima et al.
2004/0223917 A1 11/2004 Hindle et al.
2004/0226568 A1 11/2004 Takeuchi et al.
2005/0025213 A1 2/2005 Parks
2005/0063686 A1 3/2005 Whittle et al.
2005/0145260 A1 7/2005 Inagaki et al.
2005/0194013 A1 9/2005 Wright
2005/0204799 A1 9/2005 Koch
2005/0211711 A1 9/2005 Reid
2005/0268911 A1 12/2005 Cross et al.
2006/0078477 A1 4/2006 Althouse et al.
2006/0137681 A1 6/2006 Von Hollen et al.
2007/0014549 A1 1/2007 Demarest et al.
2007/0045288 A1 3/2007 Nelson
2007/0062548 A1 3/2007 Horstmann et al.
2007/0074734 A1 4/2007 Braunshteyn et al.
2007/0102013 A1 5/2007 Adams et al.
2007/0107879 A1 5/2007 Radomski et al.
2007/0155255 A1 7/2007 Galauner et al.
2007/0204858 A1 9/2007 Abelbeck
2007/0204868 A1 9/2007 Bollinger et al.
2007/0267409 A1 11/2007 Gard et al.
2007/0283972 A1 12/2007 Monsees et al.
2008/0085139 A1 4/2008 Roof
2008/0092912 A1 4/2008 Robinson et al.
2008/0149118 A1 6/2008 Oglesby et al.
2008/0156326 A1 7/2008 Belcastro et al.
2008/0216828 A1 9/2008 Wensley et al.
2008/0233318 A1 9/2008 Coyle
2008/0241255 A1 10/2008 Rose et al.
2008/0302374 A1 12/2008 Wengert et al.
2009/0032034 A1 2/2009 Steinberg
2009/0056728 A1 3/2009 Baker
2009/0065011 A1 3/2009 Maeder et al.
2009/0090472 A1 4/2009 Radomski
2009/0095311 A1 4/2009 Han
2009/0120928 A1 5/2009 Lee et al.
2009/0126745 A1 5/2009 Hon
2009/0151717 A1 6/2009 Bowen et al.
2009/0188490 A1 7/2009 Han
2009/0230117 A1 9/2009 Fernando et al.
2009/0241947 A1 10/2009 Bedini et al.
2009/0260641 A1 10/2009 Monsees et al.
2009/0272379 A1 11/2009 Thorens et al.
2009/0293892 A1 12/2009 Williams et al.
2009/0304372 A1 12/2009 Gubler et al.
2009/0320863 A1 12/2009 Fernando et al.
2010/0024834 A1 2/2010 Oglesby et al.
2010/0059070 A1 3/2010 Potter et al.
2010/0065653 A1 3/2010 Wingo et al.
2010/0083959 A1 4/2010 Siller
2010/0108059 A1 5/2010 Axelsson et al.
2010/0126516 A1 5/2010 Yomtov et al.
2010/0163063 A1 7/2010 Fernando et al.
2010/0200006 A1 8/2010 Robinson et al.
2010/0236546 A1 9/2010 Yamada et al.
2010/0242974 A1 9/2010 Pan

(56) References Cited

U.S. PATENT DOCUMENTS

2010/0242975 A1 9/2010 Hearn
2010/0300467 A1 12/2010 Kuistila et al.
2010/0307518 A1 12/2010 Wang
2011/0011396 A1 1/2011 Fang
2011/0036363 A1 2/2011 Urtsev et al.
2011/0090266 A1 4/2011 King et al.
2011/0094523 A1 4/2011 Thorens et al.
2011/0126848 A1 6/2011 Zuber et al.
2011/0155153 A1 6/2011 Thorens et al.
2011/0155718 A1 6/2011 Greim et al.
2011/0192914 A1 8/2011 Ishigami
2011/0226236 A1 9/2011 Buchberger
2011/0236002 A1 9/2011 Oglesby et al.
2011/0240022 A1 10/2011 Hodges et al.
2011/0264084 A1 10/2011 Reid
2011/0277757 A1 11/2011 Terry et al.
2011/0290266 A1 12/2011 Koller
2011/0290267 A1 12/2011 Yamada et al.
2011/0297166 A1 12/2011 Takeuchi et al.
2011/0303231 A1 12/2011 Li et al.
2012/0006342 A1 1/2012 Rose et al.
2012/0132196 A1 5/2012 Vladyslavovych
2012/0145169 A1 6/2012 Wu
2012/0214926 A1 8/2012 Berthold et al.
2012/0234315 A1 9/2012 Li et al.
2012/0234821 A1 9/2012 Shimizu
2012/0255546 A1 10/2012 Goetz et al.
2012/0260927 A1 10/2012 Liu
2012/0285476 A1 11/2012 Hon
2012/0305545 A1 12/2012 Brosnan et al.
2012/0318882 A1 12/2012 Abehasera
2013/0030125 A1 1/2013 Buryak et al.
2013/0074857 A1 3/2013 Buchberger
2013/0081623 A1 4/2013 Buchberger
2013/0087160 A1 4/2013 Gherghe
2013/0133675 A1 5/2013 Shinozaki et al.
2013/0142782 A1 6/2013 Rahmel et al.
2013/0146588 A1 6/2013 Child
2013/0192615 A1 8/2013 Tucker et al.
2013/0213419 A1 8/2013 Tucker et al.
2013/0220315 A1 8/2013 Conley et al.
2013/0264335 A1 10/2013 Uchida
2013/0284192 A1 10/2013 Peleg et al.
2013/0300350 A1 11/2013 Xiang
2013/0306064 A1 11/2013 Thorens et al.
2013/0306065 A1 11/2013 Thorens et al.
2013/0306084 A1 11/2013 Flick
2013/0319435 A1 12/2013 Flick
2013/0333700 A1 12/2013 Buchberger
2013/0340750 A1 12/2013 Thorens et al.
2013/0340779 A1 12/2013 Liu
2014/0000638 A1 1/2014 Sebastian et al.
2014/0060528 A1 3/2014 Liu
2014/0060554 A1 3/2014 Collett et al.
2014/0060555 A1 3/2014 Chang et al.
2014/0182608 A1 7/2014 Egoyants et al.
2014/0182843 A1 7/2014 Vinegar
2014/0186015 A1 7/2014 Breiwa, III et al.
2014/0202454 A1 7/2014 Buchberger
2014/0202476 A1 7/2014 Egoyants et al.
2014/0209105 A1 7/2014 Sears et al.
2014/0216485 A1 8/2014 Egoyants et al.
2014/0238396 A1 8/2014 Buchberger
2014/0238423 A1 8/2014 Tucker et al.
2014/0238424 A1 8/2014 Macko et al.
2014/0261490 A1 9/2014 Kane
2014/0270726 A1 9/2014 Egoyants et al.
2014/0270730 A1 9/2014 DePiano et al.
2014/0278250 A1 9/2014 Smith et al.
2014/0283825 A1 9/2014 Buchberger
2014/0286630 A1 9/2014 Buchberger
2014/0299125 A1 10/2014 Buchberger
2014/0299141 A1 10/2014 Flick
2014/0301721 A1 10/2014 Ruscio et al.
2014/0305449 A1 10/2014 Plojoux et al.
2014/0305454 A1 10/2014 Rinker et al.
2014/0326257 A1 11/2014 Jalloul et al.
2014/0334802 A1 11/2014 Dubief
2014/0338680 A1 11/2014 Abramov et al.
2014/0338686 A1 11/2014 Plojoux et al.
2014/0345606 A1 11/2014 Talon
2014/0346689 A1 11/2014 Dubief
2014/0360515 A1 12/2014 Vasiliev et al.
2014/0360516 A1 12/2014 Liu
2014/0366898 A1 12/2014 Monsees et al.
2015/0040925 A1 2/2015 Saleem et al.
2015/0068541 A1 3/2015 Sears et al.
2015/0114409 A1 4/2015 Brammer et al.
2015/0114411 A1 4/2015 Buchberger
2015/0128967 A1 5/2015 Robinson et al.
2015/0142088 A1 5/2015 Riva Godoy
2015/0157055 A1 6/2015 Lord
2015/0196058 A1 7/2015 Lord
2015/0208728 A1 7/2015 Lord
2015/0216237 A1 8/2015 Wensley et al.
2015/0223520 A1 8/2015 Phillips et al.
2015/0245669 A1* 9/2015 Cadieux ................ A61M 15/06 131/329
2015/0272219 A1 10/2015 Hatrick et al.
2015/0272222 A1 10/2015 Spinka et al.
2015/0335062 A1 11/2015 Shinkawa et al.
2016/0003403 A1 1/2016 Smith
2016/0021934 A1 1/2016 Cadieux et al.
2016/0073693 A1 3/2016 Reevell
2016/0106154 A1 4/2016 Lord
2016/0106155 A1 4/2016 Reevell
2016/0120221 A1 5/2016 Mironov et al.
2016/0146506 A1 5/2016 Brereton et al.
2016/0168438 A1 6/2016 Harding et al.
2016/0255879 A1 9/2016 Paprocki et al.
2016/0295921 A1 10/2016 Mironov et al.
2017/0006916 A1 1/2017 Liu
2017/0027233 A1 2/2017 Mironov
2017/0042245 A1 2/2017 Buchberger et al.
2017/0055574 A1 3/2017 Kaufman et al.
2017/0055575 A1 3/2017 Wilke et al.
2017/0055580 A1 3/2017 Blandino et al.
2017/0055581 A1 3/2017 Wilke et al.
2017/0055582 A1 3/2017 Blandino et al.
2017/0055583 A1 3/2017 Blandino et al.
2017/0055584 A1 3/2017 Blandino et al.
2017/0055585 A1 3/2017 Fursa et al.
2017/0064996 A1 3/2017 Mironov
2017/0071250 A1 3/2017 Mironov et al.
2017/0079325 A1 3/2017 Mironov
2017/0079330 A1 3/2017 Mironov et al.
2017/0095006 A1 4/2017 Egoyants et al.
2017/0105452 A1 4/2017 Mironov et al.
2017/0119046 A1 5/2017 Kaufman et al.
2017/0119047 A1 5/2017 Blandino et al.
2017/0119048 A1 5/2017 Kaufman et al.
2017/0119049 A1 5/2017 Blandino et al.
2017/0119050 A1 5/2017 Blandino et al.
2017/0119051 A1 5/2017 Blandino et al.
2017/0156403 A1 6/2017 Gill et al.
2017/0156406 A1 6/2017 Abramov et al.
2017/0156407 A1 6/2017 Abramov et al.
2017/0174418 A1 6/2017 Cai
2017/0196273 A1 7/2017 Qiu
2017/0197043 A1 7/2017 Buchberger
2017/0197044 A1 7/2017 Buchberger
2017/0197046 A1 7/2017 Buchberger
2017/0197048 A1 7/2017 Khosrowshahi et al.
2017/0197049 A1 7/2017 Doll
2017/0197050 A1 7/2017 Reinburg et al.
2017/0199048 A1 7/2017 Igumnov et al.
2017/0231276 A1 8/2017 Mironov et al.
2017/0231281 A1 8/2017 Hatton et al.
2017/0303585 A1 10/2017 Florack et al.
2017/0332700 A1 11/2017 Plews et al.
2017/0340008 A1 11/2017 Sebastian et al.
2018/0168227 A1 6/2018 Fraser et al.
2018/0184712 A1 7/2018 Fraser et al.
2018/0184713 A1 7/2018 Mironov et al.

(56) References Cited

U.S. PATENT DOCUMENTS

| | | | |
|---|---|---|---|
| 2018/0192700 | A1 | 7/2018 | Fraser et al. |
| 2018/0235279 | A1 | 8/2018 | Wilke et al. |
| 2018/0242633 | A1 | 8/2018 | Wilke et al. |
| 2018/0242636 | A1 | 8/2018 | Blandino et al. |
| 2018/0271171 | A1 | 9/2018 | Abramov et al. |
| 2018/0279677 | A1 | 10/2018 | Blandino et al. |
| 2018/0317552 | A1 | 11/2018 | Kaufman et al. |
| 2018/0317553 | A1 | 11/2018 | Blandino et al. |
| 2018/0317554 | A1 | 11/2018 | Kaufman et al. |
| 2018/0317555 | A1 | 11/2018 | Blandino et al. |
| 2019/0000142 | A1 | 1/2019 | Lavanchy et al. |
| 2019/0014820 | A1 | 1/2019 | Malgat |
| 2019/0142068 | A1 | 5/2019 | Gill et al. |
| 2019/0182909 | A1 | 6/2019 | Fursa et al. |

FOREIGN PATENT DOCUMENTS

| | | | |
|---|---|---|---|
| AT | 510405 | A4 | 4/2012 |
| AT | 510504 | A1 | 4/2012 |
| AU | 6393173 | A | 6/1975 |
| CA | 2003521 | A1 | 5/1990 |
| CA | 2003522 | A1 | 5/1990 |
| CA | 2309376 | A1 | 11/2000 |
| CA | 2712412 | A1 | 12/2009 |
| CA | 2937722 | A1 | 11/2015 |
| CA | 2974770 | A1 | 12/2015 |
| CA | 2982164 | A1 | 10/2016 |
| CH | 698603 | B1 | 9/2009 |
| CL | 2007002226 | A1 | 2/2008 |
| CL | 2013003637 | A1 | 7/2014 |
| CL | 2014002840 | A1 | 12/2014 |
| CN | 86102917 | A | 11/1987 |
| CN | 1040914 | A | 4/1990 |
| CN | 1045691 | A | 10/1990 |
| CN | 2092880 | U | 1/1992 |
| CN | 2220168 | Y | 2/1996 |
| CN | 1122213 | A | 5/1996 |
| CN | 1126426 | A | 7/1996 |
| CN | 2246744 | Y | 2/1997 |
| CN | 1196660 | A | 10/1998 |
| CN | 1196661 | A | 10/1998 |
| CN | 1205849 | A | 1/1999 |
| CN | 1312730 | A | 9/2001 |
| CN | 1106812 | C | 4/2003 |
| CN | 2598364 | Y | 1/2004 |
| CN | 1578895 | A | 2/2005 |
| CN | 2719043 | Y | 8/2005 |
| CN | 1694765 | A | 11/2005 |
| CN | 1703279 | A | 11/2005 |
| CN | 200966824 | Y | 10/2007 |
| CN | 201076006 | Y | 6/2008 |
| CN | 101238047 | A | 8/2008 |
| CN | 101267749 | A | 9/2008 |
| CN | 101277622 | A | 10/2008 |
| CN | 101277623 | A | 10/2008 |
| CN | 101282660 | A | 10/2008 |
| CN | 201185656 | Y | 1/2009 |
| CN | 101390659 | A | 3/2009 |
| CN | 201199922 | Y | 3/2009 |
| CN | 201238609 | Y | 5/2009 |
| CN | 101500443 | A | 8/2009 |
| CN | 101516425 | A | 8/2009 |
| CN | 101557728 | A | 10/2009 |
| CN | 101606758 | A | 12/2009 |
| CN | 100577043 | C | 1/2010 |
| CN | 201375023 | Y | 1/2010 |
| CN | 101648041 | A | 2/2010 |
| CN | 201445686 | U | 5/2010 |
| CN | 101878958 | A | 11/2010 |
| CN | 101925309 | A | 12/2010 |
| CN | 201762288 | U | 3/2011 |
| CN | 101606758 | B | 4/2011 |
| CN | 102014677 | A | 4/2011 |
| CN | 201869778 | U | 6/2011 |
| CN | 102131411 | A | 7/2011 |
| CN | 202172846 | U | 3/2012 |
| CN | 202233006 | U | 5/2012 |
| CN | 102604599 | A | 7/2012 |
| CN | 102655773 | A | 9/2012 |
| CN | 102861694 | A | 1/2013 |
| CN | 202722498 | U | 2/2013 |
| CN | 202750708 | U | 2/2013 |
| CN | 103052380 | A | 4/2013 |
| CN | 103054196 | A | 4/2013 |
| CN | 103359550 | A | 10/2013 |
| CN | 203369385 | U | 1/2014 |
| CN | 203369386 | U | 1/2014 |
| CN | 103596458 | A | 2/2014 |
| CN | 103689812 | A | 4/2014 |
| CN | 103720057 | A | 4/2014 |
| CN | 103783673 | A | 5/2014 |
| CN | 203618786 | U | 6/2014 |
| CN | 103974639 | A | 8/2014 |
| CN | 104000305 | A | 8/2014 |
| CN | 104010534 | A | 8/2014 |
| CN | 203748673 | U | 8/2014 |
| CN | 203762288 | U | 8/2014 |
| CN | 104039033 | A | 9/2014 |
| CN | 104095291 | A | 10/2014 |
| CN | 203952439 | U | 11/2014 |
| CN | 203969196 | U | 12/2014 |
| CN | 203986095 | U | 12/2014 |
| CN | 203986113 | U | 12/2014 |
| CN | 204032371 | U | 12/2014 |
| CN | 104256899 | A | 1/2015 |
| CN | 204091003 | U | 1/2015 |
| CN | 204132397 | U | 2/2015 |
| CN | 204146328 | U | 2/2015 |
| CN | 104382238 | A | 3/2015 |
| CN | 104382239 | A | 3/2015 |
| CN | 204217894 | U | 3/2015 |
| CN | 104540404 | A | 4/2015 |
| CN | 204273248 | U | 4/2015 |
| CN | 204317506 | U | 5/2015 |
| CN | 104720120 | A | 6/2015 |
| CN | 104720121 | A | 6/2015 |
| CN | 105873462 | A | 8/2016 |
| CN | 106102863 | A | 11/2016 |
| CN | 104095291 | B | 1/2017 |
| CN | 106455711 | A | 2/2017 |
| CN | 106455715 | A | 2/2017 |
| CN | 106455711 | B | 9/2019 |
| DE | 1950439 | A1 | 4/1971 |
| DE | 3148335 | A1 | 7/1983 |
| DE | 3218760 | A1 | 12/1983 |
| DE | 3936687 | A1 | 5/1990 |
| DE | 29713866 | U1 | 10/1997 |
| DE | 29719509 | U1 | 1/1998 |
| DE | 19630619 | A1 | 2/1998 |
| DE | 19654945 | A1 | 3/1998 |
| DE | 10330681 | B3 | 6/2004 |
| DE | 202006013439 | U1 | 10/2006 |
| DE | 102005023278 | A1 | 11/2006 |
| DE | 102010046482 | A1 | 3/2012 |
| DE | 202013100606 | U1 | 2/2013 |
| DE | 102013002555 | A1 | 6/2014 |
| EA | 019736 | B1 | 5/2014 |
| EP | 0280262 | A2 | 8/1988 |
| EP | 0295122 | A2 | 12/1988 |
| EP | 0309227 | A2 | 3/1989 |
| EP | 0358002 | A2 | 3/1990 |
| EP | 0358114 | A2 | 3/1990 |
| EP | 0371285 | A2 | 6/1990 |
| EP | 0418464 | A2 | 3/1991 |
| EP | 0430559 | A2 | 6/1991 |
| EP | 0430566 | A2 | 6/1991 |
| EP | 0438862 | A2 | 7/1991 |
| EP | 0444553 | A2 | 9/1991 |
| EP | 0488488 | A1 | 6/1992 |
| EP | 0491952 | A1 | 7/1992 |
| EP | 0503767 | A1 | 9/1992 |
| EP | 0603613 | A1 | 6/1994 |
| EP | 0703735 | A1 | 4/1996 |
| EP | 0845220 | A1 | 6/1998 |

(56) References Cited

FOREIGN PATENT DOCUMENTS

| | | | |
|---|---|---|---|
| EP | 0893071 | A1 | 1/1999 |
| EP | 0703735 | B1 | 7/2001 |
| EP | 1128743 | A1 | 9/2001 |
| EP | 1166814 | A2 | 1/2002 |
| EP | 1166847 | A2 | 1/2002 |
| EP | 1609376 | A1 | 12/2005 |
| EP | 1618803 | A1 | 1/2006 |
| EP | 1454840 | B1 | 9/2006 |
| EP | 1736065 | A1 | 12/2006 |
| EP | 1757921 | A2 | 2/2007 |
| EP | 1940254 | A2 | 7/2008 |
| EP | 2018886 | A1 | 1/2009 |
| EP | 2022349 | A1 | 2/2009 |
| EP | 1357025 | B1 | 7/2009 |
| EP | 2110033 | A1 | 10/2009 |
| EP | 2113178 | A1 | 11/2009 |
| EP | 1947965 | B1 | 2/2010 |
| EP | 2186833 | A1 | 5/2010 |
| EP | 2316286 | A1 | 5/2011 |
| EP | 2327318 | A1 | 6/2011 |
| EP | 2340729 | A1 | 7/2011 |
| EP | 2340730 | A1 | 7/2011 |
| EP | 2394520 | A1 | 12/2011 |
| EP | 2444112 | A1 | 4/2012 |
| EP | 2253541 | B1 | 5/2012 |
| EP | 2520186 | A1 | 11/2012 |
| EP | 2609821 | A1 | 7/2013 |
| EP | 2698070 | A1 | 2/2014 |
| EP | 2762019 | A1 | 8/2014 |
| EP | 2785208 | A1 | 10/2014 |
| EP | 2835062 | A1 | 2/2015 |
| EP | 2907397 | A1 | 8/2015 |
| EP | 2975957 | A1 | 1/2016 |
| EP | 3005890 | A1 | 4/2016 |
| EP | 3062647 | A1 | 9/2016 |
| EP | 3313212 | B1 | 4/2019 |
| EP | 3313214 | B1 | 6/2019 |
| FR | 960469 | A | 4/1950 |
| GB | 25575 | A | 3/1912 |
| GB | 191126138 | A | 3/1912 |
| GB | 347650 | A | 4/1931 |
| GB | 426247 | A | 3/1935 |
| GB | 1313525 | A | 4/1973 |
| GB | 1511358 | A | 5/1978 |
| GB | 2495923 | A | 5/2013 |
| GB | 2504732 | A | 2/2014 |
| GB | 2504732 | B | 1/2015 |
| GB | 2516924 | A | 2/2015 |
| GB | 2527597 | A | 12/2015 |
| HK | 1196511 | A1 | 12/2014 |
| HK | 1226611 | | 10/2017 |
| JP | S457120 | Y1 | 4/1970 |
| JP | S5314173 | A | 2/1978 |
| JP | S5752456 | A | 3/1982 |
| JP | S59106340 | A | 6/1984 |
| JP | S6196763 | A | 5/1986 |
| JP | S6196765 | A | 5/1986 |
| JP | S62501050 | A | 4/1987 |
| JP | S62205184 | A | 9/1987 |
| JP | S6360322 | A | 3/1988 |
| JP | H01191674 | A | 8/1989 |
| JP | H0292986 | A | 4/1990 |
| JP | H0292988 | A | 4/1990 |
| JP | H02124081 | A | 5/1990 |
| JP | H02127493 | A | 5/1990 |
| JP | H02190171 | A | 7/1990 |
| JP | H0341185 | A | 2/1991 |
| JP | H03112478 | A | 5/1991 |
| JP | H03192677 | A | 8/1991 |
| JP | H03232481 | A | 10/1991 |
| JP | H05103836 | A | 4/1993 |
| JP | H05212100 | A | 8/1993 |
| JP | H05309136 | A | 11/1993 |
| JP | H062164 | B1 | 1/1994 |
| JP | H06189861 | A | 7/1994 |
| JP | H06315366 | A | 11/1994 |
| JP | H07147965 | A | 6/1995 |
| JP | H08942 | U | 6/1996 |
| JP | H08299862 | A | 11/1996 |
| JP | H08511175 | A | 11/1996 |
| JP | H08511176 | A | 11/1996 |
| JP | H09107943 | A | 4/1997 |
| JP | 3044574 | U | 12/1997 |
| JP | H1189551 | A | 4/1999 |
| JP | H11503912 | A | 4/1999 |
| JP | H11125390 | A | 5/1999 |
| JP | H11169157 | A | 6/1999 |
| JP | H11514081 | A | 11/1999 |
| JP | 2000119643 | A | 4/2000 |
| JP | 2001063776 | A | 3/2001 |
| JP | 2001509634 | A | 7/2001 |
| JP | 2002527153 | A | 8/2002 |
| JP | 2002529111 | A | 9/2002 |
| JP | 2004332069 | A | 11/2004 |
| JP | 2005036897 | A | 2/2005 |
| JP | 2005106350 | A | 4/2005 |
| JP | 2005524067 | A | 8/2005 |
| JP | 2005300005 | A | 10/2005 |
| JP | 2005537918 | A | 12/2005 |
| JP | 2005537919 | A | 12/2005 |
| JP | 2005538149 | A | 12/2005 |
| JP | 2005538159 | A | 12/2005 |
| JP | 2006501871 | A | 1/2006 |
| JP | 2006059640 | A | 3/2006 |
| JP | 2006219557 | A | 8/2006 |
| JP | 2007057532 | A | 3/2007 |
| JP | 2007512880 | A | 5/2007 |
| JP | 2008050422 | A | 3/2008 |
| JP | 2008511175 | A | 4/2008 |
| JP | 2008249003 | A | 10/2008 |
| JP | 2009509523 | A | 3/2009 |
| JP | 2009087703 | A | 4/2009 |
| JP | 2009537119 | A | 10/2009 |
| JP | 2009537120 | A | 10/2009 |
| JP | 2010506594 | A | 3/2010 |
| JP | 2010508034 | A | 3/2010 |
| JP | 2010178730 | A | 8/2010 |
| JP | 2010213579 | A | 9/2010 |
| JP | 2011058538 | A | 3/2011 |
| JP | 2011509667 | A | 3/2011 |
| JP | 2011515093 | A | 5/2011 |
| JP | 2011518567 | A | 6/2011 |
| JP | 2011525366 | A | 9/2011 |
| JP | 2012506263 | A | 3/2012 |
| JP | 2012529936 | A | 11/2012 |
| JP | 2012249854 | A | 12/2012 |
| JP | 2013507152 | A | 3/2013 |
| JP | 2013511962 | A | 4/2013 |
| JP | 5193668 | B2 | 5/2013 |
| JP | 2014511175 | A | 5/2014 |
| JP | 2014519586 | A | 8/2014 |
| JP | 2014521419 | A | 8/2014 |
| JP | 2015504653 | A | 2/2015 |
| JP | 2015513922 | A | 5/2015 |
| JP | 2015513970 | A | 5/2015 |
| JP | 2016521981 | A | 7/2016 |
| JP | 2016524777 | A | 8/2016 |
| JP | 2016526777 | A | 9/2016 |
| JP | 2016532432 | A | 10/2016 |
| JP | 2016538844 | A | 12/2016 |
| JP | 2017506915 | A | 3/2017 |
| JP | 6217980 | B2 | 10/2017 |
| JP | 6543357 | B2 | 7/2019 |
| KR | 950700692 | A | 2/1995 |
| KR | 19990081973 | A | 11/1999 |
| KR | 100385395 | B1 | 8/2003 |
| KR | 200350504 | Y1 | 5/2004 |
| KR | 200370872 | Y1 | 12/2004 |
| KR | 100636287 | B1 | 10/2006 |
| KR | 20070038350 | A | 4/2007 |
| KR | 100757450 | B1 | 9/2007 |
| KR | 20080060218 | A | 7/2008 |
| KR | 20100135865 | A | 12/2010 |
| KR | 20120003484 | U | 5/2012 |

(56) References Cited

FOREIGN PATENT DOCUMENTS

| | | | |
|---|---|---|---|
| KR | 20120104533 | A | 9/2012 |
| KR | 20120107914 | A | 10/2012 |
| KR | 20130006714 | A | 1/2013 |
| KR | 20130029697 | A | 3/2013 |
| KR | 20130038957 | A | 4/2013 |
| KR | 20130006714 | U | 11/2013 |
| KR | 20140063506 | A | 5/2014 |
| KR | 20150022407 | A | 3/2015 |
| KR | 20150047616 | A | 5/2015 |
| KR | 20160013208 | A | 2/2016 |
| KR | 20160097196 | A | 8/2016 |
| KR | 20160127793 | A | 11/2016 |
| MX | 2009001096 | A | 3/2009 |
| MX | 2014011283 | A | 10/2014 |
| NO | 02098389 | A1 | 12/2002 |
| RU | 2066337 | C1 | 9/1996 |
| RU | 2098446 | C1 | 12/1997 |
| RU | 2285028 | C1 | 10/2006 |
| RU | 2311859 | C2 | 12/2007 |
| RU | 2336001 | C2 | 10/2008 |
| RU | 2360583 | C1 | 7/2009 |
| RU | 89927 | U1 | 12/2009 |
| RU | 94815 | U1 | 6/2010 |
| RU | 103281 | U1 | 4/2011 |
| RU | 115629 | U1 | 5/2012 |
| RU | 2450780 | C2 | 5/2012 |
| RU | 122000 | U1 | 11/2012 |
| RU | 124120 | U1 | 1/2013 |
| RU | 2489948 | C2 | 8/2013 |
| RU | 132318 | U1 | 9/2013 |
| RU | 132954 | U1 | 10/2013 |
| RU | 2509516 | C2 | 3/2014 |
| WO | 8404698 | A1 | 12/1984 |
| WO | 8602528 | A1 | 5/1986 |
| WO | 9406314 | A1 | 3/1994 |
| WO | 9409842 | A1 | 5/1994 |
| WO | 9418860 | A1 | 9/1994 |
| WO | 9527411 | A1 | 10/1995 |
| WO | 9618662 | A1 | 6/1996 |
| WO | 9632854 | A2 | 10/1996 |
| WO | 9639879 | A1 | 12/1996 |
| WO | 9748293 | A1 | 12/1997 |
| WO | 9817131 | A1 | 4/1998 |
| WO | 9823171 | A1 | 6/1998 |
| WO | 9903308 | A1 | 1/1999 |
| WO | 9933008 | A2 | 7/1999 |
| WO | 0009188 | A1 | 2/2000 |
| WO | 0021598 | A1 | 4/2000 |
| WO | 0028842 | A1 | 5/2000 |
| WO | 0050111 | A1 | 8/2000 |
| WO | 0167819 | A1 | 9/2001 |
| WO | 02051468 | A2 | 7/2002 |
| WO | 02058747 | A1 | 8/2002 |
| WO | 03012565 | A1 | 2/2003 |
| WO | 03028409 | A1 | 4/2003 |
| WO | 03037412 | A2 | 5/2003 |
| WO | 03050405 | A1 | 6/2003 |
| WO | 03059413 | A2 | 7/2003 |
| WO | 03070031 | A1 | 8/2003 |
| WO | 03083283 | A1 | 10/2003 |
| WO | 03101454 | A1 | 12/2003 |
| WO | 03103387 | A2 | 12/2003 |
| WO | 2004022128 | A2 | 3/2004 |
| WO | 2004022242 | A1 | 3/2004 |
| WO | 2004022243 | A1 | 3/2004 |
| WO | 2004068901 | A2 | 8/2004 |
| WO | 2004089126 | A1 | 10/2004 |
| WO | 2005106350 | A2 | 11/2005 |
| WO | 2006082571 | A1 | 8/2006 |
| WO | 2007012007 | A2 | 1/2007 |
| WO | 2007017482 | A1 | 2/2007 |
| WO | 2007024130 | A1 | 3/2007 |
| WO | 2007040941 | A1 | 4/2007 |
| WO | 2007042941 | A2 | 4/2007 |
| WO | 2007051163 | A2 | 5/2007 |
| WO | 2007131449 | A1 | 11/2007 |
| WO | 2007131450 | A1 | 11/2007 |
| WO | 2007141668 | A2 | 12/2007 |
| WO | 2008038144 | A2 | 4/2008 |
| WO | 2008108889 | A1 | 9/2008 |
| WO | 2008113420 | A1 | 9/2008 |
| WO | 2008121610 | A1 | 10/2008 |
| WO | 2009001082 | A1 | 12/2008 |
| WO | 2009015410 | A1 | 2/2009 |
| WO | 2009022232 | A2 | 2/2009 |
| WO | 2009079641 | A2 | 6/2009 |
| WO | 2009092862 | A1 | 7/2009 |
| WO | 2009118085 | A1 | 10/2009 |
| WO | 2009132793 | A1 | 11/2009 |
| WO | 2010045670 | A1 | 4/2010 |
| WO | 2010045671 | A1 | 4/2010 |
| WO | 2010073018 | A1 | 7/2010 |
| WO | 2010102832 | A1 | 9/2010 |
| WO | 2010107613 | A1 | 9/2010 |
| WO | 2010118644 | A1 | 10/2010 |
| WO | 2010133342 | A1 | 11/2010 |
| WO | 2010145468 | A1 | 12/2010 |
| WO | 2011045609 | A1 | 4/2011 |
| WO | 2011050943 | A1 | 5/2011 |
| WO | 2011050964 | A1 | 5/2011 |
| WO | 2011063970 | A1 | 6/2011 |
| WO | 2011068020 | A1 | 6/2011 |
| WO | 2011079932 | A1 | 7/2011 |
| WO | 2011109849 | A1 | 9/2011 |
| WO | 2011130414 | A1 | 10/2011 |
| WO | 2012014490 | A1 | 2/2012 |
| WO | 2012025496 | A1 | 3/2012 |
| WO | 2012027350 | A2 | 3/2012 |
| WO | 2013022936 | A1 | 2/2013 |
| WO | 2013034453 | A1 | 3/2013 |
| WO | 2013034454 | A1 | 3/2013 |
| WO | 2013034458 | A1 | 3/2013 |
| WO | 2013034459 | A1 | 3/2013 |
| WO | 2013034460 | A1 | 3/2013 |
| WO | 2013057185 | A1 | 4/2013 |
| WO | 2013082173 | A1 | 6/2013 |
| WO | 2013083635 | A1 | 6/2013 |
| WO | 2013083638 | A1 | 6/2013 |
| WO | 2013098395 | A1 | 7/2013 |
| WO | 2013113612 | A1 | 8/2013 |
| WO | 2013116558 | A1 | 8/2013 |
| WO | 2013116572 | A1 | 8/2013 |
| WO | 2013131764 | A1 | 9/2013 |
| WO | 2013144324 | A1 | 10/2013 |
| WO | 2013152873 | A1 | 10/2013 |
| WO | 2013160112 | A2 | 10/2013 |
| WO | 2014012906 | A1 | 1/2014 |
| WO | 2014023964 | A1 | 2/2014 |
| WO | 2014023967 | A1 | 2/2014 |
| WO | 2014045025 | A2 | 3/2014 |
| WO | 2014048745 | A1 | 4/2014 |
| WO | 2014061477 | A1 | 4/2014 |
| WO | 2014078745 | A1 | 5/2014 |
| WO | 2014104078 | A1 | 7/2014 |
| WO | 2014130695 | A1 | 8/2014 |
| WO | 2014139609 | A2 | 9/2014 |
| WO | 2014139611 | A1 | 9/2014 |
| WO | 2014140320 | A1 | 9/2014 |
| WO | 2014150131 | A1 | 9/2014 |
| WO | 2014187763 | A1 | 11/2014 |
| WO | 2014194510 | A1 | 12/2014 |
| WO | 2014201432 | A1 | 12/2014 |
| WO | 2015000974 | A1 | 1/2015 |
| WO | 2015019099 | A1 | 2/2015 |
| WO | 2015019101 | A1 | 2/2015 |
| WO | 2015066127 | A1 | 5/2015 |
| WO | 2015077645 | A1 | 5/2015 |
| WO | 2015082560 | A1 | 6/2015 |
| WO | 2015082648 | A1 | 6/2015 |
| WO | 2015082649 | A1 | 6/2015 |
| WO | 2015082651 | A1 | 6/2015 |
| WO | 2015082652 | A1 | 6/2015 |
| WO | 2015101479 | A1 | 7/2015 |
| WO | 2015114328 | A1 | 8/2015 |

(56) References Cited

FOREIGN PATENT DOCUMENTS

| | | | |
|---|---|---|---|
| WO | 2015116934 | A1 | 8/2015 |
| WO | 2015117702 | A1 | 8/2015 |
| WO | 2015131058 | A1 | 9/2015 |
| WO | 2015150068 | A1 | 10/2015 |
| WO | 2015165812 | A1 | 11/2015 |
| WO | 2015175568 | A1 | 11/2015 |
| WO | 2015176898 | A1 | 11/2015 |
| WO | 2015177043 | A1 | 11/2015 |
| WO | 2015177044 | A1 | 11/2015 |
| WO | 2015177045 | A1 | 11/2015 |
| WO | 2015177046 | A1 | 11/2015 |
| WO | 2015177253 | A1 | 11/2015 |
| WO | 2015177254 | A1 | 11/2015 |
| WO | 2015177255 | A1 | 11/2015 |
| WO | 2015177256 | A1 | 11/2015 |
| WO | 2015177257 | A1 | 11/2015 |
| WO | 2015177264 | A1 | 11/2015 |
| WO | 2015177265 | A1 | 11/2015 |
| WO | 2015198015 | A1 | 12/2015 |
| WO | 2016075436 | A1 | 5/2016 |
| WO | 2016090952 | A1 | 6/2016 |
| WO | 2016162446 | A1 | 10/2016 |
| WO | 2017001819 | A1 | 1/2017 |
| WO | 2017005705 | A1 | 1/2017 |
| WO | 2017036950 | A2 | 3/2017 |
| WO | 2017036951 | A1 | 3/2017 |
| WO | 2017036954 | A1 | 3/2017 |
| WO | 2017036955 | A2 | 3/2017 |
| WO | 2017036957 | A1 | 3/2017 |
| WO | 2017036959 | A1 | 3/2017 |
| WO | 2017072147 | A2 | 5/2017 |
| WO | 2017072148 | A1 | 5/2017 |
| WO | 2017109448 | A2 | 6/2017 |
| WO | 2017072147 | A3 | 7/2017 |
| WO | 2017198837 | A1 | 11/2017 |
| WO | 2017198876 | A1 | 11/2017 |

OTHER PUBLICATIONS

Office Action dated Mar. 22, 2019 for Korean Application No. 10-2018-7012422, 19 pages.
Office Action dated Mar. 22, 2019 for Korean Application No. 10-2018-7012428, 22 pages.
Office Action dated Sep. 22, 2017 for Russian Application No. 2014120213, 11 pages.
Office Action dated Jan. 23, 2019 for Korean Application No. 20187017575, 9 pages.
Office Action dated Jul. 23, 2019 for Japanese Application No. 2018-521928, 14 pages.
Office Action dated Jul. 23, 2019 for Japanese Application No. 2018-522061, 9 pages.
Office Action dated Jul. 23, 2019 for Russian Application No. 2019100154, 11 pages.
Office Action dated Apr. 24, 2019 for Chinese Application No. 201710412726.X, 21 pages.
Office Action dated Apr. 24, 2019 for Chinese Application No. 201710413187.1, 16 pages.
Office Action dated Jan. 24, 2019 for European Application No. 12750771.3, 40 pages.
Office Action dated Dec. 25, 2018 for Korean Application No. 10-2017-7037789, 18 pages.
Office Action dated Dec. 25, 2018 for Korean Application No. 10-2017-7037791, 22 pages.
Office Action dated Dec. 25, 2018 for Korean Application No. 10-2017-7037792, 24 pages.
Office Action dated Dec. 25, 2018 for Korean Application No. 10-2017-7037793, 24 pages.
Office Action dated Jan. 25, 2019 for European Application No. 12750771.3, 2 pages.
Office Action dated Jan. 25, 2019 for European Application No. 17189951.1, 4 pages.
Office Action dated Jun. 25, 2019 for Japanese Application No. 2018-519932, 5 pages.
Office Action dated Sep. 25, 2018 for European Application No. 12750765.5 filed Aug. 24, 2012, 22 pages.
Office Action dated Sep. 25, 2019 for Korean Application No. 10-2019-7026720, 17 pages.
Office Action dated Dec. 26, 2017 for Chinese Application No. 201480059966.0, 29 pages.
Office Action dated Oct. 26, 2016 for Russian Application No. 2014120213, 7 pages.
Office Action dated Sep. 26, 2018 for European Application No. 12750765.5 filed Aug. 24, 2012, 67 pages.
Office Action dated Sep. 26, 2019 for Korean Application No. 10-2018-7012353, 15 pages.
Office Action dated Dec. 27, 2019 for Chinese Application No. 201680049091, 25 pages.
Office Action dated Jul. 27, 2018 for Korean Application No. 10-2013-7033866, 22 pages.
Office Action dated Jun. 27, 2017 for Japanese Application No. 2016-527295, 8 pages.
Office Action dated Mar. 27, 2020 for Korean Application No. 10-2019-7026377, 16 pages.
Office Action dated Aug. 28, 2019 for Indian Application No. 201647014549, 6 pages.
Office Action dated Jul. 28, 2017 for Korean Application No. 10-2016-7010831, 11 pages.
Office Action dated Mar. 28, 2019 for Canadian Application No. 3003520, , 3 pages.
Office Action dated Mar. 29, 2019 for Korean Application No. 10-2018-7012366, 6 pages.
Office Action dated Oct. 29, 2018 for Russian Application No. 2018115542, 9 pages.
Office Action dated Sep. 29, 2015 for Japanese Application No. 2015-506185 filed Apr. 11, 2013, 5 pages.
Office Action dated Aug. 3, 2018 for Chinese Application No. 201580034981.4, 17 pages.
Office Action dated Dec. 30, 2016 for Chinese Application No. 201480024988.3, 26 pages.
Office Action dated Jan. 30, 2019 for Japanese Application No. 2017-568123, 6 pages.
Office Action dated Sep. 30, 2018 for Chinese Application No. 201610371843.1, 8 pages.
Office Action dated Jan. 31, 2017 for Japanese Application No. 2016-522550, 7 pages.
Office Action dated Mar. 31, 2015 for Japanese Application No. 2014-519585 filed Aug. 24, 2012, 8 pages.
Office Action dated Dec. 4, 2018 for Japanese Application No. 2016-575543, 19 pages.
Office Action dated Feb. 4, 2020 for Japanese Application No. 2018-507621, 29 pages.
Office Action dated Jul. 4, 2017 for Japanese Application No. 2016-522550, 7 pages.
Office Action dated May 4, 2018 for Chinese Application No. 201610086101.4, 7 pages.
Office Action dated Dec. 5, 2017 for Japanese Application No. 2016-564977, 6 pages.
Office Action dated Apr. 7, 2015 for Japanese Application No. 2014-519586 filed Aug. 24, 2012, 10 pages.
Office Action dated Feb. 7, 2019 for Korean Application No. 10-2018-7006076, 10 pages.
Office Action dated May 7, 2019 for Japanese Application No. 2018-507621, 8 pages.
Office Action dated Jan. 8, 2019 for Japanese Application No. 2017-568124, 8 pages.
Office Action dated Dec. 9, 2019 for Canadian Application No. 3003521, 6 pages.
Application and File History for U.S. Appl. No. 15/739,024, filed Dec. 21, 2017, Inventor: Fraser.
Application and File History for U.S. Appl. No. 15/739,029, filed Dec. 21, 2017, Inventor: Fraser.
Application and File History for U.S. Appl. No. 15/739,037, filed Dec. 21, 2017, Inventor: Fraser.

(56) References Cited

OTHER PUBLICATIONS

Application and File History for U.S. Appl. No. 15/739,045, filed Dec. 21, 2017, Inventor: Fraser.
Bsyedh, "Induction Heating," Apr. 5, 2011, Retrieved from https://www.e-cigarette-forum.com/forum/threads/induction-heatting.186526/ on Nov. 16, 2015, 2 pages.
Collier J.G. et al., "10.3 Mechanism of Evaporation and Condensation," Convective Boiling and Condensation, Third Edition, Clarendon Press, 1994, 6 pages.
Company Filtrona Richmond Inc., www.filtronaporoustechnologies.com, Nov. 19, 2018,1 page.
Concept Group, "New Super Insulator form Concept Group Stops Heat Conduction in Tight Spaces," https://www.businesswire.com/news/home/20110610006023/en/New-Super-Insulator-Concept-Group-Stops-Heat, 2011, 5 pages.
Concept Group, "Insulon Thermal Barrier from Concept Group Blocks Heat with Hyper-Deep Vacuum," Dec. 15, 2011,1 page.
Davies, et al., "Metallic Foams: Their Production, Properties and Applications," Journal of Materials Science, 1983, vol. 18(7), pp. 1899-1911.
Decision to Grant a Patent dated Nov. 15, 2016 for Japanese Application No. 2015-506185 filed Apr. 11, 2013, 5 pages.
Decision to Grant a Patent dated May 22, 2018 for Japanese Application No. 2016-134648, 5 pages.
Decision to Grant a Patent dated Apr. 23, 2019 for Japanese Application No. 2017-568122, 5 pages.
Decision to Grant for Russian Application No. 2019125736, dated Nov. 27, 2019, 12 pages.
Decision to Grant dated Apr. 1, 2014 for Russian Application No. 2011120430,16 pages.
Decision to Grant dated Jun. 19, 2019 for Russian Application No. 2019102061, 12 pages.
Decision to Grant dated Aug. 29, 2018 for Russian Application No. 2017145842, 12 pages.
Decision to Grant dated Aug. 5, 2014 for Japanese Application No. 2011-532464, 6 pages.
Diener Electronic, "Plasma Polymerization," The company Diener electronic GmbH+Co. KG, Retrieved on Oct. 17, 2017, 19 pages.
Dunn P.D., et al., "Heat Pipes," Fourth Edition, Pergamon, ISBN0080419038, 1994,14 pages.
Evokevape, "First Smart Vaporizer Powered by Induction," Retrieved from https://www.indiegogo.com/projects/evoke-firstsmart-vaporizer-powered-by-induction#/, 2017, 5 pages.
Examination Report for Australian Application No. 2016313708, dated Nov. 1, 2019, 7 pages.
Examination Report for Australian Application No. 2016313708, dated Nov. 23, 2018, 6 pages.
Examination Report for Indian Application No. 201747046549, dated Feb. 14, 2020, 8 pages.
Examination Report for Indian Application No. 201747046550, dated Jan. 9, 2020, 6 pages.
Examination Report for New Zealand Application No. 718007 dated Aug. 1, 2016,4 pages.
Examination Report dated Jan. 9, 2019 for Philippines Application No. 1/2016/500805, 6 pages.
Examination Report dated Feb. 21, 2018 for Australian Application No. 2016204192, 7 pages.
Extended European Search Report for Application No. 15178588, dated Apr. 14, 2016, 2 pages.
Extended European Search Report for Application No. 15200661.5, dated May 18, 2016, 6 pages.
Extended European Search Report for Application No. 16166656, dated Oct. 11, 2016, 9 pages.
Extended European Search Report for Application No. 17189951.1, dated Jan. 4, 2018,11 pages.
Extended European Search Report for Application No. 18157257.9, dated Jun. 28, 2018, 7 pages.
Extended European Search Report for Application No. 18205608.5, dated Jul. 12, 2019, 7 pages.
Extended European Search Report for Application No. 18214130.9, dated May 10, 2019, 44 pages.
Final Office Action dated Oct. 3, 2019 for U.S. Appl. No. 15/739,024, filed Dec. 21, 2017, 3 pages.
Final Office Action dated Apr. 10, 2020 for U.S. Appl. No. 15/739,024, filed Dec. 21, 2017, 3 pages.
Final Office Action dated Sep. 25, 2019 for U.S. Appl. No. 15/739,037, filed Dec. 21, 2017, 3 pages.
First Examination Report dated Sep. 19, 2018 for New Zealand Application No. 738318, 5 pages.
First Office Action dated Jun. 15, 2015 and Search Report dated Jun. 2, 2015 for Chinese Application No. 201280029784.X, filed Aug. 24, 2012, 27 pages.
First Office Action dated Dec. 3, 2012 for Chinese Application No. 200980152395.4,16 pages.
First Office Action dated Dec. 3, 2015 for Chinese Application No. 201380021387.2, filed Apr. 11, 2011, 20 pages.
Grundas S., "Advances in Induction and Microwave Heating of Mineral and Organic Materials, " Feb. 2011, 766 pages.
International Preliminary Report on Patentability for Application No. PCT/AT2012/000017, dated Aug. 13, 2013, 5 pages.
International Preliminary Report on Patentability for Application No. PCT/EP2012/066484, dated Mar. 20, 2014, 7 pages.
International Preliminary Report on Patentability for Application No. PCT/EP2012/066485, dated Dec. 20, 2013, 12 pages.
International Preliminary Report on Patentability for Application No. PCT/EP2012/066486, dated Oct. 22, 2013, 10 pages.
International Preliminary Report on Patentability for Application No. PCT/EP2012/066523, dated Nov. 4, 2013, 9 pages.
International Preliminary Report on Patentability for Application No. PCT/EP2012/066524, dated Oct. 17, 2013, 11 pages.
International Preliminary Report on Patentability for Application No. PCT/EP2012/066525, dated Mar. 20, 2014, 8 pages.
Office Action dated May 9, 2017 for Chinese Application No. 201480037049.2, 28 pages.
Office Action mailed for Japanese Application No. 2017-017842, dated Dec. 12, 2017, 6 pages.
Patio Kits Direct, "Insulated Roof Panels," DIY Alumawood Patio Cover Kits, dated Sep. 20, 2018, as available at https://www.patiokitsdirect.com/about-insulation, 2 pages.
Ramadan Q., et al., "Customized trapping of magnetic particles," 2009, 10 pages.
Response to Second Written Opinion for Application No. PCT/GB2016/051767, filed Mar. 26, 2018, 12 pages.
Rudolph G., "The Influence of CO2 on the Sensory Characteristics of the Favor-System," 1987, Accessed at http://legacy.library.ucsf.edu/tid/sld5f100, 24 pages.
Schmitt R., "Electromagnetics Explained: A Handbook for Wireless/RF, EMC, and High-Speed Electronics," Elsevier, 2002, 376 pages.
Search Report for Brazilian Patent Application No. 112017028541.0, dated Apr. 6, 2020, 4 pages.
Search Report dated Apr. 14, 2017 for Japanese Application No. 2016-134648, 31 pages.
Search Report dated Sep. 19, 2013 for Japanese Application No. 2011-532464, 116 pages.
Search Report dated Nov. 23, 2015 for Great Britain Application No. 1511349.1, 5 pages.
Search Report dated Nov. 23, 2015 for Great Britain Application No. 1511358.2, 3 pages.
Search Report dated Nov. 23, 2015 for Great Britain Application No. 1511359.0, 3 pages.
Search Report dated Nov. 23, 2015 for Great Britain Application No. 1511361.6, 5 pages.
Search Report dated Apr. 24, 2017 for Russian Application No. 2015146843, 3 pages.
Search Report dated Mar. 24, 2015 for Chinese Application No. 201280029767.6 filed Aug. 24, 2012, 6 pages.
Search Report dated Apr. 25, 2018 for Chinese Application No. 201610086101.4, 1 page.
Search Report dated Aug. 25, 2015 for Japanese Application No. 2014-179732,10 pages.
Search Report dated Oct. 25, 2017 for Japanese Application No. 2016-864977,19 pages.

(56) References Cited

OTHER PUBLICATIONS

Search Report dated Apr. 29, 2019 for Russian Application No. 2018137501,12 pages.
Second Office Action dated Jan. 16, 2017 for Chinese Application No. 201380048636.7, 24 pages.
Second Office Action dated Aug. 20, 2013 for Chinese Application No. 200980152395.4,16 pages.
Second Written Opinion for Application No. PCT/GB2016/051767, dated Jan. 25, 2018, 5 pages.
Submission in Opposition proceedings for the European Application No. EP16729350.5, filed Jul. 20, 2020, 17 pages.
Substantive Examination Report dated Oct. 25, 2019 for Malaysian Application No. PI2017704891, 2 pages.
Summons to Attend Oral Proceedings pursuant to Rule 115(1) EPC mailed Jan. 29, 2021 for European Application No. 16729350.5, 15 pages.
Tipler P.A., et al., "Physics for Scientists and Engineers," 2004, 5th edition, W.H. Freeman and Company, pp. 860-863.
Todaka T., et al., "Low Curie Temperature Material for Induction Heating Self-Temperature Controlling System," Journal of Magnetism and Magnetic Materials, vol. 320 (20), Oct. 2008, pp. e702-e707.
Translation of Office Action dated Mar. 25, 2019 for Chinese Application No. 201610804046.8,17 pages.
Warrier M., et al., "Effect of the Porous Structure of Graphite on Atomic Hydrogen Diffusion and Inventory," Nucl. Fusion, vol. 47, 2007, pp. 1656-1663.
Wikipedia, "Permeability (electromagnetism)," Jan. 1, 2020, retrieved from https://en.wikipedia.org/wiki/Permeability_(electromagnetism),10 pages.
Written Opinion for Application No. PCT/EP2012/066485, dated Oct. 15, 2013, 6 pages.
Written Opinion for Application No. PCT/EP2015/064595, dated Jan. 5, 2016, 11 pages.
Written Opinion for Application No. PCT/GB2015/051213, dated Jul. 16, 2015, 9 pages.
Written Opinion of the International Preliminary Examining Authority for Application No. PCT/EP2015/064595, dated Jun. 13, 2016, 8 pages.
Zinn S., et al., "Elements of Induction Heating: Design, Control and Applications", 1988, ASM International, Electric Power Research Institute, pp. 1, p. 245, 3 pages.
Korean Office Action, Application No. 1020197037986, dated Feb. 6, 2020,11 pages.
Kynol, "Standard Specifications of Kynol™ Activated Carbon Fiber Products," Sep. 19, 2013, 2 pages.
"LDC Target Design," Texas Instruments, May 2017, 13 pages.
Merriam-Webster, "Definition of Film", Retrieved from the Internet: https://www.merriam-webster.com/dictionary/ Film on Sep. 17, 2019,13 pages.
National Plastic Heater, Sensor and Control Inc., "Kapton (Polyimide) Flexible Heaters, " 2011, retrieved from https://www.kapton-silicone-flexible-heaters.com/products/kapton_polyimide_flexible_heaters.html on Feb. 23, 2018, 2 pages.
Neomax Materials Co., Ltd., "NeoMax MS-135," retrieved from http://www.neomax-materials.co.jp/eng/pr0510.htm, as accessed on Oct. 30, 2015, 2 pages.
Notice of Allowance dated Apr. 18, 2019 for Japanese Application No. 2017-568122, 2 pages.
Notice of Allowance dated Jun. 27, 2019 for Korean Application No. 10-2017-7037789, 4 pages.
Notice of Allowance dated Jun. 4, 2019 for Japanese Application No. 2017-568256, 5 pages.
Notice of Opposition dated Mar. 7, 2017 for European Application No. 12750770.5,22 pages.
Notice of Opposition for JT International SA, European Application No. 16731263.6, mailed on Mar. 11, 2020, 8 pages.
Notice of Opposition for Philip Morris Products SA, European Application No. 16731263.6, mailed on Mar. 11, 2020, 8 pages.
Notice of Opposition Letter from EPO Opposition against the European Application No. 2358418, mailed Mar. 1, 2017, 60 pages.
Notice of Opposition mailed Jan. 24, 2020 for European Application No. 16729350.5 filed Apr. 17, 2019, 77 pages.
Notice of Reasons for Rejection dated May 23, 2017 for Japanese Application No. 2016134648,18 pages.
Notice of Reasons for Rejection dated May 31, 2016 for Japanese Application No. 2015-137361, 6 pages.
Notice of Reasons for Rejection dated Oct. 7, 2013 for Japanese Application No. 2011532464, 6 pages.
Notice of Reasons for Rejection dated Sep. 8, 2015 for Japanese Application No. 2014179732, 5 pages.
Notification of Reasons for Refusal dated Feb. 5, 2019 for Japanese Patent Application No. 2017-568123, 6 pages.
Notification of Reasons for Refusal dated Apr. 28, 2020 for Japanese Patent Application No. 2019-088015, 21 pages.
Notification to Grant Patent Right for Invention dated Oct. 25, 2018 for Chinese Application No. 201610086101.4, 2 pages.
Office Action and Search Report for Russian Application No. 2018141286, dated Feb. 3, 2022, 12 pages.
Office Action and Search Report dated Sep. 16, 2019 for Chinese Application No. 201680038351.9, 12 pages.
Office Action and Search Report dated Apr. 27, 2015 for Chinese Application No. 201280030681.5, filed Aug. 24, 2012, 25 pages.
Office Action and Search Report dated Feb. 28, 2019 for Japanese Application No. 2018-088088, 25 pages.
Office Action and Search Report dated Sep. 29, 2019 for Chinese Application No. 201680038309.7, 25 pages.
Office Action and Search Report dated Sep. 30, 2019 for Chinese Application No. 201680038254X, 7 pages.
Office Action dated Jun. 25, 2019 for Japanese Application No. 2018-521546, 4 pages.
Office Action for Japanese Application No. 2019-184922, dated Aug. 12, 2020, 8 pages.
Office Action for Japanese Application No. 2019-184922, dated Dec. 8, 2020, 4 pages.
Office Action dated Jul. 4, 2018 for Russian Application No. 2018101312, 11 pages.
Office Action dated Apr. 5, 2019 for Korean Application No. 10-2018-7019884, 8 pages.
Office Action dated Sep. 6, 2017 for Korean Application No. 10-2017-7017425, 9 pages.
Office Action dated Sep. 6, 2017 for Korean Application No. 10-2017-7017430, 9 pages.
Office Action dated Jul. 8, 2016 for Chinese Application No. 201380021387.2, filed Apr. 11, 2011, 12 pages.
Office Action dated Mar. 1, 2019 for Canadian Application No. 2996341, 4 pages.
Office Action dated Dec. 11, 2019 for Brazilian Application No. BR1120180085138, 6 pages.
Office Action dated Jan. 11, 2019 for European Application No. 12750771.3, 44 pages.
Office Action dated May 11, 2018 for Korean Application No. 10-2017-7008071, 17 pages.
Office Action dated Sep. 11, 2017 for Chinese Application No. 201480024988.3, 10 pages.
Office Action dated May 12, 2017 for Russian Application No. 2016103729, filed Jul. 4, 2014, 15 pages.
Office Action dated Nov. 13, 2017 for Chinese Application No. 2013800472843, 13 pages.
Office Action dated Nov. 14, 2017 for Japanese Application No. 2016-522550, 6 pages.
Office Action dated Aug. 17, 2016 for Korean Application No. 10-2014-7032958, 13 pages.
Office Action dated Jan. 18, 2017 for Chinese Application No. 201480024978.X, 8 pages.
Office Action dated Jul. 18, 2018 for Chinese Application No. 201580022356.8, 15 pages.
Office Action dated Jun. 19, 2019 for Russian Application No. 2019100154, 6 pages.
Office Action dated Mar. 20, 2019 for Korean Application No. 10-2017-7008071, 2 pages.

(56) References Cited

OTHER PUBLICATIONS

Office Action dated Mar. 20, 2019 for Korean Application No. 10-2017-7008071, 3 pages.
Office Action dated Jul. 21, 2020 for European Application No. 16729350.5 filed Apr. 17, 2019, 17 pages.
International Preliminary Report on Patentability for Application No. PCT/EP2012/070647, dated on Apr. 22, 2014, 8 pages.
International Preliminary Report on Patentability for Application No. PCT/EP2014/063785, dated Jun. 1, 2015, 12 pages.
International Preliminary Report on Patentability for Application No. PCT/EP2014/072828, dated May 12, 2016, 7 pages.
International Preliminary Report on Patentability for Application No. PCT/EP2015/064595, dated Oct. 25, 2016, 20 pages.
International Preliminary Report on Patentability for Application No. PCT/EP2016/075735, dated Jan. 2, 2018, 3 pages.
International Preliminary Report on Patentability for Application No. PCT/EP2016/075737, dated May 11, 2018, 10 pages.
International Preliminary Report on Patentability for Application No. PCT/EP2016/075738, dated May 11, 2018, 9 pages.
International Preliminary Report on Patentability for Application No. PCT/GB2014/051332, dated Nov. 12, 2015, 7 pages.
International Preliminary Report on Patentability for Application No. PCT/GB2014/051333, dated Aug. 5, 2015, 12 pages.
International Preliminary Report on Patentability for Application No. PCT/GB2014/051334, dated Nov. 12, 2015, 7 pages.
International Preliminary Report on Patentability for Application No. PCT/GB2015/051213, dated Jul. 14, 2016, 20 pages.
International Preliminary Report on Patentability for Application No. PCT/GB2016/051730, dated May 23, 2017, 14 pages.
International Preliminary Report on Patentability for Application No. PCT/GB2016/051731, dated Jan. 11, 2018, 7 pages.
International Preliminary Report on Patentability for Application No. PCT/GB2016/051766, dated Sep. 29, 2017, 11 pages.
International Preliminary Report on Patentability for Application No. PCT/GB2016/051767, dated Apr. 18, 2018, 14 pages.
International Preliminary Report on Patentability for Application No. PCT/GB2017/051139, dated Aug. 6, 2018, 7 pages.
International Preliminary Report on Patentability for Application No. PCT/US2012/066523, dated Jun. 4, 2015, 6 pages.
International Search Report and Written Opinion for Application No. PCT/AT2012/000017, dated Jul. 3, 2012, 6 pages.
International Search Report and Written Opinion for Application No. PCT/EP2012/003103, dated Nov. 26, 2012, 6 pages.
International Search Report and Written Opinion for Application No. PCT/EP2012/066484, dated Jan. 9, 2013, 9 pages.
International Search Report and Written Opinion for Application No. PCT/EP2012/066485, dated Dec. 10, 2012, 10 pages.
International Search Report and Written Opinion for Application No. PCT/EP2012/066486, dated Jan. 14, 2013, 8 pages.
International Search Report and Written Opinion for Application No. PCT/EP2012/066523, dated Jan. 9, 2013, 9 pages.
International Search Report and Written Opinion for Application No. PCT/EP2012/066524, dated Jan. 9, 2013, 8 pages.
International Search Report and Written Opinion for Application No. PCT/EP2012/066525, dated Jan. 9, 2013, 10 pages.
International Search Report and Written Opinion for Application No. PCT/EP2012/070647, dated Feb. 6, 2013, 9 pages.
International Search Report and Written Opinion for Application No. PCT/EP2013/057539, dated Feb. 11, 2014, 16 pages.
International Search Report and Written Opinion for Application No. PCT/EP2014/063785, dated Oct. 30, 2014, 10 pages.
International Search Report and Written Opinion for Application No. PCT/EP2014/064365, dated Oct. 7, 2014, 11 pages.
International Search Report and Written Opinion for Application No. PCT/EP2014/072828, dated Jun. 16, 2015, 10 pages.
International Search Report and Written Opinion for Application No. PCT/EP2016/070190, dated Mar. 13, 2017, 19 pages.
International Search Report and Written Opinion for Application No. PCT/EP2016/075735, dated Feb. 2, 2017, 10 pages.
International Search Report and Written Opinion for Application No. PCT/EP2016/075736, dated Feb. 14, 2017, 6 pages.
International Search Report and Written Opinion for Application No. PCT/EP2016/075737, dated Jun. 16, 2017, 14 pages.
International Search Report and Written Opinion for Application No. PCT/EP2016/075738, dated Mar. 2, 2017, 12 pages.
International Search Report and Written Opinion for Application No. PCT/GB2014/051332, dated Jul. 21, 2014, 8 pages.
International Search Report and Written Opinion for Application No. PCT/GB2014/051333, dated Jul. 17, 2014, 10 pages.
International Search Report and Written Opinion for Application No. PCT/GB2014/051334, dated Jul. 21, 2014, 8 pages.
International Search Report and Written Opinion for Application No. PCT/GB2016/051730, dated Sep. 16, 2016, 13 pages.
International Search Report and Written Opinion for Application No. PCT/GB2016/051731, dated Sep. 20, 2016, 12 pages.
International Search Report and Written Opinion for Application No. PCT/GB2016/051766, dated Sep. 27, 2016, 9 pages.
International Search Report and Written Opinion for Application No. PCT/GB2016/051767, dated Sep. 21, 2017, 23 pages.
International Search Report and Written Opinion for Application No. PCT/GB2017/051139, dated Aug. 9, 2017, 14 pages.
International Search Report and Written Opinion for Application No. PCT/US2012/066523, dated May 29, 2013, 7 pages.
International Search Report and Written Opinion for Application No. PCT/AT2011/000123, dated Jul. 18, 2011, 8 pages.
International Search Report for Application No. PCT/AT2009/000413, dated Jan. 25, 2010, 3 pages.
International Search Report for Application No. PCT/AT2009/000414, dated Jan. 26, 2010, 2 pages.
International Search Report for Application No. PCT/EP2015/064595, dated Jan. 5, 2016, 6 pages.
International Search Report for Application No. PCT/GB2015/051213, dated Jul. 16, 2015, 5 pages.
Iorga A., et al., "Low Curie Temperature in Fe—Cr—Ni—Mn Alloys," U.P.B. Sci.Bull., Series B, vol. 73 (4), 2011, pp. 195-202.
"European Opposition Proceedings—Brief Communication, Application No. 16729350.5, dated Jul. 21, 2020" .
"Office Action received for Chinese Patent Application No. 2020105366749, dated Feb. 7, 2023".

* cited by examiner

-PRIOR ART-

-PRIOR ART-

-PRIOR ART-

ELECTRONIC AEROSOL PROVISION SYSTEMS

CROSS-REFERENCE TO RELATED APPLICATION

The present application is a continuation of U.S. application Ser. No. 15/739,029, filed Dec. 21, 2017, which is a National Phase entry of PCT Application No. PCT/GB2016/051730, filed Jun. 10, 2016, which claims priority from GB Patent Application No. 1511349.1, filed Jun. 29, 2015, each of which is fully incorporated herein by reference.

FIELD

The present disclosure relates to electronic aerosol provision systems such as electronic nicotine delivery systems (e.g. e-cigarettes).

BACKGROUND

FIG. 1 is a schematic diagram of one example of a conventional e-cigarette 10. The e-cigarette has a generally cylindrical shape, extending along a longitudinal axis indicated by dashed line LA, and comprises two main components, namely a control unit 20 and a cartomizer 30. The cartomizer 30 includes an internal chamber containing a reservoir of liquid formulation including nicotine, a vaporizer (such as a heater), and a mouthpiece 35. The cartomizer 30 may further include a wick or similar facility to transport a small amount of liquid from the reservoir to the heater. The control unit 20 includes a re-chargeable battery to provide power to the e-cigarette 10 and a circuit board for generally controlling the e-cigarette 10. When the heater receives power from the battery, as controlled by the circuit board, the heater vaporizes the nicotine and this vapor (aerosol) is then inhaled by a user through the mouthpiece 35.

The control unit 20 and cartomizer 30 are detachable from one another by separating in a direction parallel to the longitudinal axis LA, as shown in FIG. 1, but are joined together when the device 10 is in use by a connection, indicated schematically in FIG. 1 as 25A and 25B, to provide mechanical and electrical connectivity between the control unit 20 and the cartomizer 30. The electrical connector on the control unit 20 that is used to connect to the cartomizer 30 also serves as a socket for connecting a charging device (not shown) when the control unit 20 is detached from the cartomizer 30. The cartomizer 30 may be detached from the control unit 20 and disposed of when the supply of nicotine is exhausted (and replaced with another cartomizer if so desired).

FIGS. 2 and 3 provide schematic diagrams of the control unit 20 and cartomizer 30 respectively of the e-cigarette 10 of FIG. 1. Note that various components and details, e.g. such as wiring and more complex shaping, have been omitted from FIGS. 2 and 3 for reasons of clarity. As shown in FIG. 2, the control unit 20 includes a battery or cell 210 for powering the e-cigarette 10, as well as a chip, such as a (micro) controller for controlling the e-cigarette 10. The controller is attached to a small printed circuit board (PCB) 215 that also includes a sensor unit. If a user inhales on the mouthpiece 35, air is drawn into the e-cigarette 10 through one or more air inlet holes (not shown in FIGS. 1 and 2). The sensor unit detects this airflow, and in response to such a detection, the controller provides power from the battery 210 to the heater in the cartomizer 30.

As shown in FIG. 3, the cartomizer 30 includes an air passage 161 extending along the central (longitudinal) axis LA of the cartomizer 30 from the mouthpiece 35 to the connector 25A for joining the cartomizer 30 to the control unit 20. A reservoir of nicotine-containing liquid 170 is provided around the air passage 161. This reservoir 170 may be implemented, for example, by providing cotton or foam soaked in the liquid. The cartomizer 30 also includes a heater 155 in the form of a coil for heating liquid from reservoir 170 to generate vapor to flow through air passage 161 and out through mouthpiece 35. The heater is powered through lines 166 and 167, which are in turn connected to opposing polarities (positive and negative, or vice versa) of the battery 210 via connector 25A.

One end of the control unit 20 provides a connector 25B for joining the control unit 20 to the cartomizer connector 25A of the cartomizer 30. The connectors 25A and 25B provide mechanical and electrical connectivity between the control unit 20 and the cartomizer 30. The connector 25B includes two electrical terminals, an outer contact 240 and an inner contact 250, which are separated by insulator 260. The connector 25A likewise includes an inner electrode 175 and an outer electrode 171, separated by insulator 172. When the cartomizer 30 is connected to the control unit 20, the inner electrode 175 and the outer electrode 171 of the cartomizer 30 engage the inner contact 250 and the outer contact 240 respectively of the control unit 20. The inner contact 250 is mounted on a coil spring 255 so that the inner electrode 175 pushes against the inner contact 250 to compress the coil spring 255, thereby helping to ensure good electrical contact when the cartomizer 30 is connected to the control unit 20.

The cartomizer connector 25A is provided with two lugs or tabs 180A, 180B, which extend in opposite directions away from the longitudinal axis LA of the e-cigarette 10. These tabs are used to provide a bayonet fitting for connecting the cartomizer 30 to the control unit 20. It will be appreciated that other embodiments may use a different form of connection between the control unit 20 and the cartomizer 30, such as a snap fit or a screw connection.

As mentioned above, the cartomizer 30 is generally disposed of once the liquid reservoir 170 has been depleted, and a new cartomizer is purchased and installed. In contrast, the control unit 20 is re-usable with a succession of cartomizers 30. Accordingly, it is particularly desirable to keep the cost of the cartomizer 30 relatively low. One approach to doing this has been to construct a three-part device, based on (i) a control unit, (ii) a vaporizer component, and (iii) a liquid reservoir. In this three-part device, only the final part, the liquid reservoir, is disposable, whereas the control unit and the vaporizer are both re-usable. However, having a three-part device can increase the complexity, both in terms of manufacture and user operation. Moreover, it can be difficult in such a three-part device to provide a wicking arrangement of the type shown in FIG. 3 to transport liquid from the reservoir to the heater.

Another approach is to make the cartomizer 30 re-fillable, so that it is no longer disposable. However, making a cartomizer 30 re-fillable brings potential problems, for example, a user may try to re-fill the cartomizer 30 with an inappropriate liquid (one not provided by the supplier of the e-cigarette). There is a risk that this inappropriate liquid may result in a low quality consumer experience, and/or may be potentially hazardous, whether by causing damage to the e-cigarette itself, or possibly by creating toxic vapors.

Accordingly, existing approaches for reducing the cost of a disposable component (or for avoiding the need for such a disposable component) have met with only limited success.

SUMMARY

The invention is defined in the appended claims.

According to a first aspect of certain embodiments there is provided an aerosol provision system for generating an aerosol from a source liquid, the aerosol provision system comprising: a reservoir of source liquid; a planar vaporizer comprising a planar heating element, wherein the vaporizer is configured to draw source liquid from the reservoir to the vicinity of a vaporizing surface of the vaporizer through capillary action; and an induction heater coil operable to induce current flow in the heating element to inductively heat the heating element and so vaporize a portion of the source liquid in the vicinity of the vaporizing surface of the vaporizer.

According to a second aspect of certain embodiments there is provided a cartridge for use in an aerosol provision system for generating an aerosol from a source liquid, the cartridge comprising: a reservoir of source liquid; and a planar vaporizer comprising a planar heating element, wherein the vaporizer is configured to draw source liquid from the reservoir to the vicinity of a vaporizing surface of the vaporizer through capillary action, and wherein the planar heating element is susceptible to induced current flow from an induction heater coil of the aerosol provision system to inductively heat the heating element and so vaporize a portion of the source liquid in the vicinity of the vaporizing surface of the vaporizer.

According to a third aspect of certain embodiments there is provided an aerosol provision system for generating an aerosol from a source liquid, the aerosol provision system comprising: source liquid storage means; vaporizer means comprising planar heating element means, wherein the vaporizer means is for drawing source liquid from the source liquid storage means to the planar heating element means through capillary action; and induction heater means for inducing current flow in the planar heating element means to inductively heat the planar heating element means and so vaporize a portion of the source liquid in the vicinity of the planar heating element means.

According to a fourth aspect of certain embodiments there is provided a method of generating an aerosol from a source liquid, the method comprising: providing: a reservoir of source liquid and a planar vaporizer comprising a planar heating element, wherein the vaporizer draws source liquid from the reservoir to the vicinity of a vaporizing surface of the vaporizer by capillary action; and driving an induction heater coil to induce current flow in the heating element to inductively heat the heating element and so vaporize a portion of the source liquid in the vicinity of the vaporizing surface of the vaporizer.

It will be appreciated that features and aspects of the invention described above in relation to the first and other aspects of the invention are equally applicable to, and may be combined with, embodiments of the invention according to other aspects of the invention as appropriate, and not just in the specific combinations described above.

BRIEF DESCRIPTION OF THE DRAWINGS

Embodiments of the disclosure will now be described, by way of example only, with reference to the accompanying drawings, in which.

DETAILED DESCRIPTION

Aspects and features of certain examples and embodiments are discussed/described herein. Some aspects and features of certain examples and embodiments may be implemented conventionally and these are not discussed/described in detail in the interests of brevity. It will thus be appreciated that aspects and features of apparatus and methods discussed herein which are not described in detail may be implemented in accordance with any conventional techniques for implementing such aspects and features.

As described above, the present disclosure relates to an aerosol provision system, such as an e-cigarette. Throughout the following description the term "e-cigarette" is sometimes used but this term may be used interchangeably with aerosol (vapor) provision system.

Figure 4:
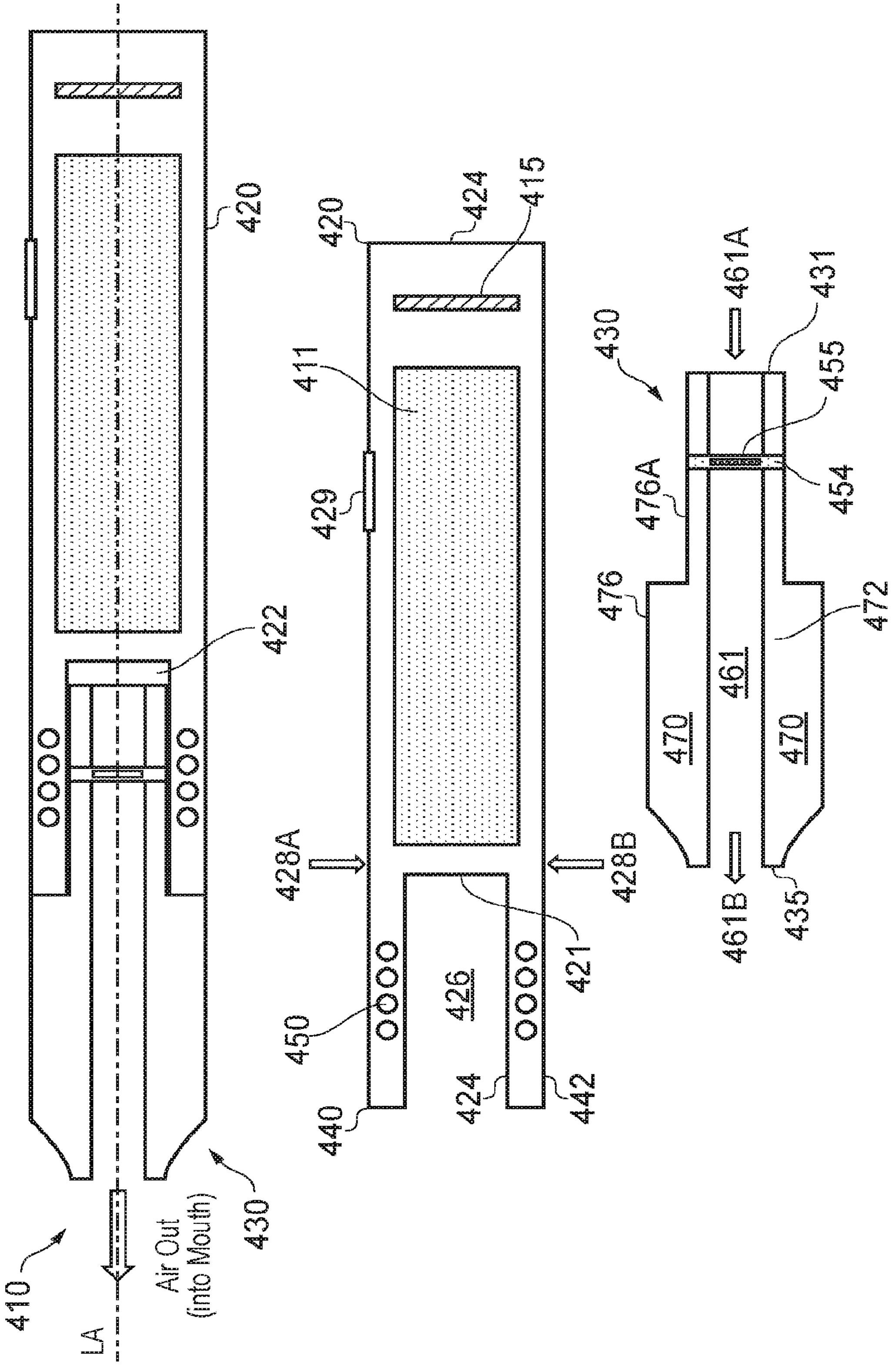
FIG. 4 is a schematic diagram illustrating an e-cigarette in accordance with some embodiments of the invention, showing the control unit assembled with the cartridge (top), the control unit by itself (middle), and the cartridge by itself (bottom).

FIG. 4 is a schematic diagram illustrating an e-cigarette 410 in accordance with some embodiments of the disclosure (please note that the term e-cigarette is used herein interchangeably with other similar terms, such as electronic vapor provision system, electronic aerosol provision system, etc.). The e-cigarette 410 includes a control unit 420 and a cartridge 430. FIG. 4 shows the control unit 420 assembled with the cartridge 430 (top), the control unit 420 by itself (middle), and the cartridge 430 by itself (bottom). Note that for clarity, various implementation details (e.g. such as internal wiring, etc.) are omitted.

As shown in FIG. 4, the e-cigarette 410 has a generally cylindrical shape with a central, longitudinal axis (denoted as LA, shown in dashed line). Note that the cross-section through the cylinder, i.e. in a plane perpendicular to the line LA, may be circular, elliptical, square, rectangular, hexagonal, or some other regular or irregular shape as desired.

The mouthpiece 435 is located at one end of the cartridge 430, while the opposite end of the e-cigarette 410 (with respect to the longitudinal axis) is denoted as the tip end 424. The end of the cartridge 430 which is longitudinally opposite to the mouthpiece 435 is denoted by reference numeral 431, while the end of the control unit 420 which is longitudinally opposite to the tip end 424 is denoted by reference numeral 421.

The cartridge 430 is able to engage with and disengage from the control unit 420 by movement along the longitudinal axis LA. More particularly, the end 431 of the cartridge 430 is able to engage with, and disengage from, the end 421 of the control unit 420. Accordingly, from this point forward ends 421 and 431 will be referred to as the control unit engagement end and the cartridge engagement end, respectively.

The control unit 420 includes a battery 411 and a circuit board 415 to provide control functionality for the e-cigarette 410, e.g. by provision of a controller, processor, application-specific integrated circuit (ASIC) or similar form of control chip. The battery 411 is typically cylindrical in shape, and has a central axis that lies along, or at least close to, the longitudinal axis LA of the e-cigarette 410. In FIG. 4, the circuit board 415 is shown longitudinally spaced from the battery 411, in the opposite direction to the cartridge 430. However, the skilled person will be aware of various other locations for the circuit board 415, for example, it may be at the opposite end of the battery 411. A further possibility is that the circuit board 415 lies along the side of the battery 411—for example, with the e-cigarette 410 having a rectangular cross-section, the circuit board 415 located adjacent one outer wall of the e-cigarette 410, and the battery 411 then slightly offset towards the opposite outer wall of the e-cigarette 410. Note also that the functionality provided by the circuit board 415 (as described in more detail below) may be split across multiple circuit boards and/or across devices which are not mounted to a PCB, and these additional devices and/or PCBs can be located as appropriate within the e-cigarette 410.

The battery or cell 411 is generally re-chargeable, and one or more re-charging mechanisms may be supported. For example, a charging connection (not shown in FIG. 4) may be provided at the tip end 424, and/or the control unit engagement end 421, and/or along the side of the e-cigarette 410. Moreover, the e-cigarette 410 may support induction re-charging of battery 411, in addition to (or instead of) re-charging via one or more re-charging connections or sockets.

The control unit 420 includes a tube portion 440, which extends along the longitudinal axis LA away from the control unit engagement end 421 of the control unit 420. The tube portion 440 is defined on the outside by outer wall 442, which may generally be part of the overall outer wall or housing of the control unit 420, and on the inside by inner wall 444. A cavity 426 is formed by inner wall 444 of the tube portion and the control unit engagement end 421 of the control unit 420. This cavity 426 is able to receive and accommodate at least part of a cartridge 430 as it engages with the control unit 420 (as shown in the top drawing of FIG. 4).

The inner wall 444 and the outer wall 442 of the tube portion 440 define an annular space which is formed around the longitudinal axis LA. A coil 450, which may be a drive coil or a work coil, is located within this annular space, with the central axis of the coil 450 being substantially aligned with the longitudinal axis LA of the e-cigarette 410. The coil 450 is electrically connected to the battery 411 and circuit board 415, which provide power and control to the coil 450, so that in operation, the coil 450 is able to provide induction heating to the cartridge 430.

The cartridge 430 includes a reservoir 470 containing liquid formulation (typically including nicotine). The reservoir 470 comprises a substantially annular region of the cartridge 430, formed between an outer wall 476 of the cartridge 430, and an inner tube or wall 472 of the cartridge 430, both of which are substantially aligned with the longitudinal axis LA of the e-cigarette 410. The liquid formulation may be held free within the reservoir 470, or alternatively the reservoir 470 may incorporated in some structure or material, e.g. sponge, to help retain the liquid within the reservoir 470.

The outer wall 476 has a portion 476A of reduced cross-section of the cartridge 430. This allows this portion 476A of reduced cross-section of the cartridge 430 to be received into the cavity 426 in the control unit 420 in order to engage the cartridge 430 with the control unit 420. The remainder of the outer wall 476 has a greater cross-section in order to provide increased space within the reservoir 470, and also to provide a continuous outer surface for the e-cigarette 410—i.e. outer wall 476 is substantially flush with the outer wall 442 of the tube portion 440 of the control unit 420. However, it will be appreciated that other implementations of the e-cigarette 410 may have a more complex/structured outer surface 476 (compared with the smooth outer surface shown in FIG. 4).

The inside of the inner tube 472 defines a passageway 461 which extends, in a direction of airflow, from air inlet 461A (located at the cartridge engagement end 431 of the cartridge 430 that engages the control unit 420) through to air outlet 461B, which is provided by the mouthpiece 435. Located within the central passageway 461, and hence within the airflow through the cartridge 430, are heater 455 and wick 454. As can be seen in FIG. 4, the heater 455 is located approximately in the center of the coil 450. In particular, the location of the heater 455 along the longitudinal axis LA can be controlled by having the step at the start of the portion 476A of reduced cross-section for the cartridge 430 abut against the end (nearest the mouthpiece 435) of the tube portion 440 of the control unit 420 (as shown in the top diagram of FIG. 4).

The heater 455 is made of a metallic material so as to permit use as a susceptor (or workpiece) in an induction heating assembly. More particularly, the induction heating assembly comprises the coil 450, which as a drive (work) coil produces a magnetic field having high frequency variations (when suitably powered and controlled by the battery 411 and controller on PCB 415). This magnetic field is strongest in the center of the coil 450, i.e. within cavity 426, where the heater 455 is located. The changing magnetic field induces eddy currents in the heater 455, thereby causing resistive heating within the heater element 455. Note that the high frequency of the variations in magnetic field causes the eddy currents to be confined to the surface of the heater 455 (via the skin effect), thereby increasing the effective resistance of the heater 455, and hence the resulting heating effect.

Furthermore, the heater 455 is generally selected to be a magnetic material having a high permeability, such as (ferrous) steel (rather than just a conductive material). In this case, the resistive losses due to eddy currents are supplemented by magnetic hysteresis losses (caused by repeated flipping of magnetic domains) to provide more efficient transfer of power from the coil 450 to the heater 455.

The heater 455 is at least partly surrounded by wick 454. Wick 454 serves to transport liquid from the reservoir 470 onto the heater 455 for vaporization. The wick 454 may be made of any suitable material, for example, a heat-resistant, fibrous material and typically extends from the passageway 461 through holes in the inner tube 472 to gain access into the reservoir 470. The wick 454 is arranged to supply liquid to the heater 455 in a controlled manner, in that the wick 454 prevents the liquid leaking freely from the reservoir 470 into passageway 461 (this liquid retention may also be assisted by having a suitable material within the reservoir 470 itself). Instead, the wick 454 retains the liquid within the reservoir 470, and on the wick 454 itself, until the heater 455 is activated, whereupon the liquid held by the wick 454 is vaporized into the airflow, and hence travels along passageway 461 for exit via mouthpiece 435. The wick 454 then draws further liquid into itself from the reservoir 470, and the process repeats with subsequent vaporizations (and inhalations) until the cartridge 430 is depleted.

Although the wick 454 is shown in FIG. 4 as separate from (albeit encompassing) the heater 455, in some implementations, the heater 455 and wick 454 may be combined together into a single component, such as a heater 455 made of a porous, fibrous steel material which can also act as a wick 454 (as well as a heater). In addition, although the wick 454 is shown in FIG. 4 as supporting the heater 455, in other embodiments, the heater 455 may be provided with separate supports, for example, by being mounted to the inside of tube 472 (instead of or in addition to being supported by the heater 455).

The heater 455 may be substantially planar, and perpendicular to the central axis of the coil 450 and the longitudinal axis LA of the e-cigarette 410, since induction primarily occurs in this plane. Although FIG. 4 shows the heater 455 and wick 454 extending across the full diameter of the inner tube 472, typically the heater 455 and wick 454 will not cover the whole cross-section of the air passageway 461. Instead, space is typically provided to allow air to flow through the inner tube from inlet 461A and around heater 455 and wick 454 to pick up the vapor produced by the heater 455. For example, when viewed along the longitudinal axis LA, the heater 455 and wick 454 may have an "O" configuration with a central hole (not shown in FIG. 4) to allow for airflow along the passageway 461. Many other configurations are possible, such as the heater 455 having a "Y" or "X" configuration. (Note that in such implementations, the arms of the "Y" or "X" would be relatively broad to provide better induction.)

Although FIG. 4 shows the cartridge engagement end 431 of the cartridge 430 as covering the air inlet 461A, this end of the cartridge 430 may be provided with one or more holes (not shown in FIG. 4) to allow the desired air intake to be drawn into passageway 461. Note also that in the configuration shown in FIG. 4, there is a slight gap 422 between the cartridge engagement end 431 of the cartridge 430 and the corresponding control unit engagement end 421 of the control unit 420. Air can be drawn from this gap 422 through air inlet 461A.

The e-cigarette 410 may provide one or more routes to allow air to initially enter the gap 422. For example, there may be sufficient spacing between the outer wall 476A of the cartridge 430 and the inner wall 444 of tube portion 440 to allow air to travel into gap 422. Such spacing may arise naturally if the cartridge 430 is not a tight fit into the cavity 426. Alternatively one or more air channels may be provided as slight grooves along one or both of these walls to support this airflow. Another possibility is for the housing of the control unit 420 to be provided with one or more holes, firstly to allow air to be drawn into the control unit 420, and then to pass from the control unit 420 into gap 422. For example, the holes for air intake into the control unit 420 might be positioned as indicated in FIG. 4 by arrows 428A and 428B, and control unit engagement end 421 might be provided with one or more holes (not shown in FIG. 4) for the air to pass out from the control unit 420 into gap 422 (and from there into the cartridge 430). In other implementations, gap 422 may be omitted, and the airflow may, for example, pass directly from the control unit 420 through the air inlet 461A into the cartridge 430.

The e-cigarette 410 may be provided with one or more activation mechanisms for the induction heater assembly, i.e. to trigger operation of the coil 450 to heat the heater 455. One possible activation mechanism is to provide a button 429 on the control unit 420, which a user may press to active the heater 455. This button may be a mechanical device, a touch sensitive pad, a sliding control, etc. The heater 455 may stay activated for as long as the user continues to press or otherwise positively actuate the button 429, subject to a maximum activation time appropriate to a single puff of the e-cigarette 410 (typically a few seconds). If this maximum activation time is reached, the controller may automatically de-activate the heater 455 to prevent over-heating. The controller may also enforce a minimum interval (again, typically for a few seconds) between successive activations.

The induction heater assembly may also be activated by airflow caused by a user inhalation. In particular, the control unit 420 may be provided with an airflow sensor for detecting an airflow (or pressure drop) caused by an inhalation. The airflow sensor is then able to notify the controller of this detection, and the heater 455 is activated accordingly. The heater 455 may remain activated for as long as the airflow continues to be detected, subject again to a maximum activation time as above (and typically also a minimum interval between puffs).

Airflow actuation of the heater 455 may be used instead of providing button 429 (which could therefore be omitted), or alternatively the e-cigarette 410 may require dual activation in order to operate—i.e. both the detection of airflow and the pressing of button 429. This requirement for dual activation can help to provide a safeguard against unintended activation of the e-cigarette 410.

It will be appreciated that the use of an airflow sensor generally involves an airflow passing through the control unit 420 upon inhalation, which is amenable to detection (even if this airflow only provides part of the airflow that the user ultimately inhales). If no such airflow passes through the control unit 420 upon inhalation, then button 429 may be used for activation, although it might also be possible to provide an airflow sensor to detect an airflow passing across a surface of (rather than through) the control unit 420.

There are various ways in which the cartridge 430 may be retained within the control unit 420. For example, the inner wall 444 of the tube portion 440 of the control unit 420 and the outer wall of reduced cross-section 476A may each be provided with a screw thread (not shown in FIG. 4) for mutual engagement. Other forms of mechanical engagement, such as a snap fit, a latching mechanism (perhaps with a release button or similar) may also be used. Furthermore, the control unit 420 may be provided with additional components to provide a fastening mechanism, such as described below.

Figure 1:
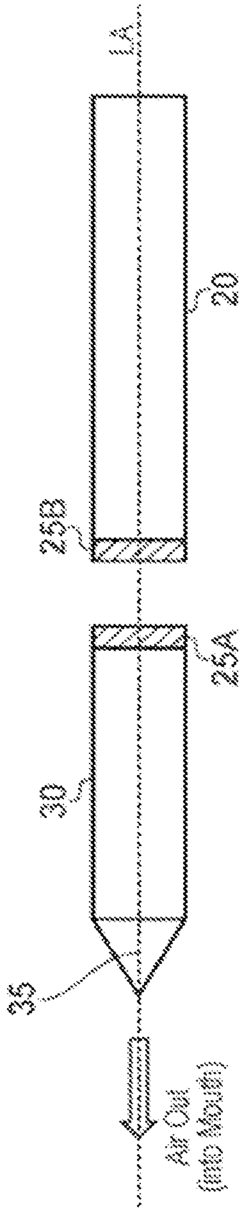
FIG. 1 is a schematic (exploded) diagram illustrating an example of a known e-cigarette.
Figure 2:
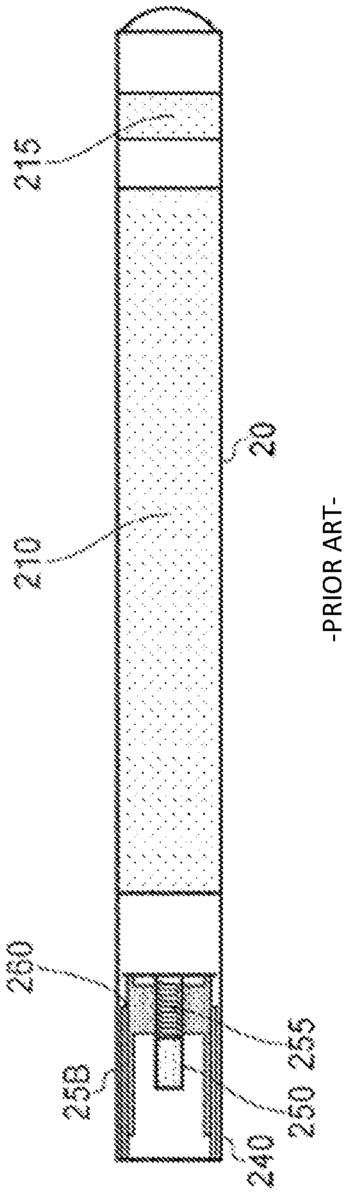
FIG. 2 is a schematic diagram of the control unit of the e-cigarette of FIG. 1.
Figure 3:
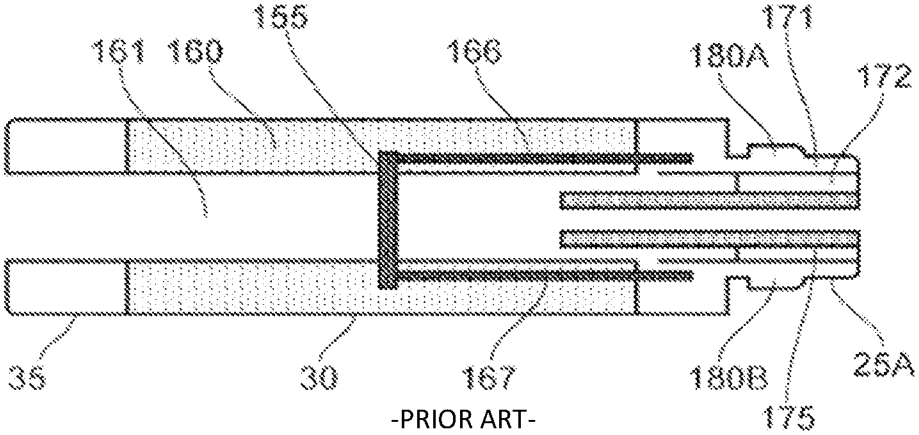
FIG. 3 is a schematic diagram of the cartomizer of the e-cigarette of FIG. 1.

In general terms, the attachment of the cartridge 430 to the control unit 420 for the e-cigarette 410 of FIG. 4 is simpler than in the case of the e-cigarette 10 shown in FIGS. 1-3. In particular, the use of induction heating for e-cigarette 410 allows the connection between the cartridge 430 and the control unit 420 to be mechanical only, rather than also having to provide an electrical connection with wiring to a resistive heater. Consequently, the mechanical connection may be implemented, if so desired, by using an appropriate plastic molding for the housing of the cartridge 430 and the control unit 420; in contrast, in the e-cigarette 10 of FIGS. 1-3, the housings of the cartomizer 30 and the control unit 20 have to be somehow bonded to a metal connector. Furthermore, the connector of the e-cigarette 10 of FIGS. 1-3 has to be made in a relatively precise manner to ensure a reliable, low contact resistance, electrical connection between the control unit 20 and the cartomizer 30. In contrast, the manufacturing tolerances for the purely mechanical connection between the cartridge 430 and the control unit 420 of e-cigarette 410 are generally greater. These factors all help to simplify the production of the cartridge 430 and thereby to reduce the cost of this disposable (consumable) component.

Furthermore, conventional resistive heating often utilizes a metallic heating coil surrounding a fibrous wick, however, it is relatively difficult to automate the manufacture of such a structure. In contrast, an inductive heating element is typically based on some form of metallic disk (or other substantially planar component), which is an easier structure to integrate into an automated manufacturing process. This again helps to reduce the cost of production for the disposable cartridge 430.

Another benefit of inductive heating is that conventional e-cigarettes may use solder to bond power supply wires to a resistive heater coil. However, there is some concern that heat from the coil during operation of such an e-cigarette might volatize undesirable components from the solder, which would then be inhaled by a user. In contrast, there are no wires to bond to the inductive heater element, and hence the use of solder can be avoided within the cartridge. Also, a resistive heater coil as in a conventional e-cigarette generally comprises a wire of relatively small diameter (to increase the resistance and hence the heating effect). However, such a thin wire is relatively delicate and so may be susceptible to damage, whether through some mechanical mistreatment and/or potentially by local overheating and then melting. In contrast, a disk-shaped heater element as used for induction heating is generally more robust against such damage.

Figure 5:
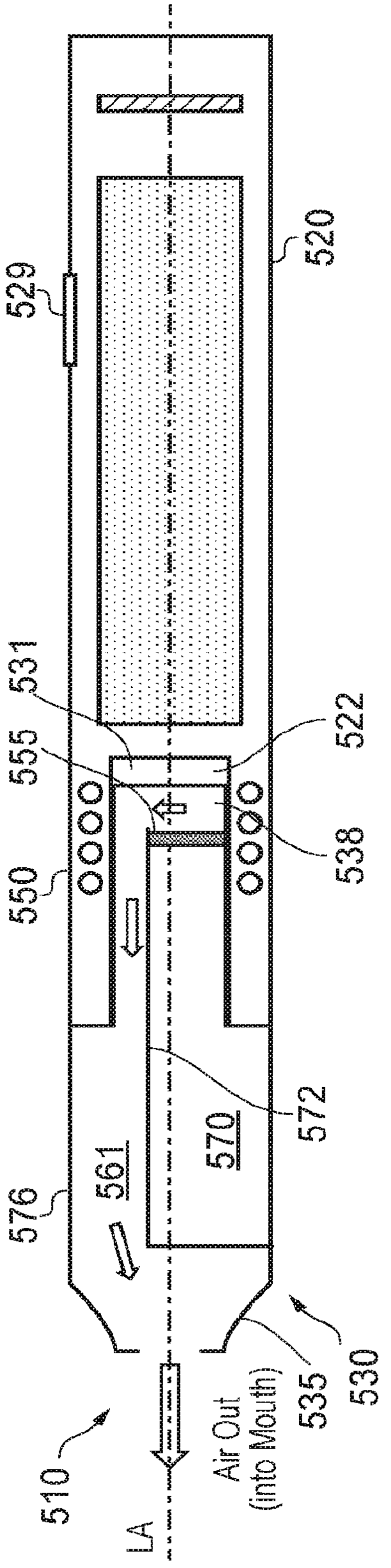
FIGS. 5 and 6 are schematic diagrams illustrating an e-cigarette in accordance with some other embodiments of the disclosure.
Figure 6:
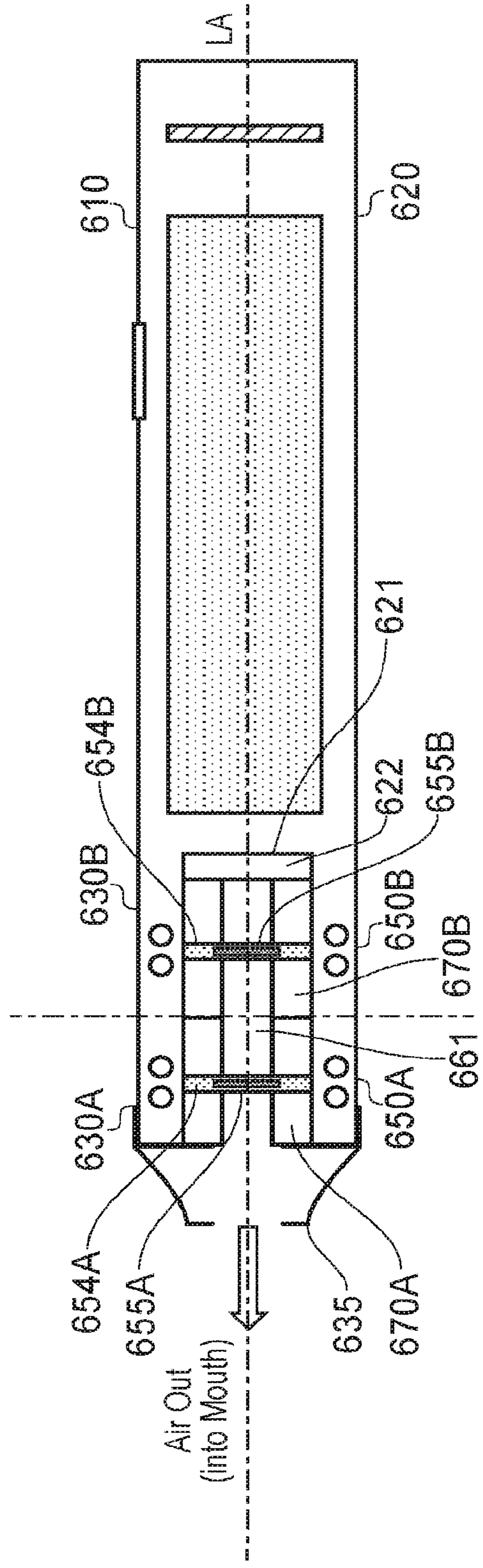

FIGS. 5 and 6 are schematic diagrams illustrating an e-cigarette 510 in accordance with some other embodiments of the disclosure. To avoid repetition, aspects of FIGS. 5 and 6 that are generally the same as shown in FIG. 4 will not be described again, except where relevant to explain the particular features of FIGS. 5 and 6. Note also that reference numbers having the same last two digits typically denote the same or similar (or otherwise corresponding) components across FIGS. 4 to 6 (with the first digit in the reference number corresponding to the Figure containing that reference number).

In the e-cigarette 510 shown in FIG. 5, the control unit 520 is broadly similar to the control unit 420 shown in FIG. 4, however, the internal structure of the cartridge 530 is somewhat different from the internal structure of the cartridge 430 shown in FIG. 4. Thus rather than having a central airflow passage, as for e-cigarette 410 of FIG. 4, in which the liquid reservoir 470 surrounds the central airflow passage 461, in the e-cigarette 510 of FIG. 5, the air passageway 561 is offset from the central, longitudinal axis (LA) of the cartridge. In particular, the cartridge 530 contains an internal wall 572 that separates the internal space of the cartridge 530 into two portions. A first portion, defined by internal wall 572 and one part of external wall 576, provides a chamber for holding the reservoir 570 of liquid formulation. A second portion, defined by internal wall 572 and an opposing part of external wall 576, defines the air passage way 561 through the e-cigarette 510.

In addition, the e-cigarette 510 does not have a wick, but rather relies upon a porous heater element 555 to act both as the heating element (susceptor) and the wick to control the flow of liquid out of the reservoir 570. The porous heater element 555 may be made, for example, of a material formed from sintering or otherwise bonding together steel fibers.

The heater element 555 is located at the end of the reservoir 570 opposite to the mouthpiece 535 of the cartridge 530, and may form some or all of the wall of the reservoir 570 chamber at this end. One face of the heater element 555 is in contact with the liquid in the reservoir 570, while the opposite face of the heater element 555 is exposed to an airflow region 538 which can be considered as part of air passageway 561. In particular, this airflow region 538 is located between the heater element 555 and the engagement end 531 of the cartridge 530.

When a user inhales on mouthpiece 435, air is drawn into the region 538 through the engagement end 531 of the cartridge 530 from gap 522 (in a similar manner to that described for the e-cigarette 410 of FIG. 4). In response to the airflow (and/or in response to the user pressing button 529), the coil 550 is activated to supply power to heater 555, which therefore produces a vapor from the liquid in reservoir 570. This vapor is then drawn into the airflow caused by the inhalation, and travels along the passageway 561 (as indicated by the arrows) and out through mouthpiece 535.

In the e-cigarette 610 shown in FIG. 6, the control unit 620 is broadly similar to the control unit 420 shown in FIG. 4, but now accommodates two (smaller) cartridges 630A, and 630B. Each of these cartridges 630A, 630B is analogous in structure to the reduced cross-section portion 476A of the cartridge 420 in FIG. 4. However, the longitudinal extent of each of the cartridges 630A and 630B is only half that of the reduced cross-section portion 476A of the cartridge 420 in FIG. 4, thereby allowing two cartridges 630A, 630B to be contained within the region in e-cigarette 610 corresponding to cavity 426 in e-cigarette 410, as shown in FIG. 4. In addition, the engagement end 621 of the control unit 620 may be provided, for example, with one or more struts or tabs (not shown in FIG. 6) that maintain cartridges 630A, 630B in the position shown in FIG. 6 (rather than closing the gap region 622).

In the e-cigarette 610, the mouthpiece 635 may be regarded as part of the control unit 620. In particular, the mouthpiece 635 may be provided as a removable cap or lid, which can screw or clip onto and off the remainder of the control unit 620 (or any other appropriate fastening mechanism can be used). The mouthpiece cap 635 is removed from the rest of the control unit 635 to insert a new cartridge or to remove an old cartridge, and then fixed back onto the control unit for use of the e-cigarette 610.

The operation of the individual cartridges 630A, 630B in e-cigarette 610 is similar to the operation of cartridge 430 in e-cigarette 410, in that each cartridge 630A, 630B includes a wick 654A, 654B extending into the respective reservoir 670A, 670B. In addition, each cartridge 630A, 630B includes a heating element, 655A, 655B, accommodated in a respective wick, 654A, 654B, and may be energized by a respective coil 650A, 650B provided in the control unit 620. The heaters 655A, 655B vaporize liquid into a common passageway 661 that passes through both cartridges 630A, 630B and out through mouthpiece 635.

The different cartridges 630A, 630B may be used, for example, to provide different flavors for the e-cigarette 610. In addition, although the e-cigarette 610 is shown as accommodating two cartridges 630A, 630B, it will be appreciated that some devices may accommodate a larger number of cartridges. Furthermore, although cartridges 630A and 630B are the same size as one another, some devices may accommodate cartridges of differing size. For example, an e-cigarette may accommodate one larger cartridge having a nicotine-based liquid, and one or more small cartridges to provide flavor or other additives as desired.

In some cases, the e-cigarette 610 may be able to accommodate (and operate with) a variable number of cartridges. For example, there may be a spring or other resilient device mounted on control unit engagement end 621, which tries to extend along the longitudinal axis towards the mouthpiece 635. If one of the cartridges shown in FIG. 6 is removed, this spring would therefore help to ensure that the remaining cartridge(s) would be held firmly against the mouthpiece for reliable operation.

If an e-cigarette has multiple cartridges, one option is that these are all activated by a single coil that spans the longitudinal extent of all the cartridges. Alternatively, there may an individual coil 650A, 650B for each respective cartridge 630A, 630B, as illustrated in FIG. 6. A further possibility is that different portions of a single coil may be selectively energized to mimic (emulate) the presence of multiple coils.

If an e-cigarette does have multiple coils for respective cartridges (whether really separate coils, or emulated by different sections of a single larger coil), then activation of the e-cigarette (such as by detecting airflow from an inhalation and/or by a user pressing a button) may energize all coils. The e-cigarettes 410, 510, 610, however, support selective activation of the multiple coils, whereby a user can choose or specify which coil(s) to activate. For example, e-cigarette 610 may have a mode or user setting in which in response to an activation, only coil 650A is energized, but not coil 650B. This would then produce a vapor based on the liquid formulation in coil 650A, but not coil 650B. This would allow a user greater flexibility in the operation of e-cigarette 610, in terms of the vapor provided for any given inhalation (but without a user having to physically remove or insert different cartridges just for that particular inhalation).

It will be appreciated that the various implementations of e-cigarette 410, 510 and 610 shown in FIGS. 4-6 are provided as examples only, and are not intended to be exhaustive. For example, the cartridge design shown in FIG. 5 might be incorporated into a multiple cartridge device such as shown in FIG. 6. The skilled person will be aware of many other variations that can be achieved, for example, by mixing and matching different features from different implementations, and more generally by adding, replacing and/or removing features as appropriate.

Figure 7:
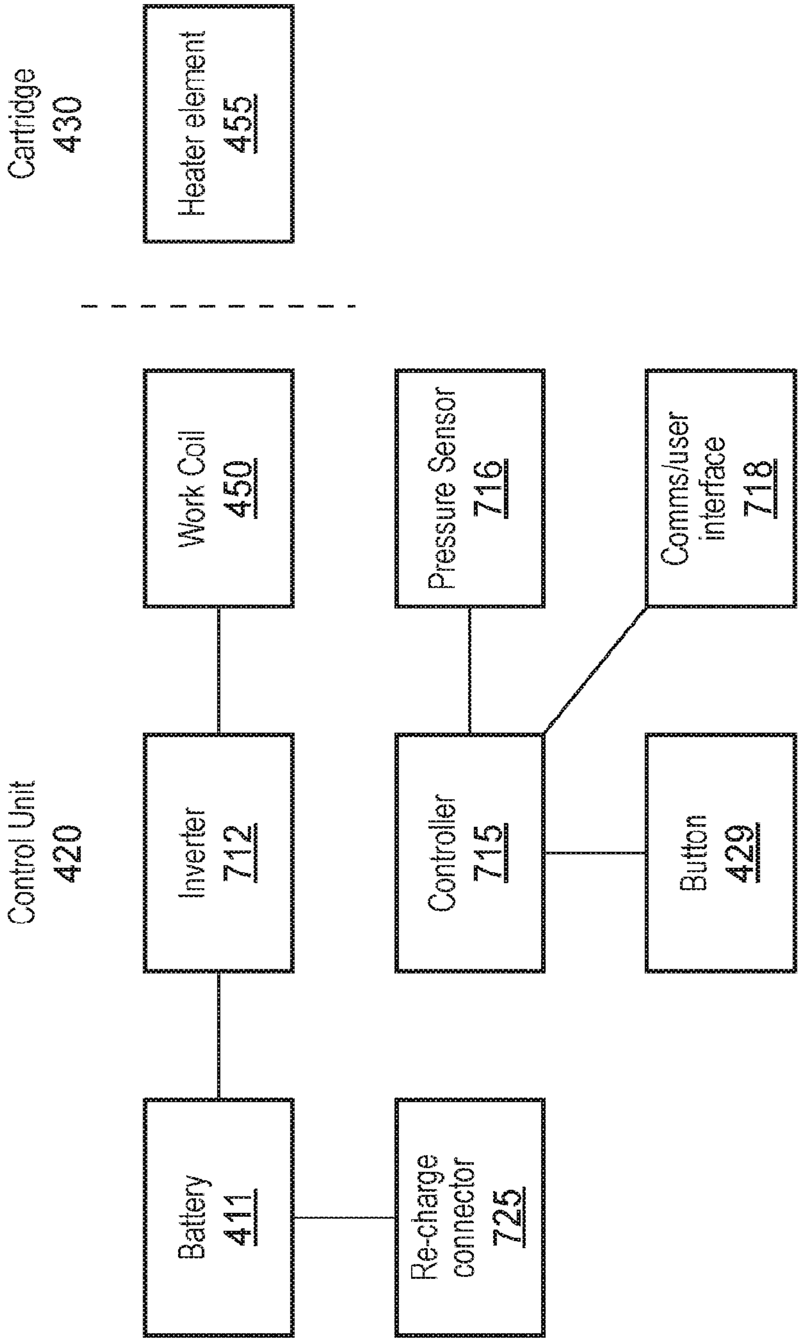
FIG. 7 is a schematic diagram of the control electronics for an e-cigarette such as shown in FIGS. 4, 5 and 6 in accordance with some embodiments of the disclosure.

FIG. 7 is a schematic diagram of the main electronic components of the e-cigarettes 410, 510, 610 of FIGS. 4-6 in accordance with some embodiments of the disclosure. With the exception of the heater 455, which is located in the cartridge 430, the remaining elements are located in the control unit 420. It will be appreciated that since the control unit 420 is a re-usable device (in contrast to the cartridge 430 which is a disposable or consumable), it is acceptable to incur one-off costs in relation to production of the control unit 420 which would not be acceptable as repeat costs in relation to the production of the cartridge 430. The components of the control unit 420 may be mounted on circuit board 415, or may be separately accommodated in the control unit 420 to operate in conjunction with the circuit board 415 (if provided), but without being physically mounted on the circuit board itself.

As shown in FIG. 7, the control unit 420 includes a re-chargeable battery 411, which is linked to a re-charge connector or socket 725, such as a micro-USB interface. This connector 725 supports re-charging of battery 411. Alternatively, or additionally, the control unit 420 may also support re-charging of battery 411 by a wireless connection (such as by induction charging).

The control unit 420 further includes a controller 715 (such as a processor or application specific integrated circuit, ASIC), which is linked to a pressure or airflow sensor 716. The controller 715 may activate the induction heating, as discussed in more detail below, in response to the sensor 716 detecting an airflow. In addition, the control unit 420 further includes a button 429, which may also be used to activate the induction heating, as described above.

FIG. 7 also shows a comms/user interface 718 for the e-cigarette. This may comprise one or more facilities according to the particular implementation. For example, the user interface 718 may include one or more lights and/or a speaker to provide output to the user, for example to indicate a malfunction, battery charge status, etc. The interface 718 may also support wireless communications, such as Bluetooth or near field communications (NFC), with an external device, such as a smartphone, laptop, computer, notebook, tablet etc. The e-cigarette may utilize this comms interface to output information such as device status, usage statistics, etc., to the external device, for ready access by a user. The comms interface 718 may also be utilized to allow the e-cigarette to receive instructions, such as configuration settings entered by the user into the external device. For example, the user interface 718 and controller 715 may be utilized to instruct the e-cigarette to selectively activate different coils 650A, 650B (or portions thereof), as described above. In some cases, the comms interface 718 may use the coil 450 to act as an antenna for wireless communications.

The controller 715 may be implemented using one or more chips as appropriate. The operations of the controller 715 are generally controlled at least in part by software programs running on the controller 715. Such software programs may be stored in non-volatile memory, such as ROM, which can be integrated into the controller 715 itself, or provided as a separate component (not shown). The controller 715 may access the ROM to load and execute individual software programs as and when required.

The controller 715 controls the inductive heating of the e-cigarette by determining when the device is or is not properly activated—for example, whether an inhalation has been detected, and whether the maximum time period for an inhalation has not yet been exceeded. If the controller 715 determines that the e-cigarette is to be activated for vaping, the controller 715 arranges for the battery 411 to supply power to the inverter 712. The inverter 712 is configured to convert the DC output from the battery 411 into an alternating current signal, typically of relatively high frequency—e.g. 1 MHz (although other frequencies, such as 5 kHz, 20 kHz, 80 KHz, or 300 kHz, or any range defined by two such values, may be used instead). This AC signal is then passed from the inverter to the coil 450, via suitable impedance matching (not shown in FIG. 7) if so required.

The coil 450 may be integrated into some form of resonant circuit, such as by combining in parallel with a capacitor (not shown in FIG. 7), with the output of the inverter 712 tuned to the resonant frequency of this resonant circuit. This resonance causes a relatively high current to be generated in coil 450, which in turn produces a relatively high magnetic field in heater 455, thereby causing rapid and effective heating of the heater 455 to produce the desired vapor or aerosol output.

Figure 7A:
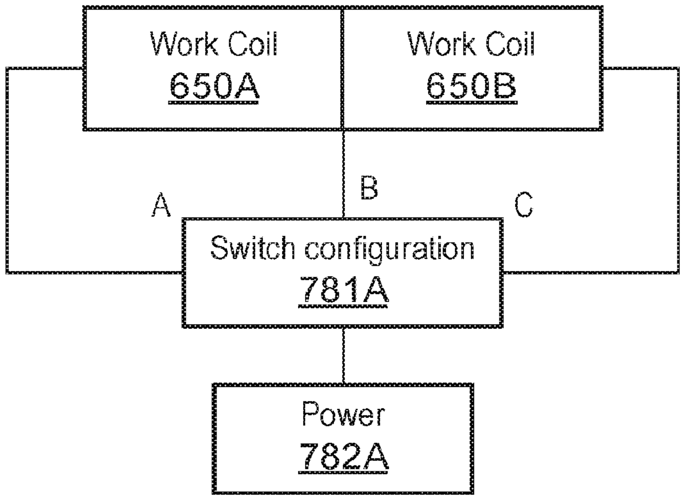
FIGS. 7A, 7B and 7C are schematic diagrams of part of the control electronics for an e-cigarette such as shown in FIG. 6 in accordance with some embodiments of the disclosure.

FIG. 7A illustrates part of the control electronics for an e-cigarette 610 having multiple coils in accordance with some implementations (while omitting for clarity aspects of the control electronics not directly related to the multiple coils). FIG. 7A shows a power source 782A (typically corresponding to the battery 411 and inverter 712 of FIG. 7), a switch configuration 781A, and the two work coils 650A, 650B, each associated with a respective heater element 655A, 655B as shown in FIG. 6 (but not included in FIG. 7A). The switch configuration has three outputs denoted A, B and C in FIG. 7A. It is also assumed that there is a current path between the two work coils 650A, 650B.

In order to operate the induction heating assembly, two out of three of these outputs A, B, C are closed (to permit current flow), while the remaining output stays open (to prevent current flow). Closing outputs A and C activates both coils, and hence both heater elements 655A, 655B; closing A and B selectively activates just work coil 650A; and closing B and C activates just work coil 650B.

Although it is possible to treat work coils 650A and 650B just as a single overall coil (which is either on or off together), the ability to selectively energize either or both of work coils 650A and 650B, such as provided by the implementation of FIG. 7, has a number of advantages, including:

a) choosing the vapor components (e.g. flavorants) for a given puff. Thus activating just work coil 650A produces vapor just from reservoir 670A; activating just work coil 650B produces vapor just from reservoir 670B; and activating both work coils 650A, 650B produces a combination of vapors from both reservoirs 670A, 670B.

b) controlling the amount of vapor for a given puff. For example, if reservoir 670A and reservoir 670B in fact contain the same liquid, then activating both work coils 650A, 650B can be used to produce a stronger (higher vapor level) puff compared to activating just one work coil by itself.

c) prolonging battery (charge) lifetime. As already discussed, it may be possible to operate the e-cigarette 610 of FIG. 6 when it contains just a single cartridge, e.g. 630B (rather than also including cartridge 630A). In this case, it is more efficient just to energize the work coil 650B corresponding to cartridge 630B, which is then used to vaporize liquid from reservoir 670B. In contrast, if the work coil 650A corresponding to the (missing) cartridge 630A is not energized (because this cartridge 630A and the associated heater element 650A are missing from e-cigarette 610), then this saves power consumption without reducing vapor output.

Although the e-cigarette 610 of FIG. 6 has a separate heater element 655A, 655B for each respective work coil 650A, 650B, in some implementations, different work coils may energize different portions of a single (larger) workpiece or susceptor. Accordingly, in such an e-cigarette 610, the different heater elements 655A, 655B may represent different portions of the larger susceptor, which is shared across different work coils. Additionally (or alternatively), the multiple work coils 650A, 650B may represent different portions of a single overall drive coil, individual portions of which can be selectively energized, as discussed above in relation to FIG. 7A.

Figure 7B:
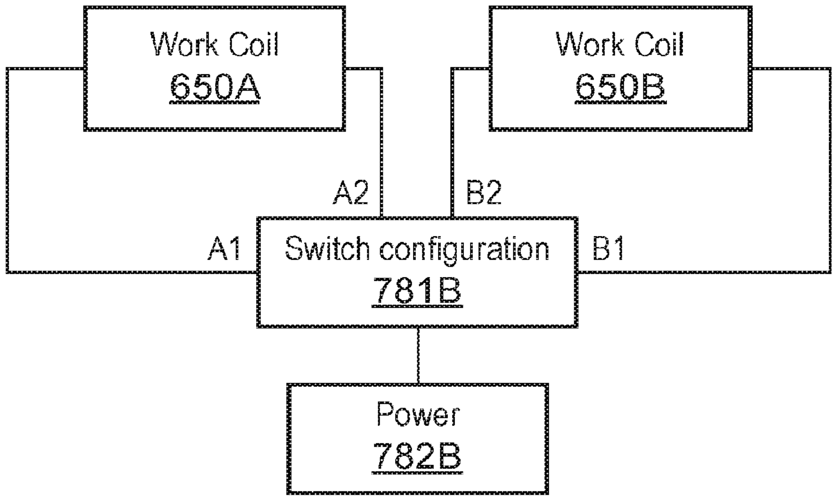

FIG. 7B shows another implementation for supporting selectivity across multiple work coils 650A, 650B. Thus in FIG. 7B, it is assumed that the work coils 650A, 650B are not electrically connected to one another, but rather each work coil 650A, 650B is individually (separately) linked to the power source 782B via a pair of independent connections through switch configuration 781B. In particular, work coil 650A is linked to power source 782B via switch connections A1 and A2, and work coil 650B is linked to power source 782B via switch connections B1 and B2. This configuration of FIG. 7B offers similar advantages to those discussed above in relation to FIG. 7A. In addition, the architecture of FIG. 7B may also be readily scaled up to work with more than two work coils.

Figure 7C:
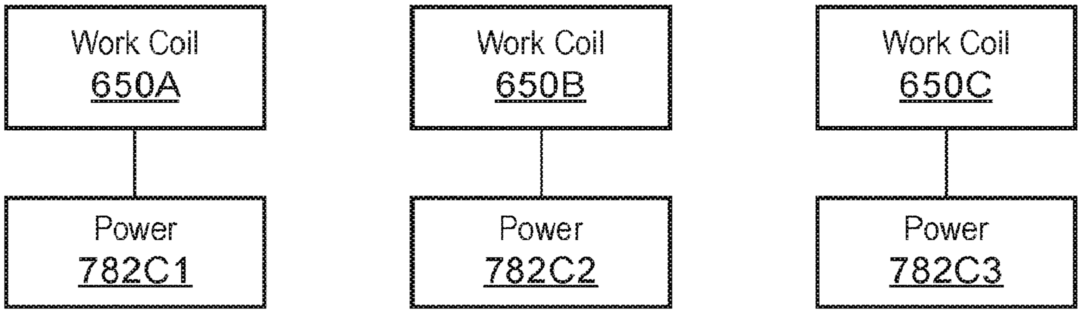

FIG. 7C shows another implementation for supporting selectivity across multiple work coils, in this case three work coils denoted 650A, 650B and 650C. Each work coil 650A, 650B, 650C is directly connected to a respect power supply 782C1, 782C2 and 782C3. The configuration of FIG. 7 may support the selective energization of any single work coil, 650A, 650B, 650C, or of any pair of work coils at the same time, or of all three work coils at the same time.

In the configuration of FIG. 7C, at least some portions of the power supply 782 may be replicated for each of the different work coils 650. For example, each power supply 782C1, 782C2, 782C3 may include its own inverter, but they may share a single, ultimate power source, such as battery 411. In this case, the battery 411 may be connected to the inverters via a switch configuration analogous to that shown in FIG. 7B (but for DC rather than AC current). Alternatively, each respective power line from a power supply 782 to a work coil 650 may be provided with its own individual switch, which can be closed to activate the work coil (or opened to prevent such activation). In this arrangement, the collection of these individual switches across the different lines can be regarded as another form of switch configuration.

There are various ways in which the switching of FIGS. 7A-7C may be managed or controlled. In some cases, the user may operate a mechanical or physical switch that directly sets the switch configuration. For example, e-cigarette 610 may include a switch (not shown in FIG. 6) on the outer housing, whereby cartridge 630A can be activated in one setting, and cartridge 630B can be activated in another setting. A further setting of the switch may allow activation of both cartridges together. Alternatively, the control unit 610 may have a separate button associated with each cartridge, and the user holds down the button for the desired cartridge (or potentially both buttons if both cartridges should be activated). Another possibility is that a button or other input device on the e-cigarette may be used to select a stronger puff (and result in switching on both or all work coils). Such a button may also be used to select the addition of a flavor, and the switching might operate a work coil associated with that flavor—typically in addition to a work coil for the base liquid containing nicotine. The skilled person will be aware of other possible implementations of such switching.

In some e-cigarettes, rather than direct (e.g. mechanical or physical) control of the switch configuration, the user may set the switch configuration via the comms/user interface 718 shown in FIG. 7 (or any other similar facility). For example, this interface may allow a user to specify the use of different flavors or cartridges (and/or different strength levels), and the controller 715 can then set the switch configuration 781 according to this user input.

A further possibility is that the switch configuration may be set automatically. For example, e-cigarette 610 may prevent work coil 650A from being activated if a cartridge is not present in the illustrated location of cartridge 630A. In other words, if no such cartridge is present, then the work coil 650A may not be activated (thereby saving power, etc).

There are various mechanisms available for detecting whether or not a cartridge is present. For example, the control unit 620 may be provided with a switch which is mechanically operated by inserting a cartridge into the relevant position. If there is no cartridge in position, then the switch is set so that the corresponding work coil is not powered. Another approach would be for the control unit to have some optical or electrical facility for detecting whether or not a cartridge is inserted into a given position.

Note that in some devices, once a cartridge has been detected as in position, then the corresponding work coil is always available for activation—e.g. it is always activated in response to a puff (inhalation) detection. In other devices that support both automatic and user-controlled switch configuration, even if a cartridge has been detected as in position, a user setting (or such-like, as discussed above) may then determine whether or not the cartridge is available for activation on any given puff.

Although the control electronics of FIGS. 7A-7C have been described in connection with the use of multiple cartridges, such as shown in FIG. 6, they may also be utilized in respect of a single cartridge that has multiple heater elements. In other words, the control electronics is able to selectively energize one or more of these multiple heater elements within the single cartridge. Such an approach may still offer the benefits discussed above. For example, if the cartridge contains multiple heater elements, but just a single, shared reservoir, or multiple heater elements, each with its own respective reservoir, but all reservoirs containing the same liquid, then energizing more or fewer heater elements provides a way for a user to increase or decrease the amount of vapor provided with a single puff. Similarly, if a single cartridge contains multiple heater elements, each with its own respective reservoir containing a particular liquid, then energizing different heater elements (or combinations thereof) provides a way for a user to selectively consume vapors for different liquids (or combinations thereof).

In some e-cigarettes, the various work coils and their respective heater elements (whether implemented as separate work coils and/or heater elements, or as portions of a larger drive coil and/or susceptor) may all be substantially the same as one another, to provide a homogeneous configuration. Alternatively, a heterogeneous configuration may be utilized. For example, with reference to e-cigarette 610 as shown in FIG. 6, one cartridge 630A may be arranged to heat to a lower temperature than the other cartridge 630B, and/or to provide a lower output of vapor (by providing less heating power). Thus if one cartridge 630A contains the main liquid formulation containing nicotine, while the other cartridge 630B contains a flavorant, it may be desirable for cartridge 630A to output more vapor than cartridge 630B. Also, the operating temperature of each heater element 655 may be arranged according to the liquid(s) to be vaporized. For example, the operating temperature should be high enough to vaporize the relevant liquid(s) of a particular cartridge, but typically not so high as to chemically break down (disassociate) such liquids.

There are various ways of providing different operating characteristics (such as temperature) for different combinations of work coils and heater elements, and thereby produce a heterogeneous configuration as discussed above. For example, the physical parameters of the work coils and/or heater elements may be varied as appropriate—e.g. different sizes, geometry, materials, number of coil turns, etc. Additionally (or alternatively), the operating parameters of the work coils and/or heater elements may be varied, such as by having different AC frequencies and/or different supply currents for the work coils.

The example embodiments described above have primarily focused on examples in which the heating element (inductive susceptor) has a relatively uniform response to the magnetic fields generated by the inductive heater drive coil in terms of how currents are induced in the heating element. That is to say, the heating element is relatively homogenous, thereby giving rise to relatively uniform inductive heating in the heating element, and consequently a broadly uniform temperature across the surface of the heating element surface. However, in accordance with some example embodiments of the disclosure, the heating element may instead be configured so that different regions of the heating element respond differently to the inductive heating provided by the drive coil in terms of how much heat is generated in different regions of the heating element when the drive coil is active.

Figure 8:
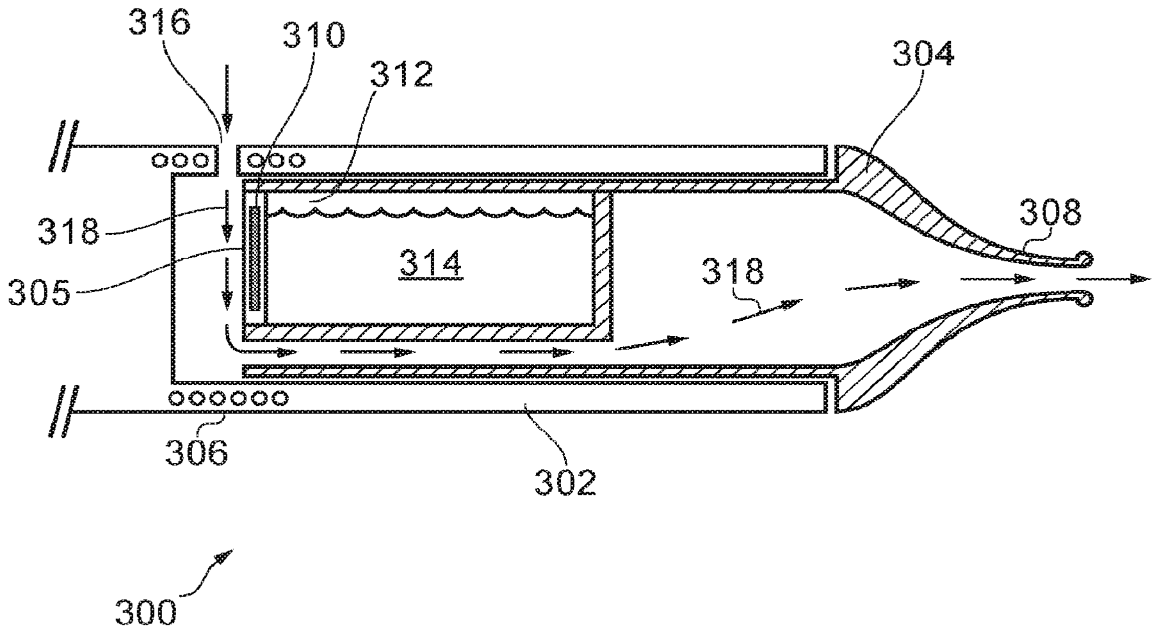
FIG. 8 schematically represents an aerosol provision system comprising an inductive heating assembly in accordance with certain example embodiments of the present disclosure.

FIG. 8 represents, in highly schematic cross-section, an example aerosol provision system (electronic cigarette) 300 which incorporates a vaporizer 305 that comprises a heating element (susceptor) 310 embedded in a surrounding wicking material/matrix. The heating element 310 of the aerosol provision system represented in FIG. 8 comprises regions of different susceptibility to inductive heating, but apart from this many aspects of the configuration of FIG. 8 are similar to, and will be understood from, the description of the various other configurations described herein. When the system 300 is in use and generating an aerosol, the surface of the heating element 310 in the regions of different susceptibility are heated to different temperatures by the induced current flows. Heating different regions of the heating element 310 to different temperatures can be desired in some implementations because different components of a source liquid formulation may aerosolize/vaporize at different temperatures. This means that providing a heating element (susceptor) with a range of different temperatures can help simultaneously aerosolize a range of different components in the source liquid. That is to say, different regions of the heating element can be heated to temperatures that are better suited to vaporizing different components of the liquid formulation.

Thus, the aerosol provision system 300 comprises a control unit 302 and a cartridge 304 and may be generally based on any of the implementations described herein apart from having a heating element 310 with a spatially non-uniform response to inductive heating.

The control unit 302 comprises a drive coil 306 in addition to a power supply and control circuitry (not shown in FIG. 8) for driving the drive coil 306 to generate magnetic fields for inductive heating as discussed herein.

The cartridge 304 is received in a recess of the control unit 302 and comprises the vaporizer 305 comprising the heating element 310, a reservoir 312 containing a liquid formulation (source liquid) 314 from which the aerosol is to be generated by vaporization at the heating element 310, and a mouthpiece 308 through which aerosol may be inhaled when the system 300 is in use. The cartridge 304 has a wall configuration (generally shown with hatching in FIG. 8) that defines the reservoir 312 for the liquid formulation 314, supports the heating element 310, and defines an airflow path through the cartridge 304. Liquid formulation may be wicked from the reservoir 312 to the vicinity of the heating element 310 (more particular to the vicinity of a vaporizing surface of the heating element) for vaporization in accordance with any of the approaches described herein. The airflow path is arranged so that when a user inhales on the mouthpiece 308, air is drawn through an air inlet 316 in the body of the control unit 302, into the cartridge 304 and past the heating element 310, and out through the mouthpiece 308. Thus a portion of liquid formulation 314 vaporized by the heating element 310 becomes entrained in the airflow passing the heating element 310 and the resulting aerosol exits the system 300 through the mouthpiece 308 for inhalation by the user. An example airflow path is schematically represented in FIG. 8 by a sequence of arrows 318. However, it will be appreciated the exact configuration of the control unit 302 and the cartridge 304, for example in terms of how the airflow path through the system 300 is configured, whether the system comprises a re-useable control unit and replaceable cartridge assembly, and whether the drive coil and heating element are provided as components of the same or different elements of the system, is not significant to the principles underlying the operation of a heating element 310 having a non-uniform induced current response (i.e. a different susceptibility to induced current flow from the drive coil in different regions) as described herein.

Thus, the aerosol provision system 300 schematically represented in FIG. 8 comprises in this example an inductive heating assembly comprising the heating element 310 in the cartridge 304 part of the system 300 and the drive coil 306 in the control unit 302 part of the system 300. In use (i.e. when generating aerosol) the drive coil 306 induces current flows in the heating element 310 in accordance with the principles of inductive heating such as discussed elsewhere herein. This heats the heating element 310 to generate an aerosol by vaporization of an aerosol precursor material (e.g. liquid formation 314) in the vicinity of a vaporizing surface the heating element 310 (i.e. a surface of the heating element 310 which is heated to a temperature sufficient to vaporize adjacent aerosol precursor material). The heating element 310 comprises regions of different susceptibility to induced current flow from the drive coil 306 such that areas of the vaporizing surface of the heating element 310 in the regions of different susceptibility are heated to different temperatures by the current flow induced by the drive coil 306. As noted above, this can help with simultaneously aerosolizing components of the liquid formulation which vaporize/aerosolize at different temperatures. There are a number of different ways in which the heating element 310 can be configured to provide regions with different responses to the inductive heating from the drive coil 306 (i.e. regions which undergo different amounts of heating/achieve different temperatures during use).

Figure 9A:
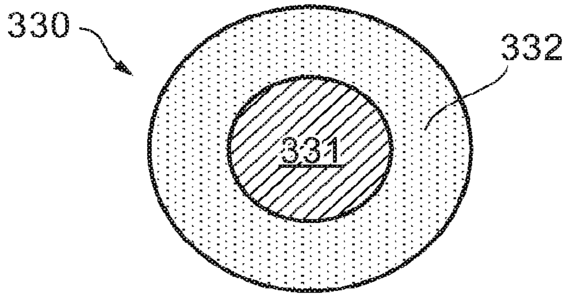
FIGS. 9A, 9B, 10A, 10B, 11A, 11B, 12A, and 12B schematically represent heating elements for use in the aerosol provision system of FIG. 8 in accordance with different example embodiments of the present disclosure.
Figure 9B:
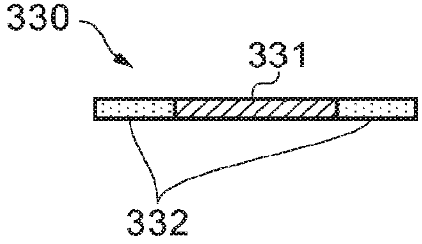

FIGS. 9A and 9B schematically represent respective plan and cross-section views of a heating element 330 comprising regions of different susceptibility to induced current flow in accordance with one example implementation of an embodiment of the disclosure. That is to say, in one example implementation of the system schematically represented in FIG. 8, the heating element 310 has a configuration corresponding to the heating element 330 represented in FIGS. 9A and 9B. The crosssection view of FIG. 9B corresponds with the cross-section view of the heating element 310 represented in FIG. 8 (although rotated 90 degrees in the plane of the figure) and the plan view of FIG. 9A corresponds with a view of the heating element 330 along a direction that is parallel to the magnetic field created by the drive coil 306 (i.e. parallel to the longitudinal axis of the aerosol provision system). The cross section of FIG. 9B is taken along a horizontal line in the middle of the representation of FIG. 9A.

The heating element 330 has a generally planar form, which in this example is flat. More particularly, the heating element 330 in the example of FIGS. 9A and 9B is generally in the form of a flat circularly disc. The heating element 330 in this example is symmetric about the plane of FIG. 9A in that it appears the same whether viewed from above or below the plane of FIG. 9A.

The characteristic scale of the heating element 330 may be chosen according to the specific implementation at hand, for example having regard to the overall scale of the aerosol provision system in which the heating element 330 is implemented and the desired rate of aerosol generation. For example, in one particular implementation the heating element 330 may have a diameter of around 10 mm and a thickness of around 1 mm. In other examples the heating element 330 may have a diameter in the range 3 mm to 20 mm and a thickness of around 0.1 mm to 5 mm.

The heating element 330 comprises a first region 331 and a second region 332 comprising materials having different electromagnetic characteristics, thereby providing regions of different susceptibility to induced current flow. The first region 331 is generally in the form of a circular disc forming the center of the heating element 330 and the second region 332 is generally in the form of a circular annulus surrounding the first region 331. The first and second regions may be bonded together or may be maintained in a press-fit arrangement. Alternatively, the first and second regions 331, 332 may not be attached to one another, but may be independently maintained in position, for example by virtue of both regions being embedded in a surrounding wadding/wicking material.

In the particular example represented in FIGS. 9A and 9B, it is assumed the first and second regions 331, 332 comprise different compositions of steel having different susceptibilities to induced current flows. For example, the different regions may comprise different material selected from the group of copper, aluminum, zinc, brass, iron, tin, and steel, for example ANSI 304 steel.

The particular materials in any given implementation may be chosen having regard to the differences in susceptibility to induced current flow which are appropriate for providing the desired temperature variations across the heating element 330 when in use. The response of a particular heating element configuration may be modeled or empirically tested during a design phase to help provide a heating element configuration having the desired operational characteristics, for example in terms of the different temperatures achieved during normal use and the arrangement of the regions over which the different temperatures occur (e.g., in terms of size and placement). In this regard, the desired operational characteristics, e.g. in terms the desired range of temperatures, may themselves be determined through modeling or empirical testing having regard to the characteristic and composition of the liquid formulation in use and the desired aerosol characteristics.

It will be appreciated the heating element 330 represented in FIGS. 9A and 9B is merely one example configuration for a heating element 330 comprising different materials for providing different regions of susceptibility to induced current flow. In other examples, the heating element 330 may comprise more than two regions of different materials. Furthermore, the particular spatial arrangement of the regions comprising different materials may be different from the generally concentric arrangement represented in FIGS. 9A and 9B. For example, in another implementation the first and second regions may comprise two halves (or other proportions) of the heating element 330, for example each region may have a generally planar semi-circle form.

Figure 10A:
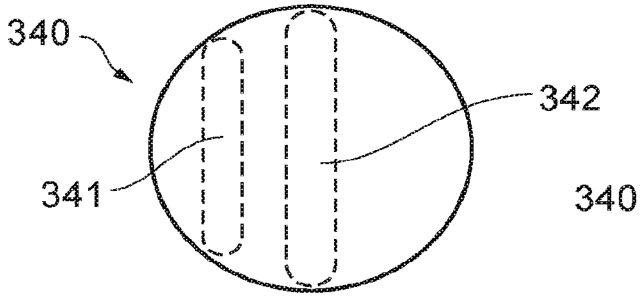
Figure 10B:
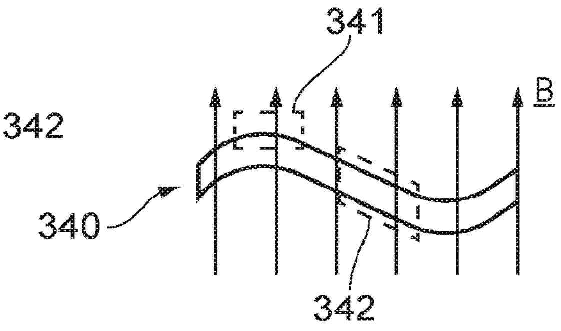

FIGS. 10A and 10B schematically represents respective plan and cross-section views of a heating element 340 comprising regions of different susceptibility to induced current flow in accordance with another example implementation of an embodiment of the disclosure. The orientations of these views correspond with those of FIGS. 9A and 9B discussed above. The heating element 340 may comprise, for example, ANSI 304 steel, and/or another suitable material (i.e. a material having sufficient inductive properties and resistance to the liquid formulation), such as copper, aluminum, zinc, brass, iron, tin, and other steels.

The heating element 340 again has a generally planar form, although unlike the example of FIGS. 9A and 9B, the generally planar form of the heating element 340 is not flat. That is to say, the heating element 340 comprises undulations (ridges/corrugations) when viewed in cross-section (i.e. when viewed perpendicular to the largest surfaces of the heating element 340). These one or more undulation(s) may be formed, for example, by bending or stamping a flat template former for the heating element 340. Thus, the heating element 340 in the example of FIGS. 10A and 10B is generally in the form of a wavy circular disc which, in this particular example, comprises a single "wave". That is to say, a characteristic wavelength scale of the undulation broadly corresponds with the diameter of the disc. However, in other implementations there may be a greater number of undulations across the surface of the heating element 340. Furthermore, the undulations may be provided in different configurations. For example, rather than going from one side of the heating element 340 to the other, the undulation(s) may be arranged concentrically, for example comprising a series of circular corrugations/ridges.

The orientation of the heating element 340 relative to magnetic fields generated by the drive coil when the heating element is in use in an aerosol provision system are such that the magnetic fields will be generally perpendicular to the plane of FIG. 10A and generally aligned vertically within the plane of FIG. 10B, as schematically represented by magnetic field lines B. The field lines B are schematically directed upwards in FIG. 10B, but it will be appreciated the magnetic field direction will alternate between up and down (or up and off) for the orientation of FIG. 10B in accordance with the time-varying signal applied to the drive coil.

Thus, the heating element 340 comprises locations where the plane of the heating element 340 presents different angles to the magnetic field generated by the drive coil. For example, referring in particular to FIG. 10B, the heating element 340 comprises a first region 341 in which the plane of the heating element 340 is generally perpendicular to the local magnetic field B and a second region 342 in which the plane of the heating element 340 is inclined with respect to the local magnetic field B. The degree of inclination in the second region 342 will depend on the geometry of the undulations in the heating element 340. In the example of FIG. 10B, the maximum inclination is on the order of around 45 degrees or so. Of course it will be appreciated there are other regions of the heating element 340 outside the first region 341 and the second region 342 which present still other angles of inclination to the magnetic field.

The different regions of the heating element 340 oriented at different angles to the magnetic field created by the drive coil provide regions of different susceptibility to induced current flow, and therefore different degrees of heating. This follows from the underlying physics of inductive heating whereby the orientation of a planar heating element to the induction magnetic field affects the degree of inductive heating. More particularly, regions in which the magnetic field is generally perpendicular to the plane of the heating element will have a greater degree of susceptibility to induced currents than regions in which the magnetic field is inclined relative to the plane of the heating element.

Thus, in the first region 341 the magnetic field is broadly perpendicular to the plane of the heating element and so this region (which appears generally as a vertical stripe in the plan view of FIG. 10A) will be heated to a higher temperature than the second region 342 (which again appears generally as a vertical stripe in the plan view of FIG. 10A) where the magnetic field is more inclined relative to the plane of the heating element 340. The other regions of the heating element 340 will be heated according to the angle of inclination between the plane of the heating element 340 in these locations and the local magnetic field direction.

The characteristic scale of the heating element 340 may again be chosen according to the specific implementation at hand, for example having regard to the overall scale of the aerosol provision system in which the heating element 340 is implemented and the desired rate of aerosol generation. For example, in one particular implementation the heating element 340 may have a diameter of around 10 mm and a thickness of around 1 mm. The undulations in the heating element 340 may be chosen to provide the heating element 340 with angles of inclination to the magnetic field from the drive coil ranging from 90° (i.e. perpendicular) to around 10 degrees or so.

The particular range of angles of inclination for different regions of the heating element 340 to the magnetic field may be chosen having regard to the differences in susceptibility to induced current flow which are appropriate for providing the desired temperature variations (profile) across the heating element 340 when in use. The response of a particular heating element configuration (e.g., in terms of how the undulation geometry affects the heating element temperature profile) may be modeled or empirically tested during a design phase to help provide a heating element configuration having the desired operational characteristics, for example in terms of the different temperatures achieved during normal use and the spatial arrangement of the regions over which the different temperatures occur (e.g., in terms of size and placement).

Figure 11A:
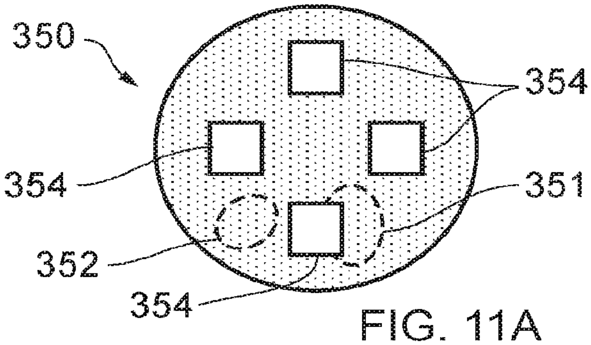
Figure 11B:
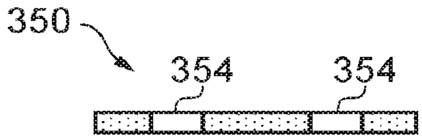

FIGS. 11A and 11B schematically represents respective plan and cross-section views of a heating element 350 comprising regions of different susceptibility to induced current flow in accordance with another example implementation of an embodiment of the disclosure. The orientations of these views correspond with those of FIGS. 9A and 9B discussed above. The heating element may comprise, for example, ANSI 304 steel, and/or another suitable material such as discussed above.

The heating element 350 again has a generally planar form, which in this example is flat. More particularly, the heating element 350 in the example of FIGS. 11A and 11B is generally in the form of a flat circular disc having a plurality of openings therein. In this example the plurality of openings 354 comprise four square holes passing through the heating element 350. The openings 354 may be formed, for example, by stamping a flat template former for the heating element 350 with an appropriately configured punch. The openings 354 are defined by walls which disrupts the flow of induced current within the heating element 350, thereby creating regions of different current density. In this example the walls may be referred to as internal walls of the heating element in that they are associated with opening/holes in the body of the susceptor (heating element). However, as discussed further below in relation to FIGS. 12A and 12B, in some other examples, or in addition, similar functionality can be provided by outer walls defining the periphery of a heating element 350.

The characteristic scale of the heating element may be chosen according to the specific implementation at hand, for example having regard to the overall scale of the aerosol provision system in which the heating element is implemented and the desired rate of aerosol generation. For example, in one particular implementation the heating element 350 may have a diameter of around 10 mm and a thickness of around 1 mm with the openings having a characteristic size of around 2 mm. In other examples the heating element 330 may have a diameter in the range 3 mm to 20 mm and a thickness of around 0.1 mm to 5 mm, and the one or more openings may have a characteristic size of around 10% to 30% of the diameter, but in some case may be smaller or larger.

The drive coil 306 in the configuration of FIG. 8 will generate a time-varying magnetic field which is broadly perpendicular to the plane of the heating element 305 and so will generate electric fields to drive induced current flow in the heating element 305 which are generally azimuthal. Thus, in a circularly symmetric heating element, such as represented in FIG. 9A, the induced current densities will be broadly uniform at different azimuths around the heating element. However, for a heating element which comprises walls that disrupt the circular symmetry, such as the walls associated with the holes 354 in the heating element 350 of FIG. 11A, the current densities will not be broadly uniform at different azimuths, but will be disrupted, thereby leading to different current densities, hence different amounts of heating, in different regions of the heating element.

Thus, the heating element 350 comprises locations which are more susceptible to induced current flow because current is diverted by walls into these locations leading to higher current densities. For example, referring in particular to FIG. 11A, the heating element 350 comprises a first region 351 adjacent one of the openings 354 and a second region 352 which is not adjacent one of the openings. In general, the current density in the first region 351 will be different from the current density in the second region 352 because the current flows in the vicinity of the first region 351 are diverted/disrupted by the adjacent opening 354. Of course it will be appreciated these are just two example regions identified for the purposes of explanation.

The particular arrangement of openings 354 that provide the walls for disrupting otherwise azimuthal current flow may be chosen having regard to the differences in susceptibility to induced current flow across the heating element which are appropriate for providing the desired temperature variations (profile) when in use. The response of a particular heating element configuration (e.g., in terms of how the openings affect the heating element temperature profile) may be modeled or empirically tested during a design phase to help provide a heating element configuration having the desired operational characteristics, for example in terms of the different temperatures achieved during normal use and the spatial arrangement of the regions over which the different temperatures occur (e.g., in terms of size and placement).

Figure 12A:
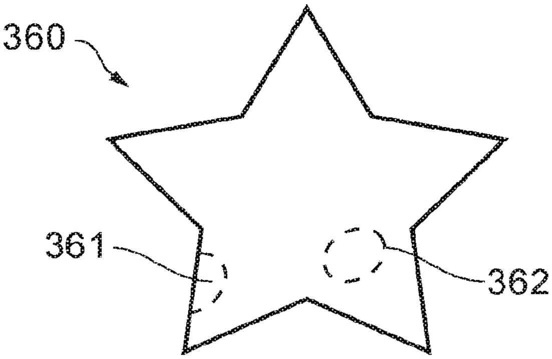
Figure 12B:
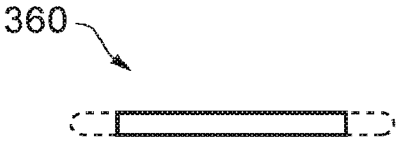

FIGS. 12A and 12B schematically represents respective plan and cross-section views of a heating element 360 comprising regions of different susceptibility to induced current flow in accordance with yet another example implementation of an embodiment of the disclosure. The heating element 360 may again comprise, for example, ANSI 304 steel, and/or another suitable material such as discussed above. The orientations of these views correspond with those of FIGS. 9A and 9B discussed above.

The heating element 360 again has a generally planar form. More particularly, the heating element 360 in the example of FIGS. 12A and 12B is generally in the form of a flat star-shaped disc, in this example a five-pointed star. The respective points of the star are defined by outer (peripheral) walls of the heating element 360 which are not azimuthal (i.e. the heating element 360 comprises walls extending in a direction which has a radial component). Because the peripheral walls of the heating element 360 are not parallel to the direction of electric fields created by the time-varying magnetic field from the drive coil, they act to disrupt current flows in the heating element 360 in broadly the same manner as discussed above for the walls associated with the openings 354 of the heating element 350 shown in FIGS. 11A and 11B.

The characteristic scale of the heating element 360 may be chosen according to the specific implementation at hand, for example having regard to the overall scale of the aerosol provision system in which the heating element 360 is implemented and the desired rate of aerosol generation. For example, in one particular implementation the heating element 360 may comprise five uniformly spaced points extending from 3 mm to 5 mm from a center of the heating element 360 (i.e. the respective points of the star may have a radial extent of around 2 mm). In other examples the protrusions (i.e. the points of the star in the example of FIG. 12A) could have different sizes, for example they may extend over a range from 1 mm to 20 mm.

As discussed above, the drive coil in the configuration of FIG. 8 will generate a time-varying magnetic field which is broadly perpendicular to the plane of a the heating element 360 and so will generate electric fields to drive induced current flows in the heating element 360 which are generally azimuthal. Thus, for a heating element which comprises walls that disrupt the circular symmetry, such as the outer walls associated with the points of the star-shaped pattern for the heating element 360 of FIG. 12A, or a more simple shape, such as a square or rectangle, the current densities will not be uniform at different azimuths, but will be disrupted, thereby leading to different amounts of heating, and hence temperatures, in different regions of the heating element.

Thus, the heating element 360 comprises locations which have different induced currents as current flows are disrupted by the walls. Thus, referring in particular to FIG. 12A, the heating element 360 comprises a first region 361 adjacent one of the outer walls and a second region 362 which is not adjacent one of the outer walls. Of course it will be appreciated these are just two example regions identified for the purposes of explanation. In general, the current density in the first region 361 will be different from the current density in the second region 362 because the current flows in the vicinity of the first region 361 are diverted/disrupted by the adjacent non-azimuthal wall of the heating element.

In a manner similar to that described for the other example heating element configurations having locations with differing susceptibility to induced current flows (i.e. regions with different responses to the drive coil in terms of the amount of induced heating), the particular arrangement for the heating element's peripheral walls for disrupting the otherwise azimuthal current flow may be chosen having regard to the differences in susceptibility which are appropriate for providing the desired temperature variations (profile) when in use. The response of a particular heating element configuration (e.g., in terms of how the non-azimuthal walls affect the heating element temperature profile) may be modeled or empirically tested during a design phase to help provide a heating element configuration having the desired operational characteristics, for example in terms of the different temperatures achieved during normal use and the spatial arrangement of the regions over which the different temperatures occur (e.g., in terms of size and placement).

It will be appreciated broadly the same principle underlies the operation of the heating element 350 represented in FIGS. 11A and 11B and the heating element 360 represented in FIGS. 12A and 12B in that the locations with different susceptibilities to induced currents are provided by non-azimuthal edges/walls to disrupt current flows. The difference between these two examples is in whether the walls are inner walls (i.e. associated with holes in the heating element) or outer walls (i.e. associated with a periphery of the heating element). It will further be appreciated the specific wall configurations represented in FIGS. 11A and 12A are provided by way of example only, and there are many other different configurations which provide walls that disrupt current flows. For example, rather than a star-shaped configuration such as represented in FIG. 12A, in another example the sector may comprise slot openings, e.g., extended inwardly from a periphery or as holes in the heating element. More generally, what is significant is that the heating element is provided with walls which are not parallel to the direction of electric fields created by the time-varying magnetic field. Thus, for a configuration in which the drive coil is configured to generate a broadly uniform and parallel magnetic field (e.g. for a solenoid-like drive coil), the drive coil extends along a coil axis about which the magnetic field generated by the drive coil is generally circularly symmetric, but the heating element has a shape which is not circularly symmetric about the coil axis (in the sense of not being symmetric under all rotations, although it may be symmetric under some rotations).

Thus, there has been described above a number of different ways in which a heating element in an inductive heating assembly of an aerosol provision system can be provided with regions of different susceptibility to induced current flows, and hence different degrees of heating, to provide a range of different temperatures across the heating element. As noted above, this can be desired in some scenarios to facilitate simultaneous vaporization of different components of a liquid formulation to be vaporized having different vaporization temperatures/characteristics.

It will be appreciated there are many variations to the approaches discussed above and many other ways of providing locations with different susceptibility to induced current flows.

For example, in some implementations the heating element may comprise regions having different electrical resistivity in order to provide different degrees of heating in the different regions. This may be provided by a heating element comprising different materials having different electrical resistivities. In another implementation, the heating element may comprise a material having different physical characteristics in different regions. For example, there may be regions of the heating element having different thicknesses in a direction parallel to the magnetic fields generated by the drive coil and/or regions of the heating element having different porosity.

In some examples, the heating element itself may be uniform, but the drive coil may be configured so the magnetic field generated when in use varies across the heating element such that different regions of the heating element in effect have different susceptibility to induced current flow because the magnetic field generated at the heating element when the drive coil is in use has different strengths in different locations.

It will further be appreciated that in accordance with various embodiments of the disclosure, a heating element having characteristics arranged to provide regions of different susceptibility to induced currents can be provided in conjunction with other vaporizer characteristics described herein, for example the heating element having different regions of susceptibility to induced currents may comprise a porous material arranged to wick liquid formulation from a source of liquid formulation by capillary action to replace liquid formulation vaporized by the heating element when in use and/or may be provided adjacent to a wicking element arranged to wick liquid formulation from a source of liquid formulation by capillary action to replace liquid formulation vaporized by the heating element when in use.

It will furthermore be appreciated that a heating element comprising regions having different susceptibility to induced currents is not restricted to use in aerosol provision systems of the kind described herein, but can be used more generally in an inductive heat assembly of any aerosol provision system. Accordingly, although various example embodiments described herein have focused on a two-part aerosol provision system comprising a re-useable control unit 302 and a replaceable cartridge 304, in other examples, a heating element having regions of different susceptibility may be used in an aerosol provision system that does not include a replaceable cartridge, but is a disposable system or a refillable system. Similarly, although the various example embodiments described herein have focused on an aerosol provision system in which the drive coil is provided in the reusable control unit 302 and the heating element is provided in the replaceable cartridge 304, in other implementations the drive coil may also be provided in the replaceable cartridge, with the control unit and cartridge having an appropriate electrical interface for coupling power to the drive coil.

It will further be appreciated that in some example implementations a heating element may incorporate features from more than one of the heating elements represented in FIGS. 9 to 12. For example, a heating element may comprise different materials (e.g. as discussed above with reference to FIGS. 9A and 9B) as well as undulations (e.g. as discussed above with reference to FIGS. 10A and 10B), and so on for other combinations of features.

It will further be appreciated that whilst some the above-described embodiments of a susceptor (heating element) having regions that respond differently to an inductive heater drive coil have focused on an aerosol precursor material comprising a liquid formulation, heating elements in accordance with the principles described herein may also be used in association with other forms of aerosol precursor material, for example solid materials and gel materials.

Thus there has also been described an inductive heating assembly for generating an aerosol from an aerosol precursor material in an aerosol provision system, the inductive heating assembly comprising: a heating element; and a drive coil arranged to induce current flow in the heating element to heat the heating element and vaporize aerosol precursor material in proximity with a surface of the heating element, and wherein the heating element comprises regions of different susceptibility to induced current flow from the drive coil, such that when in use the surface of the heating element in the regions of different susceptibility are heated to different temperatures by the current flow induced by the drive coil.

Figure 13:
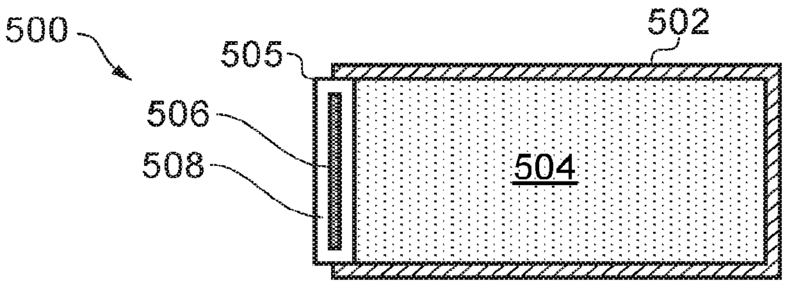
FIGS. 13 to 20 schematically represent different arrangements of source liquid reservoir and vaporizer in accordance with different example embodiments of the present disclosure.

FIG. 13 schematically represents in cross-section a vaporizer assembly 500 for use in an aerosol provision system, for example of the type described above, in accordance with certain embodiments of the present disclosure. The vaporizer assembly 500 comprises a planar vaporizer 505 and a reservoir 502 of source liquid 504. The vaporizer 505 in this example comprises an inductive heating element 506 the form of a planar disk comprising ANSI 304 steel or other suitable material such as discussed above, surrounded by a wicking/wadding matrix 508 comprising a non-conducting fibrous material, for example a woven fiberglass material. The source liquid 504 may comprise an E-liquid formulation of the kind commonly used in electronic cigarettes, for example comprising 0-5% nicotine dissolved in a solvent comprising glycerol, water, and/or propylene glycol. The source liquid 504 may also comprise flavorings. The reservoir 502 in this example comprises a chamber of free source liquid, but in other examples the reservoir 502 may comprise a porous matrix or any other structure for retaining the source liquid 504 until such time that it is required to be delivered to the aerosol generator/vaporizer.

The vaporizer assembly 500 of FIG. 13 may, for example, be part of a replaceable cartridge for an aerosol provision system of the kinds discussed herein. For example, the vaporizer assembly 500 represented in FIG. 13 may correspond with the vaporizer 305 and reservoir 312 of source liquid 314 represented in the example aerosol provision system 300 of FIG. 8. Thus, the vaporizer assembly 500 is arranged in a cartridge of an electronic cigarette so that when a user inhales on the cartridge/electronic cigarette, air is drawn through the cartridge and over a vaporizing surface of the vaporizer. The vaporizing surface of the vaporizer 505 is the surface from which vaporized source liquid is released into the surrounding airflow, and so in the example of FIG. 13, is the left-most face of the vaporizer 505. (It will be appreciated that references to "left" and "right", and similar terms indicating orientation, are used to refer to the orientations represented in the figures for ease of explanation and are not intended to indicate any particular orientation is required for use.)

The vaporizer 505 is a planar vaporizer in the sense of having a generally planar/sheet-like form. Thus, the vaporizer 505 comprises first and second opposing faces connected by a peripheral edge wherein the dimensions of the vaporizer 505 in the plane of the first and second faces, for example a length or width of the vaporizer faces, is greater than the thickness of the vaporizer riser (i.e. the separation between the first and second faces), for example by more than a factor of two, more than a factor of three, more than a factor of four, more than a factor of five, or more than a factor of 10. It will be appreciated that although the vaporizer 505 has a generally planar form, the vaporizer 505 does not necessarily have a flat planar form, but could include bends or undulations, for example of the kind shown for the heating element 340 in FIG. 10B. The heating element 506 part of the vaporizer 505 is a planar heating element in the same way as the vaporizer 505 is a planar vaporizer.

For the sake of providing a concrete example, the vaporizer assembly 500 schematically represented in FIG. 13 is taken to be generally circularly-symmetric about a horizontal axis through the center of, and in the plane of, the cross-section view represented in FIG. 13, and to have a characteristic diameter of around 12 mm and a length of around 30 mm, with the vaporizer 505 having a diameter of around 11 mm and a thickness of around 2 mm, and with the heating element 506 having a diameter of around 10 mm and a thickness of around 1 mm. However, it will be appreciated that other sizes and shapes of vaporizer assembly 500 can be adopted according to the implementation at hand, for example having regard to the overall size of the aerosol provision system. For example, some other implementations may adopt values in the range of 10% to 200% of these example values.

The reservoir 502 for the source liquid (e-liquid) 504 is defined by a housing comprising a body portion (shown with hatching in FIG. 13) which may, for example, comprise one or more plastic molded pieces, which provides a sidewall and end wall of the reservoir 502 whilst the vaporizer 505 provides another end wall of the reservoir 502. The vaporizer 505 may be held in place within the reservoir housing body portion in a number of different ways. For example, the vaporizer 505 may be press-fitted and/or glued in the end of the reservoir housing body portion. Alternatively, or in addition, a separate fixing mechanism may be provided, for example a suitable clamping arrangement could be used.

Thus, the vaporizer assembly 500 of FIG. 13 may form part of an aerosol provision system for generating an aerosol from a source liquid, the aerosol provision system comprising the reservoir 502 of source liquid 504 and the planar vaporizer 505 comprising the planar heating element 506. By having the vaporizer 505, and in particular in the example of FIG. 13, the wicking material 508 surrounding the heating element 506, in contact with source liquid 504 in the reservoir 502, the vaporizer 505 draws source liquid from the reservoir 502 to the vicinity of the vaporizing surface of the vaporizer 505 through capillary action. An induction heater coil of the aerosol provision system in which the vaporizer assembly 500 is provided is operable to induce current flow in the heating element 506 to inductively heat the heating element 506 and so vaporize a portion of the source liquid 504 in the vicinity of the vaporizing surface of the vaporizer 505, thereby releasing the vaporized source liquid 504 into air flowing around the vaporizing surface of the vaporizer 505.

The configuration represented in FIG. 13 in which the vaporizer 505 comprises a generally planar form comprising an inductively-heated generally planar heating element 506 and configured to draw source liquid to the vaporizer's vaporizing surface provides a simple yet efficient configuration for feeding source liquid to an inductively heated vaporizer of the types described herein. In particular, the use of a generally planar vaporizer 505 provides a configuration that can have a relatively large vaporizing surface with a relatively small thermal mass. This can help provide a faster heat-up time when aerosol generation is initiated, and a faster cool-down time when aerosol generation ceases. Faster heat-up times can be desired in some scenarios to reduce user waiting, and faster cool-down times can be desired in some scenarios to help avoid residual heat in the vaporizer 505 from causing ongoing aerosol generation after a user has stopped inhaling. Such ongoing aerosol generation in effect represents a waste of source liquid and power, and can lead to source liquid condensing within the aerosol provision system.

In the example of FIG. 13, the vaporizer 505 includes the non-conductive porous material 508 to provide the function of drawing source liquid from the reservoir 502 to the vaporizing surface through capillary action. In this case the heating element 506 may, for example, comprise a nonporous conducting material, such as a solid disc. However, in other implementations the heating element 506 may also comprise a porous material so that it also contributes to the wicking of source liquid 504 from the reservoir 502 to the vaporizing surface. In the vaporizer 505 represented in FIG. 13, the porous material 508 fully surrounds the heating element 506. In this configuration the portions of porous material 508 to either side of the heating element 506 may be considered to provide different functionality. In particular, a portion of the porous material 508 between the heating element 506 and the source liquid 504 in the reservoir 502 may be primarily responsible for drawing the source liquid 504 from the reservoir 502 to the vicinity of the vaporizing surface of the vaporizer 505, whereas the portion of the porous material 508 on the opposite side of the heating element 506 (i.e. to be left in FIG. 13) may absorb source liquid that has been drawn from the reservoir 502 to the vicinity of the vaporizing surface of the vaporizer 505 so as to store/retain the source liquid 502 in the vicinity of the vaporizing surface of the vaporizer 505 for subsequent vaporization.

Thus, in the example of FIG. 13, the vaporizing surface of the vaporizer 505 comprises at least a portion of the left-most face of the vaporizer and source liquid 504 is drawn from the reservoir 502 to the vicinity of the vaporizing surface through contact with the right-most face of the vaporizer 505. In examples where the heating element 506 comprises a solid material, the capillary flow of source liquid 504 to the vaporizing surface may pass through the porous material 508 at the peripheral edge of the heating element 506 to reach the vaporizing surface. In examples where the heating element 506 comprises a porous material, the capillary flow of source liquid 504 to the vaporizing surface may in addition pass through the heating element 506.

Figure 14:
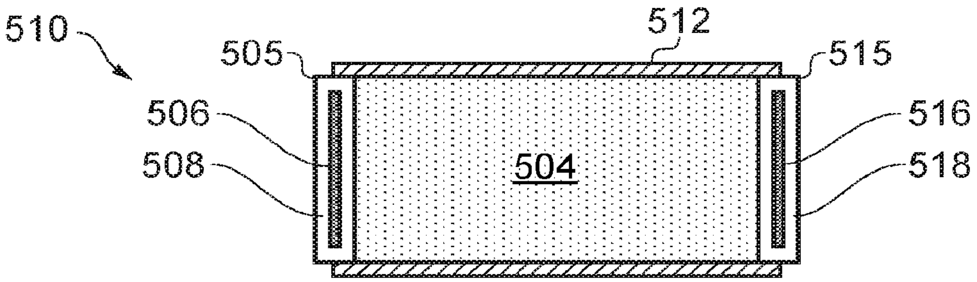

FIG. 14 schematically represents in cross-section a vaporizer assembly 510 for use in an aerosol provision system, for example of the type described above, in accordance with certain other embodiments of the present disclosure. Various aspects of the vaporizer assembly 510 of FIG. 14 are similar to, and will be understood from, correspondingly numbered elements of the vaporizer assembly 500 represented in FIG. 13. However, the vaporizer assembly 510 differs from the vaporizer assembly 500 in having an additional vaporizer 515 provided at an opposing end of the reservoir 512 of source liquid 504 (i.e. the vaporizer 505 and the further vaporizer 515 are separated along a longitudinal axis of the aerosol provision system). Thus, the main body of the reservoir 512 (shown hatched in FIG. 14) comprises what is in effect a tube which is closed at both ends by walls provided by a first vaporizer 505, as discussed above in relation to FIG. 13, and a second vaporizer 515, which is in essence identical to the vaporizer 505 at the other end of the reservoir 512. Thus, the second vaporizer 515 comprises a heating element 516 surrounded by a porous material 518 in the same way as the vaporizer 505 comprises a heating element 506 surrounded by a porous material 508. The functionality of the second vaporizer 515 is as described above in connection with FIG. 13 for the vaporizer 505, the only difference being the end of the reservoir 504 to which the vaporizer is coupled. The approach of FIG. 14 can be used to generate greater volumes of vapor since, with a suitably configured airflow path passing both vaporizers 505, 515, a larger area of vaporization surface is provided (in effect doubling the vaporization surface area provided by the single-vaporizer configuration of FIG. 13).

In configurations in which an aerosol provision system comprises multiple vaporizers, for example as shown in FIG. 14, the respective vaporizers may be driven by the same or separate induction heater coils. That is to say, in some examples a single induction heater coil may be operable simultaneously to induce current flows in heating elements of multiple vaporizers, whereas in some other examples, respective ones of multiple vaporizers may be associated with separate and independently driveable induction heater coils, thereby allowing different ones of the multiple vaporizer to be driven independently of each other.

In the example vaporizer assemblies 500, 510 represented in FIGS. 13 and 14, the respective vaporizers 505, 515 are fed with source liquid 504 in contact with a planar face of the vaporizer 505, 515. However, in other examples, a vaporizer 505, 515 may be fed with source liquid 504 in contact with a peripheral edge portion of the vaporizer 505, 515, for example in a generally annular configuration such as shown in FIG. 15.

Figure 15:
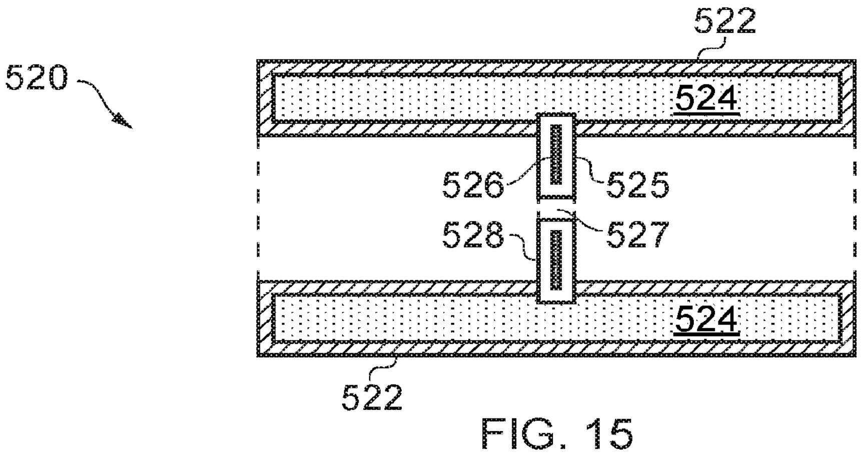

Thus, FIG. 15 schematically represents in cross-section a vaporizer assembly 520 for use in an aerosol provision system in accordance with certain other embodiments of the present disclosure. Aspects of the vaporizer assembly 520 shown in FIG. 15 which are similar to, and will be understood from, corresponding aspects of the example vaporizer assemblies represented in the other figures are not described again in the interest of brevity.

The vaporizer assembly 520 represented in FIG. 15 again comprises a generally planar vaporizer 525 and a reservoir 522 of source liquid 524. In this example the reservoir 522 has a generally annular cross-section in the region of the vaporizer assembly 520, with the vaporizer 525 mounted within the central part of the reservoir 522, such that an outer periphery of the vaporizer 525 extends through a wall of the reservoir's housing (schematically shown hatched in FIG. 15) so as to contact liquid 524 in the reservoir 522. The vaporizer 525 in this example comprises an inductive heating element 526 the form of a planar annular disk comprising ANSI 304 steel, or other suitable material such as discussed above, surrounded by a wicking/wadding matrix 528 comprising a non-conducting fibrous material, for example a woven fiberglass material. Thus, the vaporizer 525 of FIG. 15 broadly corresponds with the vaporizer 505 of FIG. 13, except for having a passageway 527 passing through the center of the vaporizer through which air can be drawn when the vaporizer 525 is in use.

The vaporizer assembly 520 of FIG. 15 may, for example, again be part of a replaceable cartridge for an aerosol provision system of the kinds discussed herein. For example, the vaporizer assembly 520 represented in FIG. 15 may correspond with the wick 454, heater 455 and reservoir 470 represented in the example aerosol provision system/e-cigarette 410 of FIG. 4. Thus, the vaporizer assembly 520 is a section of a cartridge of an electronic cigarette so that when a user inhales on the cartridge/electronic cigarette, air is drawn through the cartridge and through the passageway 527 in the vaporizer 525. The vaporizing surface of the vaporizer 525 is the surface from which vaporized source liquid 524 is released into the passing airflow, and so in the example of FIG. 15, corresponds with surfaces of the vaporizer which are exposed to the air path through the center of the vaporizer assembly 520

For the sake of providing a concrete example, the vaporizer 525 schematically represented in FIG. 15 is taken to have a characteristic diameter of around 12 mm and a thickness of around 2 mm with the passageway 527 having a diameter of 2 mm. The heating element 526 is taken to have having a diameter of around 10 mm and a thickness of around 1 mm with a hole of diameter 4 mm around the passageway. However, it will be appreciated that other sizes and shapes of vaporizer can be adopted according to the implementation at hand. For example, some other implementations may adopt values in the range of 10% to 200% of these example values.

The reservoir 522 for the source liquid (e-liquid) 524 is defined by a housing comprising a body portion (shown with hatching in FIG. 15) which may, for example, comprise one or more plastic molded pieces which provide a generally tubular inner reservoir wall in which the vaporizer 525 is mounted so the peripheral edge of the vaporizer 525 extends through the inner tubular wall of the reservoir housing to contact the source liquid 524. The vaporizer 525 may be held in place with the reservoir housing body portion in a number of different ways. For example, the vaporizer 525 may be press-fitted and/or glued in the corresponding opening in the reservoir housing body portion. Alternatively, or in addition, a separate fixing mechanism may be provided, for example a suitable clamping arrangement may be provided. The opening in the reservoir housing into which the vaporizer is received may be slightly undersized as compared to the vaporizer so the inherent compressibility of the porous material 528 helps in sealing the opening in the reservoir housing against fluid leakage.

Thus, and as with the vaporizer assemblies of FIGS. 13 and 14, the vaporizer assembly 522 of FIG. 15 may form part of an aerosol provision system for generating an aerosol from a source liquid comprising the reservoir of source liquid 524 and the planar vaporizer 525 comprising the planar heating element 526. By having the vaporizer 525, and in particular in the example of FIG. 15, the porous wicking material 528 surrounding the heating element 526, in contact with source liquid 524 in the reservoir 522 at the periphery of the vaporizer, the vaporizer 525 draws source liquid 524 from the reservoir 522 to the vicinity of the vaporizing surface of the vaporizer 525 through capillary action. An induction heater coil of the aerosol provision system in which the vaporizer assembly 520 is provided is operable to induce current flow in the planar annular heating element 526 to inductively heat the heating element 526 and so vaporize a portion of the source liquid 524 in the vicinity of the vaporizing surface of the vaporizer 525, thereby releasing the vaporized source liquid into air flowing through the central tube defined by the reservoir 522 and the passageway 527 through the vaporizer 525.

The configuration represented in FIG. 15 in which the vaporizer comprises a generally planar form comprising an inductively-heated generally planar heating element and configured to draw source liquid to the vaporizer vaporizing surface provides a simple yet efficient configuration for feeding source liquid to an inductively heated vaporizer of the types described herein having a generally annular liquid reservoir.

In the example of FIG. 15, the vaporizer 525 includes the non-conductive porous material 528 to provide the function of drawing source liquid 524 from the reservoir 522 to the vaporizing surface through capillary action. In this case the heating element 526 may, for example, comprise a nonporous material, such as a solid disc. However, in other implementations the heating element 526 may also comprise a porous material so that it also contributes to the wicking of source liquid 524 from the reservoir 522 to the vaporizing surface.

Thus, in the example of FIG. 15, the vaporizing surface of the vaporizer 525 comprises at least a portion of each of the left- and right-facing faces of the vaporizer 525, and wherein source liquid 524 is drawn from the reservoir 522 to the vicinity of the vaporizing surface through contact with at least a portion of the peripheral edge of the vaporizer 525. In examples, where the heating element 526 comprises a porous material, the capillary flow of source liquid 524 to the vaporizing surface may in addition pass through the heating element 526.

Figure 16:
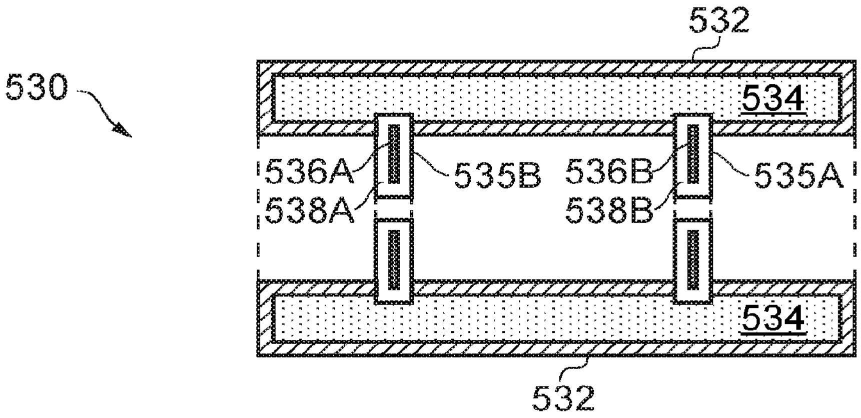

FIG. 16 schematically represents in cross-section a vaporizer assembly 530 for use in an aerosol provision system, for example of the type described above, in accordance with certain other embodiments of the present disclosure. Various aspects of the vaporizer assembly 530 of FIG. 16 are similar to, and will be understood from, corresponding elements of the vaporizer assembly 520 represented in FIG. 15. However, the vaporizer assembly 530 differs from the vaporizer assembly 520 in having two vaporizers 535A, 535B provided at different longitudinal positions along a central passageway through a reservoir housing 532 containing source liquid 534. The respective vaporizers 535A, 535B each comprise a heating element 536A, 536B surrounded by a porous wicking material 538A, 538B. The respective vaporizers 535A, 535B and the manner in which they interact with the source liquid 534 in the reservoir 532 may correspond with the vaporizer 525 represented in FIG. 15 and the manner in which that vaporizer interacts with the source liquid 524 in the reservoir 522. The functionality and purpose for providing multiple vaporizers in the example represented in FIG. 16 may be broadly the same as discussed above in relation to the vaporizer assembly 510 comprising multiple vaporizers represented in FIG. 14.

Figure 17:
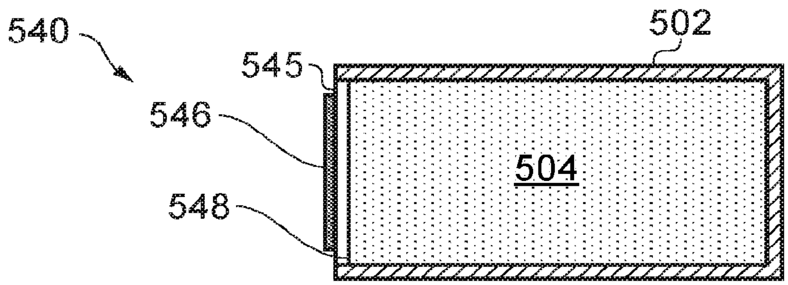

FIG. 17 schematically represents in cross-section a vaporizer assembly 540 for use in an aerosol provision system, for example of the type described above, in accordance with certain other embodiments of the present disclosure. Various aspects of the vaporizer 540 of FIG. 17 are similar to, and will be understood from, correspondingly numbered elements of the vaporizer assembly 500 represent in FIG. 13. However, the vaporizer assembly 540 differs from the vaporizer assembly 500 in having a modified vaporizer 545 as compared to the vaporizer 505 of FIG. 13. In particular, whereas in the vaporizer 505 of FIG. 13 the heating element 506 is surrounded by the porous material 508 on both faces, in the example of FIG. 17, the vaporizer 545 comprises a heating element 546 which is only surrounded by porous material 548 on one side, and in particular on the side facing the source liquid 504 in the reservoir 502. In this configuration the heating element 546 comprises a porous conducting material, such as a web of steel fibers, and the vaporizing surface of the vaporizer is the outward facing (i.e. shown left-most in FIG. 17) face of the heater element 546. Thus, the source liquid 504 may be drawn from the reservoir 502 to the vaporizing surface of the vaporizer 545 by capillary action through the porous material 548 and the porous heater element 546. The operation of an electronic aerosol provision system incorporating the vaporizer 545 of FIG. 17 may otherwise be generally as described herein in relation to the other induction heating based aerosol provision systems.

Figure 18:
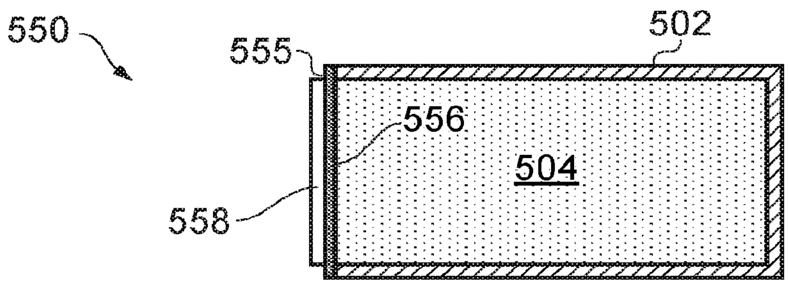

FIG. 18 schematically represents in cross-section a vaporizer assembly 550 for use in an aerosol provision system, for example of the type described above, in accordance with certain other embodiments of the present disclosure. Various aspects of the vaporizer assembly 550 of FIG. 18 are similar to, and will be understood from, correspondingly numbered elements of the vaporizer assembly 500 represented in FIG. 13. However, the vaporizer assembly 550 differs from the vaporizer assembly 500 in having a modified vaporizer 555 as compared to the vaporizer 505 of FIG. 13. In particular, whereas in the vaporizer 505 of FIG. 13 the heating element 506 is surrounded by the porous material 508 on both faces, in the example of FIG. 18, the vaporizer 555 comprises a heating element 556 which is only surrounded by porous material 558 on one side, and in particular on the side facing away from the source liquid 504 in the reservoir 502. The heating element 556 again comprises a porous conducting material, such as a sintered/mesh steel material. The heating element 556 in this example is configured to extend across the full width of the opening in the housing of the reservoir 502 to provide what is in effect a porous seal and may be held in place by a press fit in the opening of the housing of the reservoir 502 and/or glued in place and/or include a separate clamping mechanism. The porous material 558 in effect provides the vaporization surface for the vaporizer 555. Thus, the source liquid 504 may be drawn from the reservoir 502 to the vaporizing surface of the vaporizer by capillary action through the porous heater element 556. The operation of an electronic aerosol provision system incorporating the vaporizer of FIG. 18 may otherwise be generally as described herein in relation to the other induction heating based aerosol provision systems.

Figure 19:
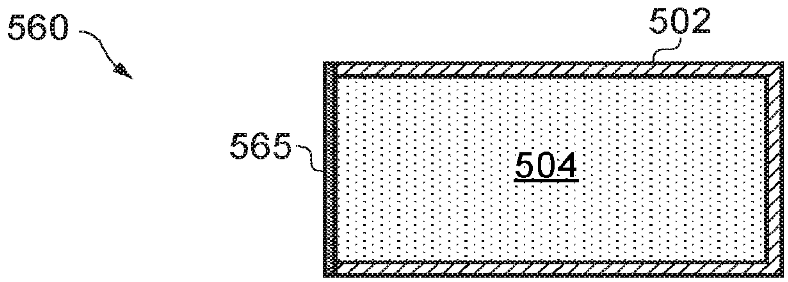

FIG. 19 schematically represents in cross-section a vaporizer assembly 560 for use in an aerosol provision system, for example of the type described above, in accordance with certain other embodiments of the present disclosure. Various aspects of the vaporizer assembly 560 of FIG. 19 are similar to, and will be understood from, correspondingly numbered elements of the vaporizer assembly 500 represented in FIG. 13. However, the vaporizer assembly 560 differs from the vaporizer assembly 500 in having a modified vaporizer 565 as compared to the vaporizer 505 of FIG. 13. In particular, whereas in the vaporizer 505 of FIG. 13 the heating element 506 is surrounded by the porous material 508, in the example of FIG. 19, the vaporizer 565 consists of a heating element 566 without any surrounding porous material. In this configuration the heating element 566 again comprises a porous conducting material, such as a sintered/mesh steel material. The heating element 566 in this example is configured to extend across the full width of the opening in the housing of the reservoir 502 to provide what is in effect a porous seal and may be held in place by a press fit in the opening of the housing of the reservoir 502 and/or glued in place and/or include a separate clamping mechanism. The heating element 546 in effect provides the vaporization surface for the vaporizer 565 and also provides the function of drawing source liquid 504 from the reservoir 502 to the vaporizing surface of the vaporizer 565 by capillary action. The operation of an electronic aerosol provision system incorporating the vaporizer 565 of FIG. 19 may otherwise be generally as described herein in relation to the other induction heating based aerosol provision systems.

Figure 20:
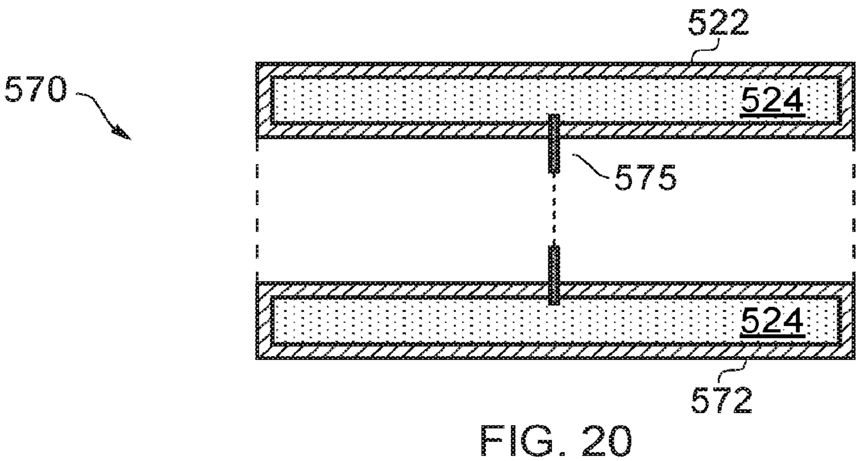

FIG. 20 schematically represents in cross-section a vaporizer assembly 570 for use in an aerosol provision system, for example of the type described above, in accordance with certain other embodiments of the present disclosure. Various aspects of the vaporizer assembly 570 of FIG. 20 are similar to, and will be understood from, correspondingly numbered elements of the vaporizer assembly 520 represented in FIG.

15. However, the vaporizer assembly 570 differs from the vaporizer assembly 520 in having a modified vaporizer 575 as compared to the vaporizer 525 of FIG. 15. In particular, whereas in the vaporizer 525 of FIG. 15 the heating element 526 is surrounded by the porous material 528, in the example of FIG. 20, the vaporizer 575 consists of a heating element 576 without any surrounding porous material. In this configuration the heating element 576 again comprises a porous conducting material, such as a sintered/mesh steel material. The periphery of the heating element 576 is configured to extend into a correspondingly sized opening in the housing of the reservoir 522 to provide contact with the liquid formulation and may be held in place by a press fit and/or glue and/or a clamping mechanism. The heating element 546 in effect provides the vaporization surface for the vaporizer 575 and also provides the function of drawing source liquid 524 from the reservoir 522 to the vaporizing surface of the vaporizer 575 by capillary action. The operation of an electronic aerosol provision system incorporating the vaporizer 575 of FIG. 20 may otherwise be generally as described herein in relation to the other induction heating based aerosol provision systems.

Thus, FIGS. 13 to 20 show a number of different example liquid feed mechanisms for use in an inductively heater vaporizer of an electronic aerosol provision system, such as an electronic cigarette. It will be appreciated these example set out principles that may be adopted in accordance with some embodiments of the present disclosure, and in other implementations different arrangements may be provided which include these and similar principles. For example, it will be appreciated the configurations need not be circularly symmetric, but could in general adopt other shapes and sizes according to the implementation hand. It will also be appreciated that various features from the different configurations may be combined. For example, whereas in FIG. 15 the vaporizer is mounted on an internal wall of the reservoir 522, in another example, a generally annular vaporizer may be mounted at one end of a annular reservoir. That is to say, what might be termed an "end cap" configuration of the kind shown in FIG. 13 could also be used for an annular reservoir whereby the end-cap comprises an annular ring, rather than a non-annular disc, such as in the Example of FIGS. 13, 14 and 17 to 19. Furthermore, it will be appreciated the example vaporizers of FIGS. 17, 18, 19 and 20 could equally be used in a vaporizer assembly comprising multiple vaporizers, for example shown in FIGS. 15 and 16.

It will furthermore be appreciated that vaporizer assemblies of the kind shown in FIGS. 13 to 20 are not restricted to use in aerosol provision systems of the kind described herein, but can be used more generally in any inductive heating based aerosol provision system. Accordingly, although various example embodiments described herein have focused on a two-part aerosol provision system comprising a re-useable control unit and a replaceable cartridge, in other examples, a vaporizer of the kind described herein with reference to FIGS. 13 to 20 may be used in an aerosol provision system that does not include a replaceable cartridge, but is a one-piece disposable system or a refillable system.

It will further be appreciated that in accordance with some example implementations, the heating element of the example vaporizer assemblies discussed above with reference to FIGS. 13 to 20 may correspond with any of the example heating elements discussed above, for example in relation to FIGS. 9 to 12. That is to say, the arrangements shown in FIGS. 13 to 20 may include a heating element having a non-uniform response to inductive heating, as discussed above.

Thus, there has been described an aerosol provision system for generating an aerosol from a source liquid, the aerosol provision system comprising: a reservoir of source liquid; a planar vaporizer comprising a planar heating element, wherein the vaporizer is configured to draw source liquid from the reservoir to the vicinity of a vaporizing surface of the vaporizer through capillary action; and an induction heater coil operable to induce current flow in the heating element to inductively heat the heating element and so vaporize a portion of the source liquid in the vicinity of the vaporizing surface of the vaporizer. In some example the vaporizer further comprises a porous wadding/wicking material, e.g. an electrically non-conducting fibrous material at least partially surrounding the planar heating element (susceptor) and in contact with source liquid from the reservoir to provide, or at least contribute to, the function of drawing source liquid from the reservoir to the vicinity of the vaporizing surface of the vaporizer. In some examples the planar heating element (susceptor) may itself comprise a porous material so as to provide, or at least contribute to, the function of drawing source liquid from the reservoir to the vicinity of the vaporizing surface of the vaporizer.

In order to address various issues and advance the art, this disclosure shows by way of illustration various embodiments in which the claimed invention(s) may be practiced. The advantages and features of the disclosure are of a representative sample of embodiments only, and are not exhaustive and/or exclusive. They are presented only to assist in understanding and to teach the claimed invention(s). It is to be understood that advantages, embodiments, examples, functions, features, structures, and/or other aspects of the disclosure are not to be considered limitations on the disclosure as defined by the claims or limitations on equivalents to the claims, and that other embodiments may be utilized and modifications may be made without departing from the scope of the claims. Various embodiments may suitably comprise, consist of, or consist essentially of, various combinations of the disclosed elements, components, features, parts, steps, means, etc. other than those specifically described herein, and it will thus be appreciated that features of the dependent claims may be combined with features of the independent claims in combinations other than those explicitly set out in the claims. The disclosure may include other inventions not presently claimed, but which may be claimed in future.

The invention claimed is:

1. An aerosol provision system for generating an aerosol from a source liquid, the aerosol provision system comprising:

a reservoir of source liquid;

a planar vaporizer comprising a planar heating element, wherein the vaporizer is configured to draw source liquid from the reservoir to a vicinity of a vaporizing surface of the vaporizer through capillary action; and an induction heater coil operable to induce current flow in the heating element to inductively heat the heating element and so vaporize a portion of the source liquid in the vicinity of the vaporizing surface of the vaporizer, wherein at least one of the vaporizer or the heating element comprising the vaporizer is in the form of a planar annulus.

2. The aerosol provision system of claim 1, wherein the vaporizer further comprises porous material at least partially surrounding the heating element.

3. The aerosol provision system of claim 2, wherein the porous material comprises a fibrous material.

4. The aerosol provision system of claim 2, wherein the porous material is arranged to draw the source liquid from the reservoir to the vicinity of the vaporizing surface of the vaporizer through capillary action.

5. The aerosol provision system of claim 2, wherein the porous material is arranged to absorb the source liquid that has been drawn from the reservoir to the vicinity of the vaporizing surface of the vaporizer so as to store the source liquid in the vicinity of the vaporizing surface of the vaporizer for subsequent vaporization.

6. The aerosol provision system of claim 1, wherein the heating element comprises a porous electrically conductive material, and wherein the heating element is arranged to draw the source liquid from the reservoir to the vicinity of the vaporizing surface of the vaporizer through capillary action.

7. The aerosol provision system of claim 1, wherein the vaporizer comprises first and second opposing faces connected by a peripheral edge, and wherein the vaporizing surface of the vaporizer comprises at least a portion of at least one of the first and second faces.

8. The aerosol provision system of claim 7, wherein the vaporizing surface of the vaporizer comprises at least a portion of the first face of the vaporizer, and wherein the source liquid is drawn from the reservoir to the vicinity of the vaporizing surface through contact with the second face of the vaporizer.

9. The aerosol provision system of claim 7, wherein the vaporizing surface of the vaporizer comprises at least a portion of each of the first and second faces of the vaporizer, and wherein the source liquid is drawn from the reservoir to the vicinity of the vaporizing surface through contact with at least a portion of the peripheral edge of the vaporizer.

10. The aerosol provision system of claim 1, wherein the vaporizer defines a wall of the reservoir of the source liquid.

11. The aerosol provision system of claim 10, wherein the vaporizing surface of the vaporizer is on a side of the vaporizer facing away from the reservoir of the source liquid.

12. The aerosol provision system of claim 1, wherein the aerosol provision system comprises an airflow path along which air is drawn when a user inhales on the aerosol provision system, and wherein the airflow path passes through a passageway through the vaporizer.

13. The aerosol provision system of claim 1, further comprising a further planar vaporizer comprising a further planar heating element, wherein the further vaporizer is configured to draw the source liquid from the reservoir to the vicinity of a vaporizing surface of the further vaporizer through capillary action.

14. The aerosol provision system of claim 13, wherein the induction heater coil is further operable to induce current flow in the further heating element to inductively heat the further heating element and so vaporize a portion of the source liquid in the vicinity of the vaporizing surface of the further vaporizer, or, wherein the aerosol provision system comprises a further induction heater coil operable independently of a first-mentioned induction heater coil to induce current flow in the further heating element to inductively heat the further heating element and so vaporize the portion of the source liquid in the vicinity of the vaporizing surface of the further vaporizer.

15. The aerosol provision system of claim 13, wherein the vaporizer and the further vaporizer are separated along a longitudinal axis of the aerosol provision system.

16. The aerosol provision system of claim 13, wherein the vaporizer defines a wall of the reservoir of source liquid and the further vaporizer defines a further wall of the reservoir of the source liquid.

17. The aerosol provision system of claim 16, wherein the vaporizer and the further vaporizer respectively define walls at opposing ends of the reservoir.

18. A cartridge for use in an aerosol provision system for generating an aerosol from a source liquid, the cartridge comprising:

a reservoir of source liquid;

a planar vaporizer comprising a planar heating element, wherein the vaporizer is configured to draw source liquid from the reservoir to the vicinity of a vaporizing surface of the vaporizer through capillary action, and wherein the heating element is susceptible to induced current flow from an induction heater coil of the aerosol provision system to inductively heat the heating element and so vaporize a portion of the source liquid in the vicinity of the vaporizing surface of the vaporizer, wherein at least one of the vaporizer or the heating element comprising the vaporizer is in the form of a planar annulus.

19. A method of generating an aerosol from a source liquid, the method comprising:

providing a reservoir of source liquid and a planar vaporizer comprising a planar heating element, wherein the vaporizer draws source liquid from the reservoir to the vicinity of a vaporizing surface of the vaporizer by capillary action; and driving an induction heater coil to induce current flow in the heating element to inductively heat the heating element and so vaporize a portion of the source liquid in the vicinity of the vaporizing surface of the vaporizer, wherein at least one of the vaporizer or the heating element is in the form of a planar annulus.

* * * * *